US012750002B1

(12) United States Patent
Jaramillo

(10) Patent No.: US 12,750,002 B1
(45) Date of Patent: Sep. 29, 2026

(54) SOLAR SUPPORT STRUCTURES AND METHODS OF ASSEMBLING AND USING THE SAME

(71) Applicant: PowerShingle, LLC, Laguna Beach, CA (US)

(72) Inventor: Elliot Jaramillo, Berkeley, CA (US)

(73) Assignee: PowerShingle, LLC, Laguna Beach, CA (US)

( * ) Notice: Subject to any disclaimer, the term of this patent is extended or adjusted under 35 U.S.C. 154(b) by 4 days.

(21) Appl. No.: 18/427,085

(22) Filed: Jan. 30, 2024

Related U.S. Application Data

(60) Provisional application No. 63/601,216, filed on Nov. 20, 2023, provisional application No. 63/482,113, filed on Jan. 30, 2023.

(51) Int. Cl.
*H02S 20/10* (2014.01)

(52) U.S. Cl.
CPC .................................... *H02S 20/10* (2014.12)

(58) Field of Classification Search
None
See application file for complete search history.

(56) References Cited

U.S. PATENT DOCUMENTS

| | | | | |
|---|---|---|---|---|
| 11,894,797 | B1 * | 2/2024 | Jaramillo | H02S 20/23 |
| 2009/0019795 | A1 * | 1/2009 | Szacsvay | F24S 25/20 52/173.3 |
| 2012/0312356 | A1 * | 12/2012 | Mizuo | H02S 20/23 136/251 |
| 2013/0250008 | A1 * | 9/2013 | Ohnishi | B41J 2/161 216/2 |

FOREIGN PATENT DOCUMENTS

| | | | | |
|---|---|---|---|---|
| CN | 108183661 A * | 6/2018 | | H02S 30/10 |
| CN | 114182891 A * | 3/2022 | | H02S 20/26 |

OTHER PUBLICATIONS

English machine translation of Peng (CN-108183661-A) provided by the EPO website, 2025, All Pages. (Year: 2025).*
English machine translation of Zhou (CN-114182891-A) provided by the EPO website, 2025, All Pages. (Year: 2025).*

* cited by examiner

*Primary Examiner* — Daniel P Malley, Jr.
(74) *Attorney, Agent, or Firm* — FisherBroyles, LLP

(57) ABSTRACT

Solar panel structures comprising a plurality of photovoltaic panel assemblies, wherein each photovoltaic panel assembly comprises one or more support structures configured to support the panel to resist bending and/or flexing that could be caused by wind, rain or snow, for example, and methods of using the same.

16 Claims, 52 Drawing Sheets

Fig. 1
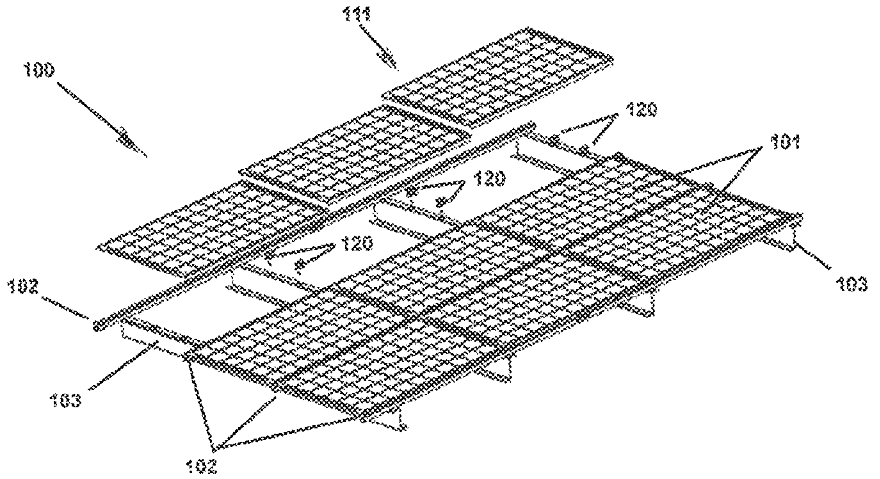
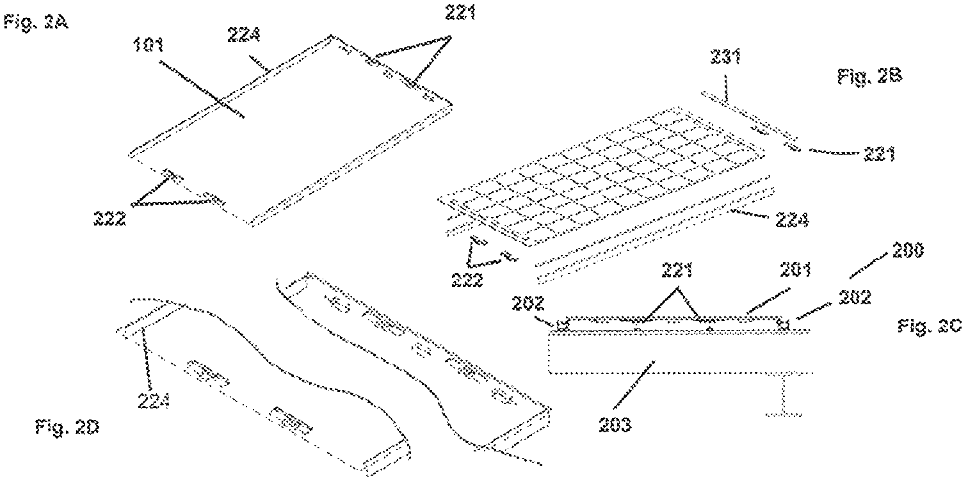
Fig. 2A Fig. 2B Fig. 2C Fig. 2D

Fig. 3A
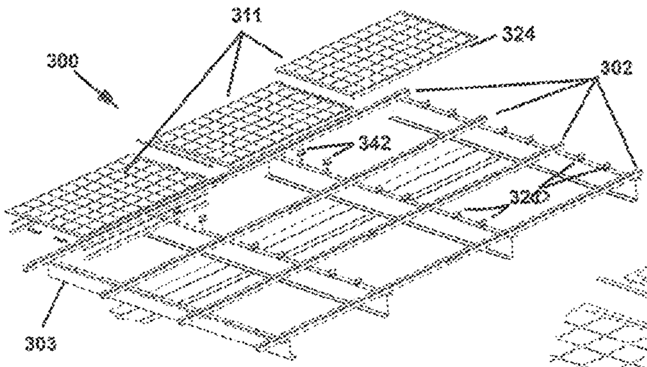
Fig. 3B
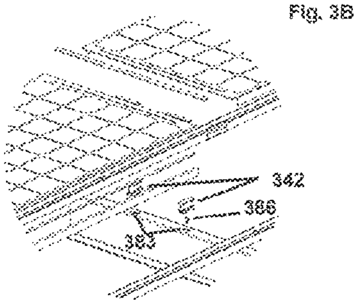
Fig. 3C
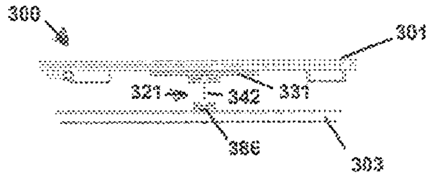
Fig. 4A
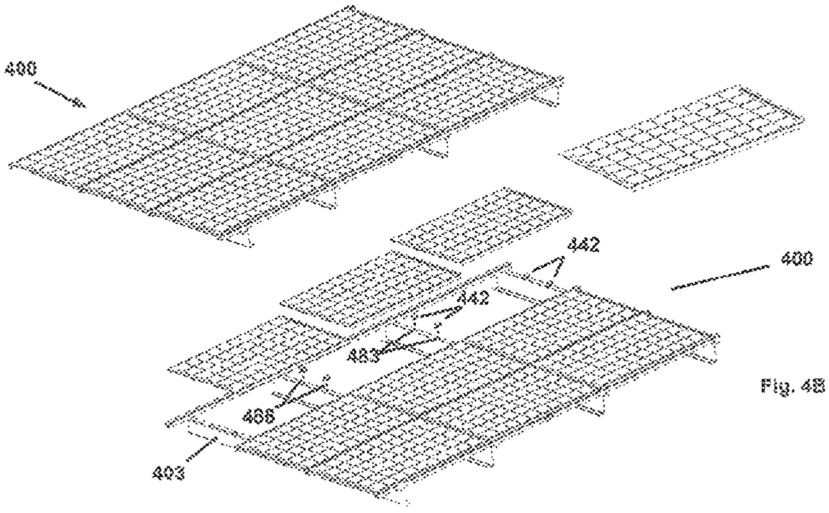
Fig. 4B

Fig. 5A
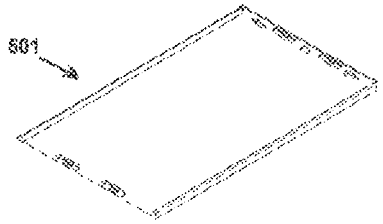
Fig. 5B
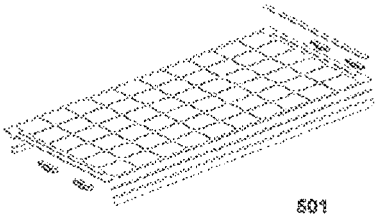
Fig. 5C
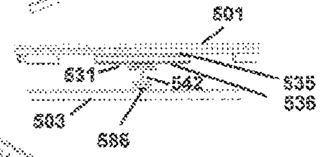
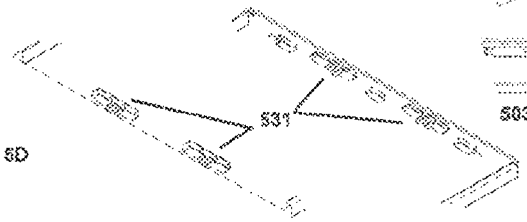
Fig. 5D
Fig. 6A
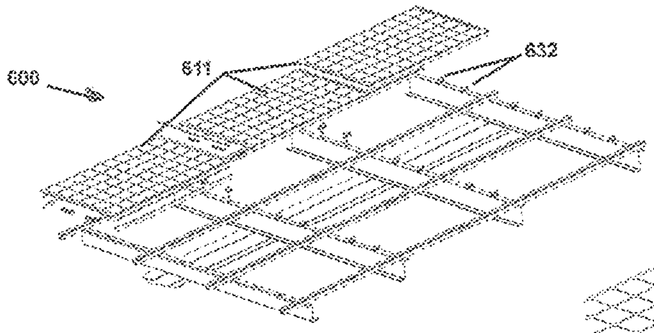
Fig. 6B
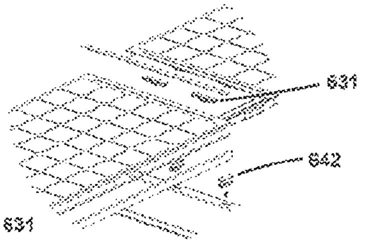
Fig. 6C
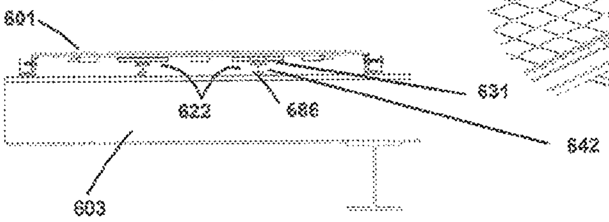

Fig. 15
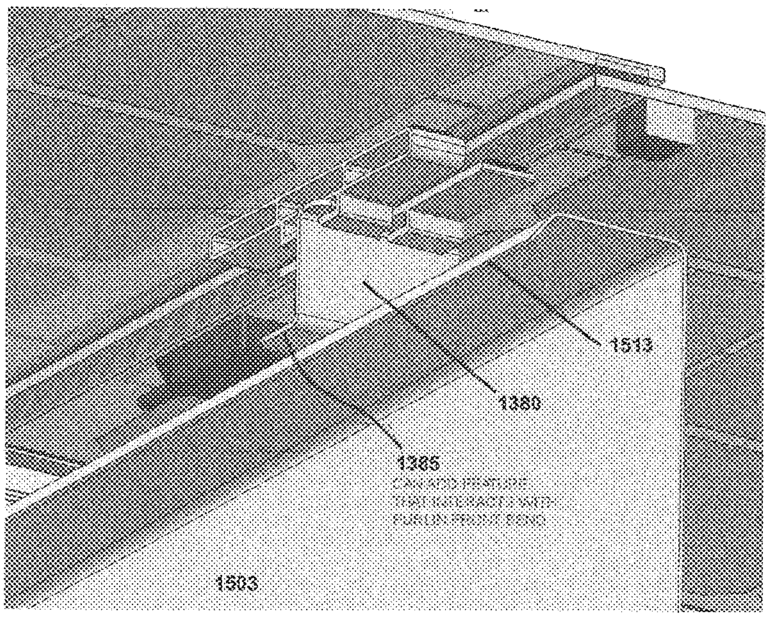
Fig. 16A
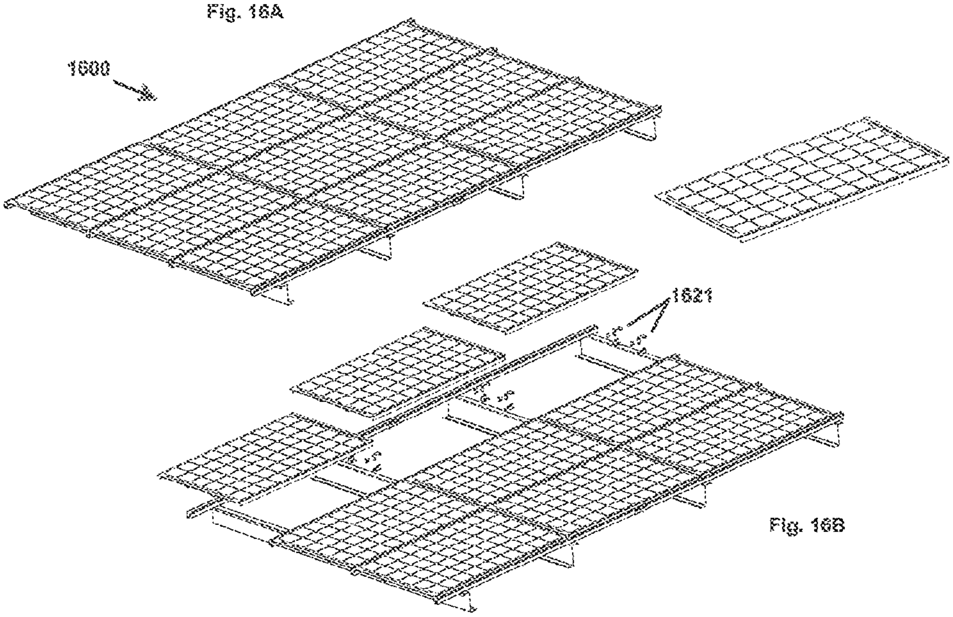
Fig. 16B

Fig. 17A
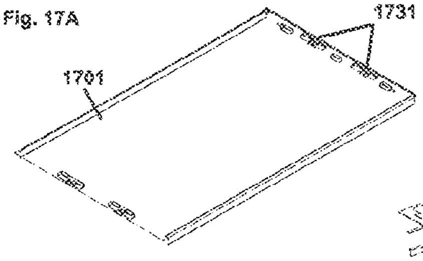
Fig. 17B
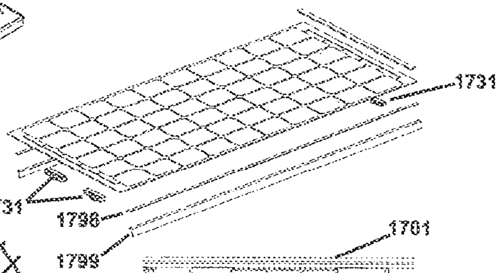
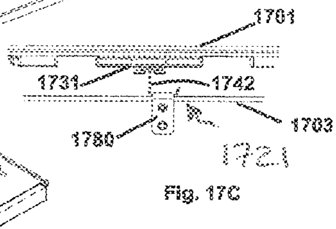
Fig. 17C
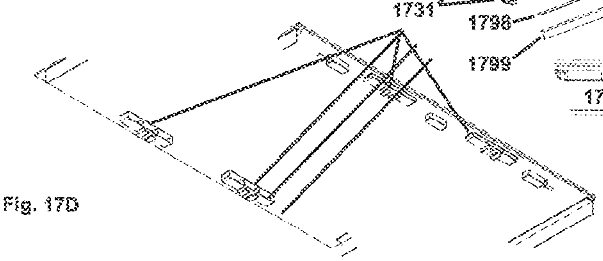
Fig. 17D
Fig. 18A
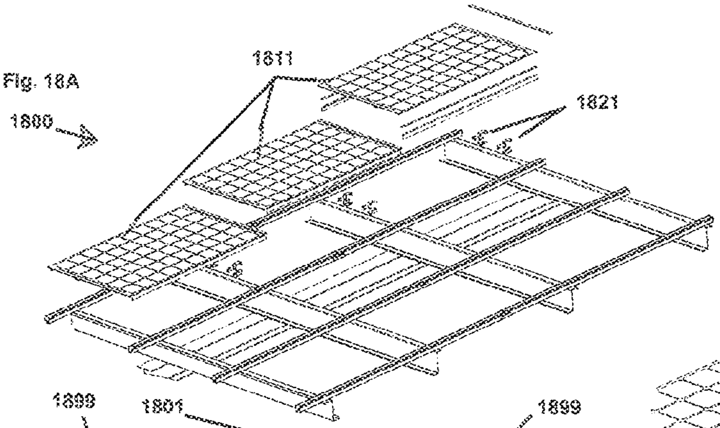
Fig. 18B
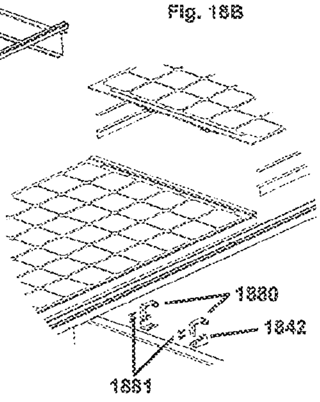
Fig. 18C
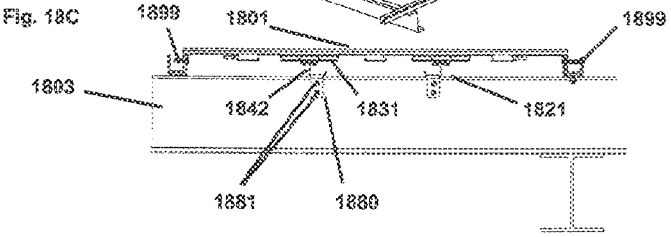

Fig. 19A
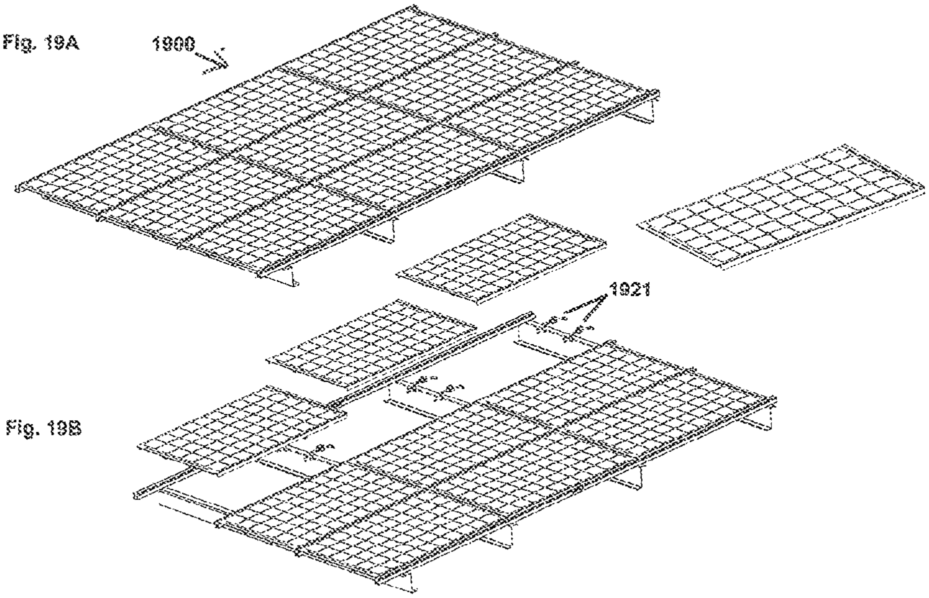
Fig. 19B
Fig. 20A
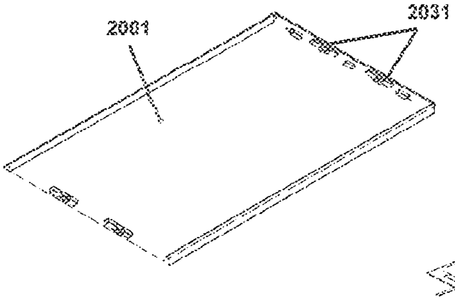
Fig. 20B
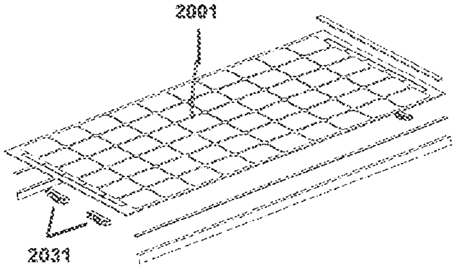
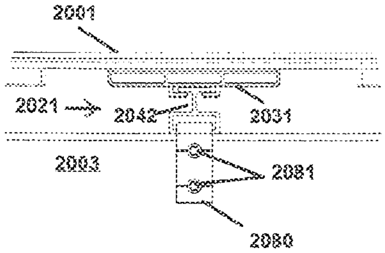
Fig. 20C Fig. 23A
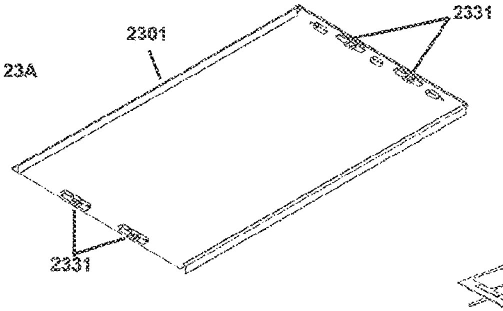
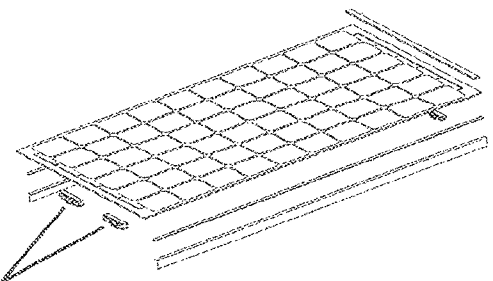
Fig. 23B
Fig. 23C
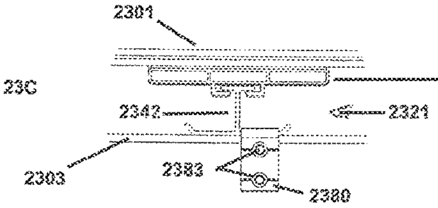
Fig. 24A
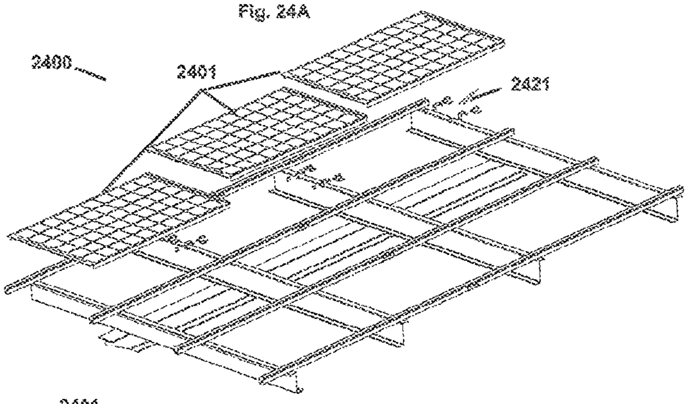
Fig. 24B
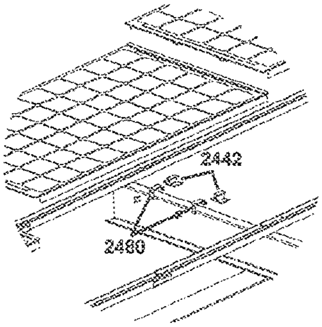
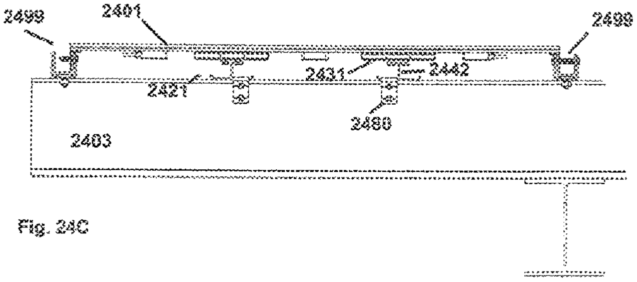
Fig. 24C Fig. 25A
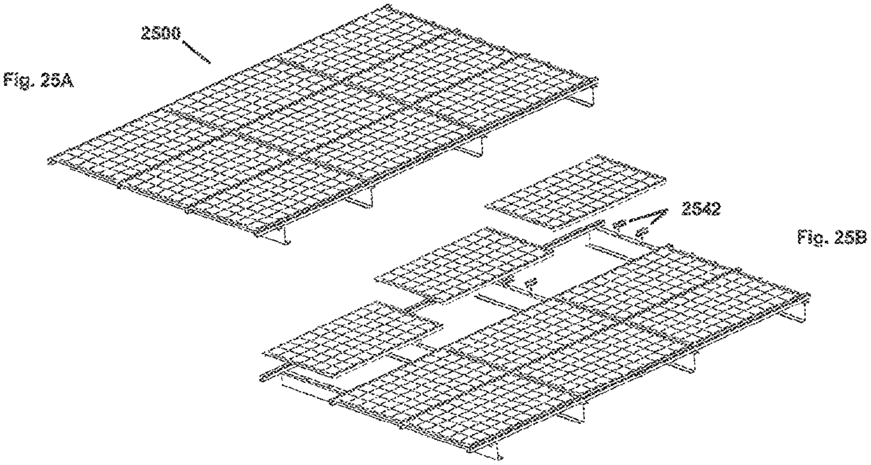
Fig. 25B
Fig. 26A
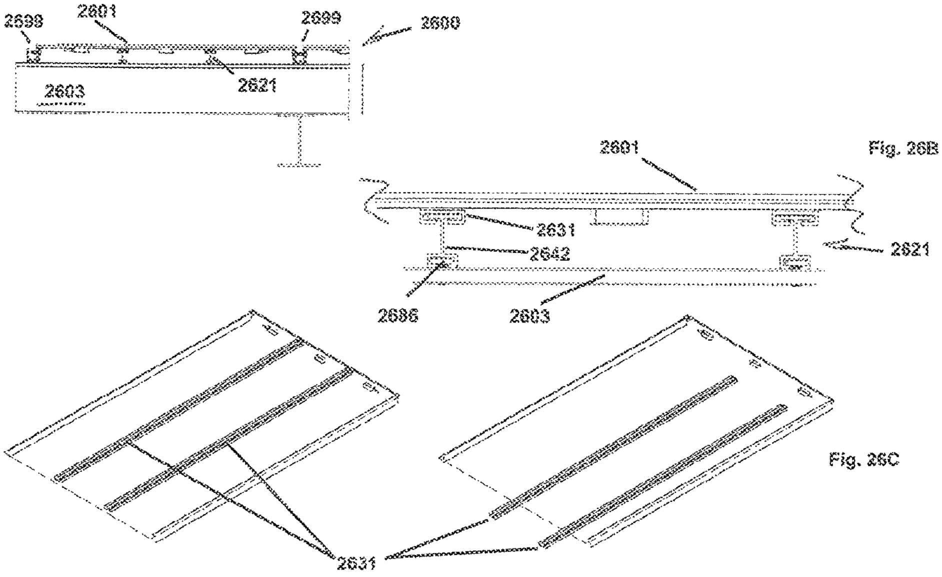
Fig. 26B
Fig. 26D
Fig. 26C Fig. 29A
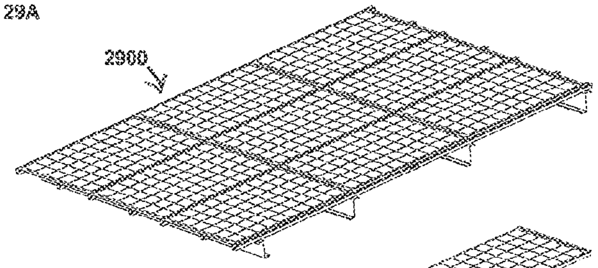
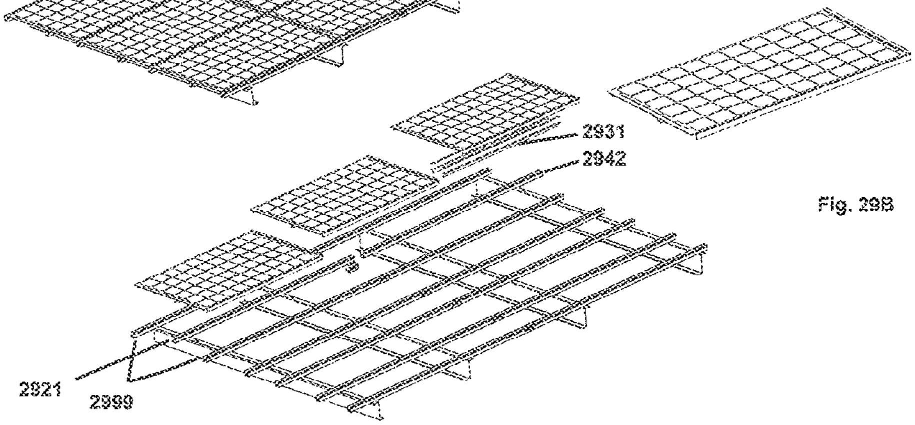
Fig. 29B
Fig. 30A
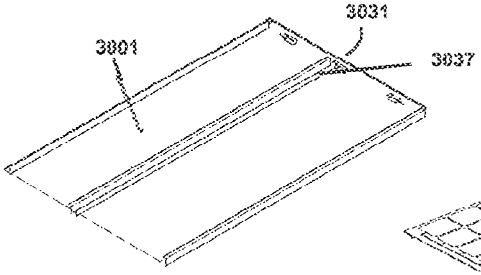
Fig. 30B
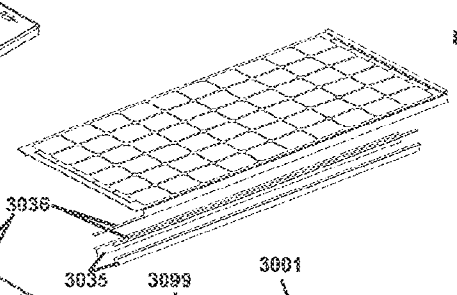
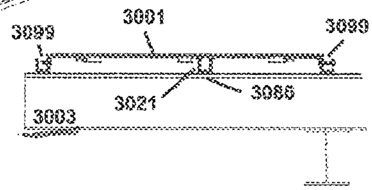
Fig. 30C
Fig. 30D
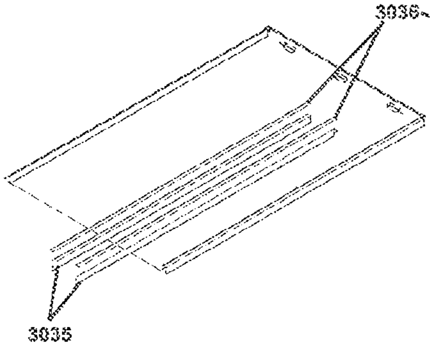

3601
3602
3604
3605
3622
3626
3631
3644
3645
3648
3699

3822
3845
3822
3801

3822
3845
3822
3801

FIG. 61B
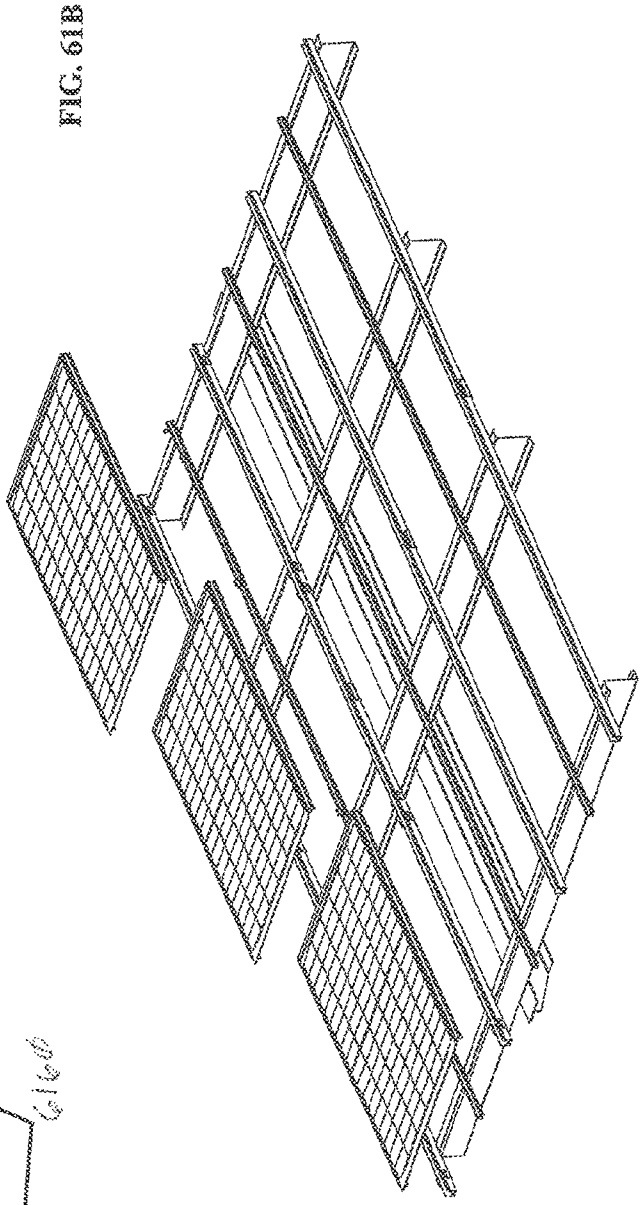
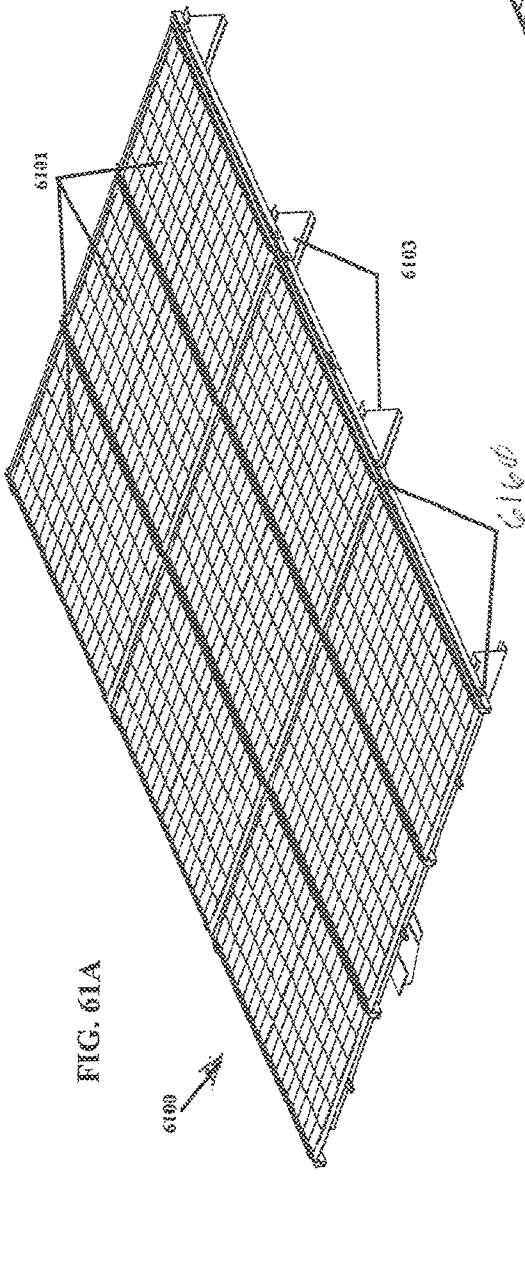
FIG. 61A

SOLAR SUPPORT STRUCTURES AND METHODS OF ASSEMBLING AND USING THE SAME

RELATED APPLICATION

This application claims priority to U.S. Provisional Application No. 63/482,113 filed Jan. 30, 2023 and U.S. Provisional Application No. 63/601,216 filed Nov. 20, 2023, each hereby incorporated by reference.

TECHNICAL FIELD

The invention generally relates to solar panel structures and methods of assembling and using the same.

BACKGROUND

Several publications are referenced in this application. The cited references describe the state of the art to which this invention pertains and are hereby incorporated by reference, particularly the systems and methods set forth in the detailed description and figures of each reference.

Photovoltaic (PV) panels are widely used to convert solar energy to electrical power. A typical solar panel installation is comprised of a grid system employing one of many various types of structural products typically mounted on either rooftops or ground mounted applications using a variety of racking products. For example, the panels and structures described in U.S. patent application Ser. No. 16/517,570, hereby incorporated by reference. Additionally, over the course of the past several years, there has been a significant increase in the use solar panels mounted to elevated rack "shade" structures for the dual purpose of providing shade and protection from elements to the underlying area as well as improve energy production.

SUMMARY OF INVENTION

The invention relates generally to improved solar panel structures and methods of assembling the same.

One aspect of the invention relates to a solar panel structure comprising:

a support structure including a plurality of essentially parallel channel rail supports;

a plurality of photovoltaic panel assemblies, wherein each photovoltaic panel assembly comprises a top end edge, a bottom end edge, a first side edge and a second side edge and wherein the first side edge is connected to a first parallel channel rail support and the second side edge is connected to a second parallel channel rail support; and at least one top end edge support between the first side edge and the second side edge and at least one bottom end edge support between the first side edge and the second side edge, where the top end edge support is affixed to a first purlin orthogonal to the plurality of essentially parallel channel rail supports and where the bottom end edge support is affixed to a second purlin essentially parallel to the first purlin.

Another aspect of the invention relates to a solar panel structure comprising:

a support structure including a plurality of essentially parallel panel side supports and a plurality of essentially parallel central panel supports, wherein the support structure comprises at least one of the plurality of essentially parallel central panel supports between two of the plurality of essentially parallel panel side supports; and a plurality of photovoltaic panel assemblies, wherein each photovoltaic panel assembly comprises a top surface, a bottom surface, top end edge, a bottom end edge, a first side edge and a second side edge and wherein the first side edge is connected to a first parallel panel side support and the second side is connected to a second parallel panel side support;

wherein each photovoltaic panel assembly comprises at least one underside receiving center rail attached to the bottom surface and essentially parallel to the first side and the second side and configured to slidably connect to at least one of the plurality of essentially parallel central panel supports to support a central portion of the photovoltaic panel assembly.

Another aspect of the invention relates to a solar panel structure comprising:

a support structure including a plurality of essentially parallel channel rail supports;

at least one purlin orthogonal to the plurality of essentially parallel channel rail supports and configured to support the plurality of essentially parallel channel rail supports;

a plurality of photovoltaic panel assemblies, wherein each photovoltaic panel assembly comprises a top end edge, a bottom end edge, a first side edge and a second side edge and wherein the first side edge is connected to a first parallel channel rail support and the second side edge is connected to a second parallel channel rail support, wherein the plurality of photovoltaic panel assemblies comprises a first photovoltaic panel assembly adjacent a second photovoltaic panel assembly;

at least one top end edge support between the first side edge and the second side edge of a first photovoltaic panel assembly and at least one bottom end edge support between the first side edge and the second side edge of the first photovoltaic panel assembly; and at least one alternative top end edge support between the first side edge and the second side edge of the second photovoltaic panel assembly and the at least one bottom end edge support between the first side edge and the second side edge of the second photovoltaic panel assembly; and wherein the at least one alternative top end edge support of the second photovoltaic panel assembly is shorter than the at least one bottom end edge support of the first photovoltaic panel assembly.

The foregoing has outlined some of the aspects of the present invention. These aspects should be construed strictly as illustrative of some of the more prominent features and applications of the invention, rather than as limitations on the invention. Many other beneficial results can be obtained by modifying the embodiments within the scope of the invention. Accordingly, for other objects and a full understanding of the invention, refer to the summary of the invention, the detailed description describing the preferred embodiment in addition to the scope of the invention defined by the claims and the accompanying drawings. The unique features characteristic of this invention and operation will be understood more easily with the description and drawings. It is to be understood that the drawings are for illustration and description only and do not define the limits of the invention.

BRIEF DESCRIPTION OF DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale. The illustrated embodiments are intended to illustrate, but not to limit the inventions. The drawings contain the following figures:

FIG. 1 is a perspective view of a partially assembled solar support structure with assembled and unassembled photovoltaic panels and supports according to an aspect of the disclosure.

FIG. 2A is a bottom perspective view of a photovoltaic panel according to one embodiment of the disclosure. FIG. 2B is a top perspective view of a disassembled photovoltaic panel according to one embodiment of the disclosure. FIG. 2C is a front view of an assembled photovoltaic panel structure including the panel of FIG. 2A according to one embodiment of the disclosure. FIG. 2D is a bottom perspective view of a photovoltaic panel according to one embodiment of the disclosure.

FIG. 3A is a top perspective view of a photovoltaic panel structure showing unassembled panels according to another embodiment of the disclosure. FIG. 3B is an exploded side perspective partial view of an unassembled photovoltaic panel structure according to one embodiment of the disclosure. FIG. 3C is a front view of an assembled photovoltaic panel structure according to one embodiment of the disclosure.

FIG. 4A is a top perspective view of a photovoltaic panel structure according to another embodiment of the disclosure. FIG. 4B is a top perspective view of the photovoltaic panel structure of FIG. 4A partially assembled.

FIG. 5A is a bottom perspective view of a photovoltaic panel according to another embodiment of the disclosure. FIG. 5B is a top perspective view of the panel of FIG. 5A unassembled. FIG. 5C is a front view of an assembled photovoltaic panel structure including the panel of FIG. 5A according to one embodiment of the disclosure. FIG. 5D is a bottom perspective views of a photovoltaic panel according to one embodiment of the disclosure.

FIG. 6A is a top perspective view of a photovoltaic panel structure according to another embodiment of the disclosure. FIG. 6B is an exploded side perspective partial view of the structure of FIG. 6A. FIG. 6C is a front view of an assembled photovoltaic panel structure of FIG. 6A.

FIG. 15 is a side perspective view of a support structure for a photovoltaic panel according to another embodiment of the disclosure.

FIG. 16A is a top perspective view of a photovoltaic panel structure according to another embodiment of the disclosure. FIG. 16B is a top perspective view of the photovoltaic panel structure of FIG. 16A partially assembled.

FIG. 17A is a bottom perspective view of a photovoltaic panel according to another embodiment of the disclosure. FIG. 17B is a top perspective view of an unassembled photovoltaic panel according to one embodiment of the disclosure. FIG. 17C is a front view of an assembled photovoltaic panel structure according to one embodiment of the disclosure. FIG. 17D is a bottom perspective view of a photovoltaic panel according to one embodiment of the disclosure.

FIG. 18A is a top perspective view of an unassembled photovoltaic panel structure according to another embodiment of the disclosure. FIG. 18B is an exploded side perspective partial view of the disassembled photovoltaic panel structure of FIG. 18A. FIG. 18C is a front view of the photovoltaic panel structure of FIG. 18A assembled according to one embodiment of the disclosure.

FIG. 19A is a top perspective view of a photovoltaic panel structure according to another embodiment of the disclosure. FIG. 19B is a top perspective view of the photovoltaic panel structure of FIG. 19A partially assembled.

FIG. 20A is a bottom perspective view of a photovoltaic panel according to another embodiment of the disclosure. FIG. 20B is a top perspective side view of the disassembled photovoltaic panel of FIG. 20A. FIG. 20C is a front view of a photovoltaic panel structure including the panel of FIG. 20A assembled according to one embodiment of the disclosure.

FIG. 23A is a bottom perspective view of a photovoltaic panel according to another embodiment of the disclosure. FIG. 23B is a side perspective view of the disassembled photovoltaic panel of FIG. 23A. FIG. 23C is a front view of a photovoltaic panel structure including the panel of FIG. 23A assembled according to one embodiment of the disclosure.

FIG. 24A is a top perspective view of an unassembled photovoltaic panel structure according to another embodiment of the disclosure. FIG. 24B is an exploded side perspective partial view of the disassembled photovoltaic panel structure of FIG. 24A. FIG. 24C is a front view of the photovoltaic panel structure of FIG. 24A assembled according to one embodiment of the disclosure.

FIG. 25A is a top perspective view of a photovoltaic panel structure according to another embodiment of the disclosure. FIG. 25B is a top perspective view of the photovoltaic panel structure of FIG. 25A partially assembled.

FIG. 26A is a front view of an assembled photovoltaic panel structure according to another embodiment of the disclosure. FIG. 26B is an front view of the structure of FIG. 26A. FIG. 26C is a bottom side perspective view of a panel of the photovoltaic panel structure of FIG. 26A showing unassembled center supports according to one embodiment of the disclosure. FIG. 26D is a bottom side perspective view of the panel of FIG. 26C showing assembled center supports according to one embodiment of the disclosure.

FIG. 29A is a top perspective view of a photovoltaic panel structure according to another embodiment of the disclosure. FIG. 29B is a top perspective view of the photovoltaic panel structure of FIG. 29A partially assembled.

FIG. 30A is a bottom perspective view of a photovoltaic panel according to another embodiment of the disclosure. FIG. 30B is a top side perspective view of the panel of FIG. 30A unassembled. FIG. 30C is a front view of a photovoltaic panel structure including the panel of FIG. 30A assembled according to one embodiment of the disclosure. FIG. 30D is a bottom side perspective view of the panel of FIG. 30A unassembled.

FIG. 61A is a perspective top view of an assembled solar support structure with assembled photovoltaic panels connected to channel rails and center rails according to another aspect of the disclosure. FIG. 61B is a perspective top view of the photovoltaic panel support structure shown in FIG. 61A showing a single row of unassembled panels.

Figure 7:
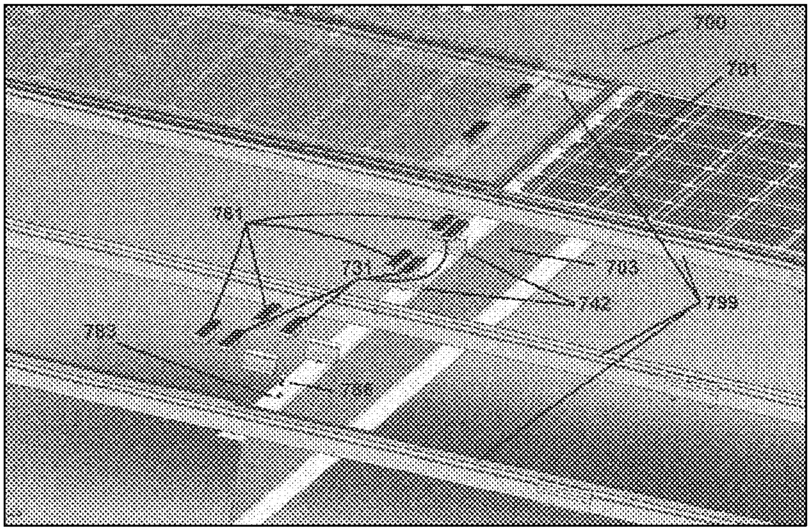
FIG. 7 is a top side perspective view of a partially assembled photovoltaic panel structure according to another embodiment of the disclosure.

The specific dimensions shown in any of the figures are describing specific preferred embodiments. These dimensions can be modified depending on the requirements for the solar panels and support structure.

DETAILED DESCRIPTION

In the following description, for purposes of explanation, specific details are set forth in order to provide a thorough understanding of different aspects of the present invention. It will be evident, however, to one skilled in the art that the present invention as defined by the claims may include some or all of the features or embodiments herein described and may further include obvious modifications and equivalents of the features and concepts described herein.

There are several related aspects of this disclosure. Generally, one aspect concerns modular, reconfigurable, shingled photovoltaic systems, assemblies and methods. Yet other aspects concern an easy to implement solar shingling structure providing shade or otherwise providing cover from elements including sun, rain and wind including integral paths to divert water, dust and debris while minimizing areas to collect the same.

DEFINITIONS

As used herein, the singular forms “a”, “an” and “the” include plural referents unless the context clearly dictates otherwise.

Ranges can be expressed herein as from “about” one particular value, and/or to “about” another particular value. When such a range is expressed, another aspect includes from the one particular value and/or to the other particular value. Similarly, when values are expressed as approximations, by use of the antecedent “about,” it will be understood that the particular value forms another aspect and “about” is utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. It will be further understood that the endpoints of each of the ranges are significant both in relation to the other endpoint, and independently of the other endpoint. As used in the claims herein, the term “about” in claims refers to a +/−10% variation from the nominal value. It is to be understood that such a variation is always included in any given value provided herein, whether or not it is specifically referred to.

Terms used herein, such as “aspect” or “embodiment” or “exemplary” or “exemplified,” are not meant to show preference, but rather to explain that the aspect discussed thereafter is merely one example of the aspect presented.

Additionally, as used herein, relative terms, such as “substantially”, “generally”, “approximately”, and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. As used in the claims herein, the term “substantially” in claims refers to a +/−10% variation from the nominal value. It is to be understood that such a variation is always included in any given value provided herein, whether or not it is specifically referred to.

The term “connected to” includes connected directly or indirectly and includes portions of items extruded, formed, shaped, stamped, or assembled into a unitary item.

As used herein, the terms “central” and “center” are intended to refer to any location between two boundaries, typically the edges or sides of the component being discussed, and not strictly to be construed as being an exact or approximate center location.

As used herein, the terms “optional” or “optionally” mean that the subsequently described event or circumstance may or may not occur or the component might be omitted, and that the description includes instances where the event or circumstance occurs and instances where it does not or when the component is present or not present.

The invention relates generally to improved solar panel structures and methods of assembling the same.

One aspect of the invention relates to a solar panel structure comprising:

- a support structure including a plurality of essentially parallel channel rail supports;
- a plurality of photovoltaic panel assemblies, wherein each photovoltaic panel assembly comprises a top end edge, a bottom end edge, a first side edge and a second side edge and wherein the first side edge is connected to a first parallel channel rail support and the second side edge is connected to a second parallel channel rail support; and
- at least one top end edge support between the first side edge and the second side edge and at least one bottom end edge support between the first side edge and the second side edge, where the top end edge support is affixed to a first purlin orthogonal to the plurality of essentially parallel channel rail supports and where the bottom end edge support is affixed to a second purlin essentially parallel to the first purlin.

FIG. 1 shows a partially assembled solar support structure 100 comprising assembled photovoltaic panels 101 supported on channel rail supports 102 which are supported on purlins 103, according to an aspect of the disclosure. FIG. 1 also shows unassembled panels 111 configured to be assembled or installed on channel rails 102/purlins 103. As shown in FIG. 1, the structure 100 further comprises one or more center supports 120 configured to reduce the flexing and/or bending of the panels 101. Preferably, the one or more center supports 120 are between the channel rails 102.

According to one embodiment, as shown in FIG. 2A, the at least one top end edge support 221 is adjacent or inset from the top end edge of the bottom surface of panel 101 and the at least one bottom end support 222 is adjacent or inset from the bottom end edge of the bottom surface of panel 101. Preferably, supports 221/222 are adhered to the bottom of panel 101 using tape 231 (or glue). Alternatively, the supports 221/222 are adhered using mechanical structures (e.g., screws, interlocking components), glue or other means for attaching the supports to the panel. FIG. 2A also shows an embodiment of side rails 224 attached along each side edge of the panel.

According to another embodiment, the at least one top end support is within 0.5 to 2 inches from the top end edge.

According to another embodiment, the at least one bottom end support is within 0.5 to 2 inches from the bottom end edge.

According to another embodiment, the at least one top end edge support and at least one bottom end edge support are each configured to further support the photovoltaic panel assembly between the first side edge and the second side edge of the photovoltaic panel assembly.

According to another embodiment, the at least one top end edge support and at least one bottom end edge support each comprise a first support component attached to a bottom surface of the photovoltaic panel assembly and a second support component attached to the first purlin and wherein the first support component interfaces with the second support component to resist photovoltaic panel assembly deflection orthogonal to the first purlin. Preferably, the at least one top end edge support and at least one bottom end edge support are configured to support the panel to resist bending and/or flexing that could be caused by, for example, wind, snow loading, ice formation, rain, etc. FIG. 2C shows a side view of solar support structure 200 comprising panel 201 supported on purlin 203 by channel rails 202. To mount the panel assembly to the structure, the side rails 224 are connected to the channel rails 202. The supports 221, 222 (FIG. 2A, 2B) mounted on the underside of the panels are connected to center supports 120 connected to the purlin 203. Tape gasket 231 (e.g., single-sided UV stable adhesive (e.g., foam, soft rubber etc.)) is a gasket that is taped to the upper edge, top-surface of each solar panel. According to preferred embodiments, upper panels will shingle over this gasket 231 and extend beyond it by approximately 0.2 to 1 inch. Alternatively, tape gasket 231 is a double-sided adhesive gasket that provides better sealing qualities between the upper edge of the lower panel and the lower edge of the upper shingled panel. Alternatively, glue may be used instead of tape gasket 231.

FIG. 3A shows a solar support structure 300 comprising unassembled photovoltaic panels 311 and channel rails 302 which are supported on purlins 303, according to an aspect of the disclosure. FIGS. 3A-3C also shows at least a pair of panel supports 321 for each top edge and bottom edge of each panel 311. FIG. 3B shows a close-up view of the components shown in FIG. 3A. FIG. 3C shows a close-up side view of the solar support structure 300 as assembled according to one embodiment and includes a panel support 321. The panel supports 321 include a first support component 331 having a top surface attached the bottom surface of panel 301 and a second support component 342 attached to the purlin 303. The first support component 331 and second support component 342 engage to resist deflection of the panel relative to the purlin 303. As shown in FIG. 3C, second support component 342 is attached purlin 303 using a bolt, rivet, or screw 386 through purlin opening or slot 383. As also shown in FIG. 3C, first support component 331 preferably comprises a channel to receive and connect a top portion (shown as T-shaped portion in FIG. 3C) of the second support component 342. Preferably, the bottom portion of second support component 342 is configured to be connected to purlin 303 as shown.

Preferably, the first support component comprises a channel and the second support component includes an element configured to interface with the channel.

According to another embodiment, the first support component comprises a channel and the second support component includes an element configured to slidably interface with the channel.

According to another embodiment, the first support component comprises a top surface attached to a bottom surface of the photovoltaic panel assembly and a shaped channel below the top surface and the second support component includes a connector configured to connect to the shaped channel of the first support component and the second support component also configured connect to the first purlin. Preferably, the connector is either (i) a threaded bolt where a head side connects to the shaped channel of the first support component and a threaded side connects to the first purlin or (ii) a tek-screw configured to connect to the shaped channel of the first support component and an opposing side configured to connect to the first purlin. According to preferred embodiments, wherein the connector is a threaded bolt and the second support component has an I-beam shape with a lower channel to receive the head side of the threaded bolt.

According to preferred embodiments, the first support component comprises an intermediate surface spaced from the top surface and the shaped channel is attached to the intermediate surface. Preferably, the first support component comprises two or more vertical supports between the top surface and the intermediate surface.

According to another embodiment, each photovoltaic panel assembly comprises at least one top end edge support and at least one bottom end edge support.

According to preferred embodiment, each photovoltaic panel assembly comprises at least two top end edge supports and at least two bottom end edge supports.

According to another embodiment, the second support component is attached to the first purlin using a connector configured to connect to the second support component and also connect to the first purlin thereby connecting the second support component to the purlin. Preferably, the connector is a T-bolt or tek-screw. Preferably, the connector is configured to snap into an opening in the at least one of the purlin. According to preferred embodiments, the second support component has a first end comprising a T-shaped portion configured to connect to the channel of the first support component and a second end comprising a lower channel configured to connect to the connector, as shown in FIG. 3C.

FIG. 4A is top perspective view of a photovoltaic panel structure 400 according to another embodiment of the disclosure. FIG. 4B is a top perspective view of the photovoltaic panel structure 400 of FIG. 4A partially assembled and showing a pair of second support components 442 above openings 483 for each purlin 403 and connectors 486 (screw or bolt or rivet) configured to attach the second components 442 to the purlins 403.

FIG. 5A is bottom perspective view of a photovoltaic panel assembly 501 according to another embodiment of the disclosure. FIG. 5B is a top exploded view of the photovoltaic panel assembly 501. FIG. 5C is a side view of a portion of a photovoltaic panel structure 500 showing an alternative first support component 531 comprising a top surface 535 and a parallel or substantially parallel bottom surface 536. FIG. 5C also shows second support component 542 having a T-shaped top portion connected to first support component 531 (specifically via a channel at the bottom of component 531) and a bottom portion connected to purlin 503 via screw or bolt or rivet 586. FIG. 5D is a close-up view of the first support component structures 531 shown in FIG. 5A.

FIG. 6A is a top view of photovoltaic panel structure 600 including unassembled panels 611 according to another embodiment. FIG. 6B is a close-up view of a pair of panels 611 showing the unassembled first support components 631 and second support components 642. FIG. 6C is a side view of photovoltaic panel structure 600 assembled with panel 601 supported on purlin 603 using support 622. Support 622 includes first support component 631 connected to second support component 642, which is connected to purlin 603 by bolt or screw or rivet 686.

FIG. 7 is photovoltaic panel structure 700 including panel assemblies 701 connected to purlins 703 via channel rail supports 799 connected to side rails (not visible on sides of panel assemblies 701). FIG. 7 also shows assembled and unassembled first support components 731 and assembled and unassembled second support components 742 according to another embodiment of the invention. FIG. 7 also shows adjacent higher first support components 761 paired with each first support components 731 to allow adjacent panels to be assembled at different levels (discussed further below). Second support components 742 are connected to purlin 703 using bolt or screw or rivet 786 inserted into purlin opening or slot 783. As shown, each pair of first support components 731 and adjacent higher first support components 761 are preferably connected to the same second support components 742, but preferably are configured with different thicknesses or heights to allow the adjacent panels to be at different levels.

First support components 731 and adjacent higher first support components 761 are further shown with black top surfaces to indicate an adhesive tape (or glue), and include a gasket, used to attach first support components 731 to the bottom of panel 701.

Figure 8:
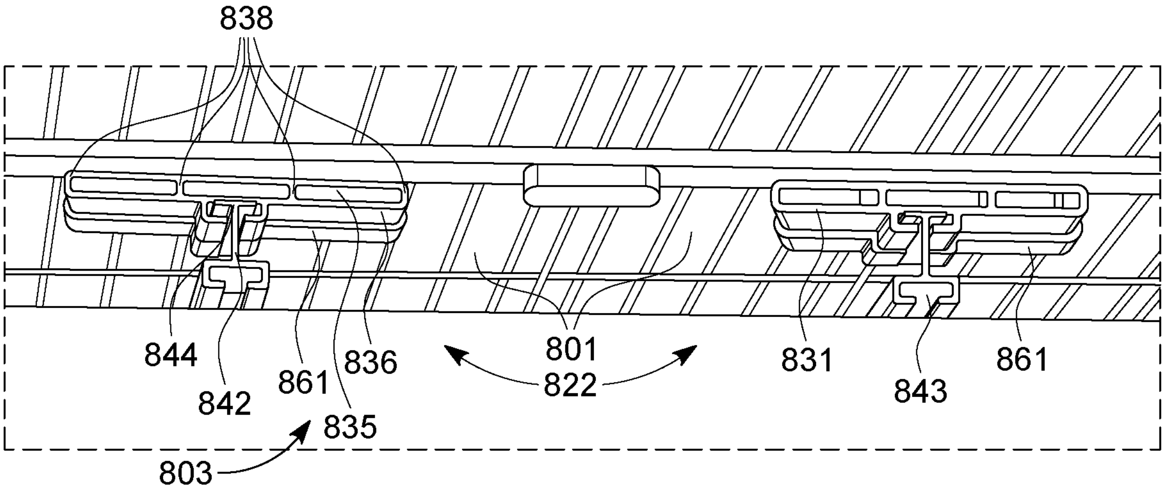
FIG. 8 is a bottom side perspective side view of a photovoltaic panel structure according to another embodiment of the disclosure.

FIG. 8 is a front, underside view of a pair of support structures 822, each including a first support component 831 connected to a second support component 842 which is connected to purlin 803. Also shown is adjacent higher first support component 861 also connected to second support component 842. As shown, first support component 831 comprises a top planar surface 835 configured to attach to the bottom of panel 801 and bottom planer surface 836 and vertical supports 838 in between the top planar surface 835 and bottom planer surface 836. The second support component 842 is connected to purlin 803. The second support component 842 comprises a T-shaped top portion 844 configured to slidably fit into the channel at the bottom of first support component 831 and a bottom portion including channel 843 for slidably connected to a bolt or screw (not shown) attached to purlin 803.

Figure 9A:
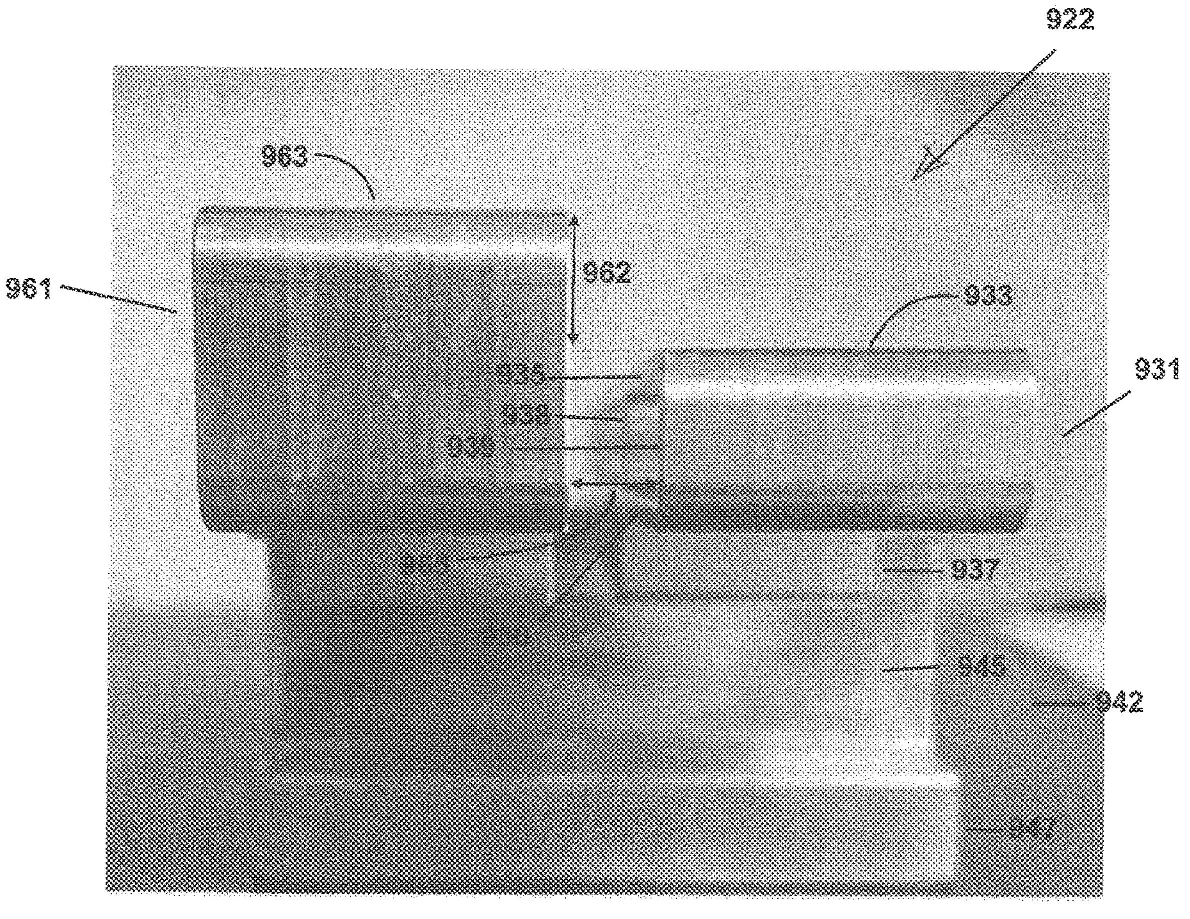
FIG. 9A is a side view of a support structure for a photovoltaic panel structure according to another embodiment of the disclosure.
Figure 9B:
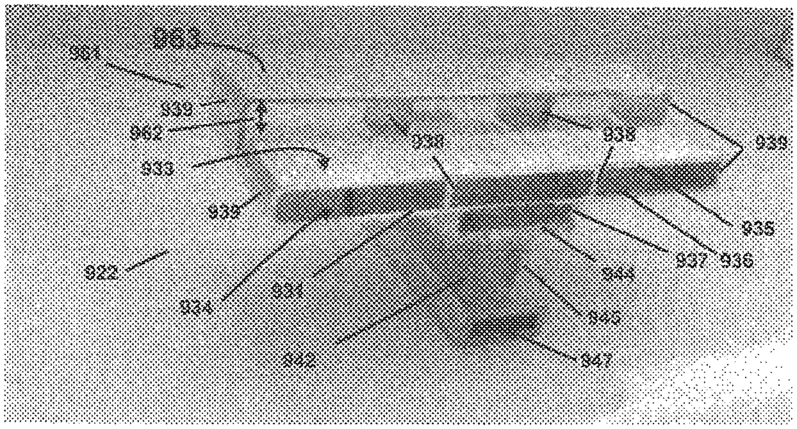
FIG. 9B is a front side perspective view of the support structure shown in FIG. 9A.

According to preferred embodiments, the solar panel structure comprises rows of panels at are shingled or are assembled at different levels so that panels in a column overlap slightly at top and bottom edges. FIGS. 9A-B show a support 922 configured to allow stepped panels by including a first top surface 963 at a higher or elevated level compared to the second top surface 933 and separated by vertical gap 962, preferably about 0.2 to 1 inch. According to preferred embodiments, vertical gap 962 is configured to account for the summation of the thickness of the actual solar panel and the thickness of the gasket 231. For example, current frameless solar panels are approximately 0.19 inches thick and a sample gasket is approximately 0.25 inches thick and thus the vertical gap 962 would be about 0.44 inches. As another example, thicker solar panels provide a certain R-insulation value and when used in the system the vertical gap 962 could be greater than 1 inch, preferably 1 to 3, more preferably 2 to 3 inches. Using support 922 in FIG. 9A-B, first top surface 963 would be connected to the bottom edge of a first panel, while second top surface 933 would be connected to top edge of the second panel, for example. The stepped panels allow the overall panel structure to be inclined allowing for improved alignment and improved run-off of rain and snow.

As shown, structure 922 comprises first support component 931 including a top planar surface 935 providing a top surface 933 configured to attach or connect to the bottom surface of a first panel (not shown) and adjacent first support component 961 having a top surface 963 which is higher or elevated relative to top surface 933. The vertical gap 962 between top surface 963 and top surface 933 is preferably between 0.2 to 1.5 inches, more preferably between 0.5 to 1 inch. Alternative embodiments are described above. This allows the panel attached to top surface 963 to be assembled with a slight overlap relative to the adjacent panel attached to top surface 933.

Preferably, the structure 922 comprises one or more foam spacers (not shown) inserted in horizontal gap 965 between first support component 931 and adjacent first support component 961. Preferably, the foam spacers are configured to set the desired distance between the first support component 931 and adjacent first support component 961 and allow for expansion/contraction between adjacent panels caused by, for example, exposure to high/low temperatures.

FIG. 9B shows a front view of support structure 922 comprising a first support component 931 connected to a second support component 942 and adjacent first support component 961 also connected to a second support component 942. First support component 931 comprises a top planar surface 935 providing a top surface 933 configured to attach or connect to the bottom surface of a first panel (not shown) and a parallel or substantially parallel bottom planar surface 936 separated by two or more vertical supports 938 and a pair of end vertical supports 939 providing a gap 934 (preferably between 0.2 to 1 inch).

Adjacent first component 961 preferably includes a similar structure compared to first support component 931 but includes a higher top surface 963 provided by larger vertical gap compared to vertical gap 934 and/or one or more additional layers of planar surfaces 935/936 or otherwise configured to provide the higher top surface 963 compared to the lower top surface 933.

First support component 931 comprises a channel 937 connected or attached or integral to the bottom planar surface 936 and configured to receive a corresponding top component (e.g., T-shaped component 944 shown in FIG. 9) of the second support component 942. The top component of the second support component 942 is configured to slide into the channel 937 to connect the first support component 931 and the second support component 942. Preferably, the second support component 942 is T-shaped or I-shaped, wherein the top portion 944 is configured to insert into channel 937. As shown in FIG. 9, second support component 942 further comprises channel 947 connected to a vertical component 945 and configured to connect to the purlin (not shown) using a bolt or screw or rivet or other means for connecting (not shown).

According to another preferred embodiment, the structure further comprises at least one foam spacer in between at least one top end edge support and at least one bottom end edge support of adjacent photovoltaic panel assemblies. According to preferred embodiments, the foam spacer is a field installation guide that can be left in place or removed to ensure appropriate spacing between the top end edge support of one panel and the bottom end edge support of an adjacent overlapping panel.

According to another embodiment, the at least one top end edge support and at least one bottom end edge support of a first photovoltaic panel assembly each comprise a first support component attached to a bottom surface of the first photovoltaic panel assembly and a second support component attached to a purlin and wherein the at least one top end edge support of a second photovoltaic panel assembly (i) is adjacent to the bottom end edge of the first photovoltaic panel assembly and (ii) comprises a first support component attached to a bottom surface of the second photovoltaic panel assembly and also connected to the second support component of the first photovoltaic panel assembly to thereby affix the second photovoltaic panel assembly to the purlin so that the bottom end edge of the first photovoltaic panel assembly and the top end edge of the second photovoltaic panel assembly are connected to the purlin with the same second support component.

According to another embodiment, each top end edge support and each bottom end edge support comprise at least one surface configured to adhere to the bottom of photovoltaic panel assembly. Preferably, the at least one surface is an adhesive surface. Preferably, the adhesive surface comprises VHB tape (i.e., Very High Bond tape) or glue or other structural adhesive such as silicon or other means for adhering. According to preferred embodiments, different chemistry lines of VHB tape can be used depending on the components of the system, each of which have different structural properties. According to further preferred embodiments, the adhesive surface comprises G90F tape (made by 3M). According to further preferred embodiments, the adhesive surface comprises glue.

According to another embodiment, the structure further comprises a first photovoltaic panel assembly and an adjacent second photovoltaic panel assembly, wherein the at least one top end edge support of the adjacent second photovoltaic panel assembly is shorter than the at least one bottom end edge support of the first photovoltaic panel assembly so that the bottom end edge of the first photovoltaic panel assembly is higher and/or overlaps the top end edge of the adjacent second photovoltaic panel assembly, for example, using a support 922 as shown in FIG. 9. According to preferred embodiments, the adjacent panel is higher by a distance of 962 (described above) and so that the bottom edge of the adjacent upper panel can shingle/overlap over the upper edge of the lower adjacent panel.

According to another embodiment, the second support component is attached to the first purlin with at least one bracket. According to one preferred embodiment, the bracket is configured to be connected to the second support component and also configured to be connected to the first purlin. According to one alternative embodiment, the second support component comprises a bracket portion configured to connect to the first purlin (e.g., the bracket is integral to the second support component or part of the second support component).

Preferably, the bracket is connected to the first purlin with at least one bracket connector. Preferably, the at least one bracket connector is a tek-screw or bolt or rivet.

According to another embodiment, the plurality of photovoltaic panel assemblies comprises a first photovoltaic panel assembly and an adjacent second photovoltaic panel assembly, wherein the first side rail (i.e., right side support)

of the first photovoltaic panel assembly is connected to a common channel rail as the second side rail (i.e., left side support) of the adjacent photovoltaic panel assembly with a support connector or connectors.

Figure 34A:
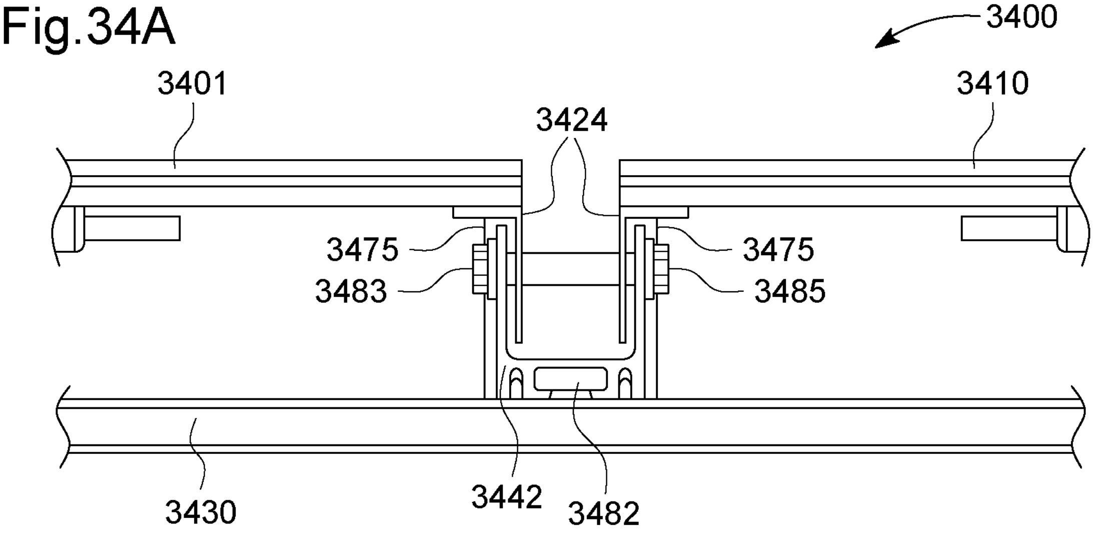
FIG. 34A is a front view of side channel rail connections of a pair of adjacent assembled photovoltaic panels.

For example, FIG. 34A is a side view of a section of photovoltaic panel assembly structure 3400 showing a side edge of photovoltaic panel assembly 3401 and a side edge of adjacent photovoltaic panel assembly 3410. Side edge of photovoltaic panel assembly 3401 and side edge of adjacent photovoltaic panel assembly 3410 are each connected to purlin 3430 by inverted L-shaped side rails 3424 attached to the bottom of each photovoltaic panel assembly, as shown. Both inverted L-shaped side rails 3424 are connected to U-shaped channel rail 3442, with each L-shaped side rail 3424 secured to a side of the U-shaped channel rail 3442 by support connectors 3483/3485 (which are overlapping in the figure so appear as single bolt or screw but are preferably separate, offset, connectors for each L-shaped side rail 3424). Thus, adjacent side edges of each, neighboring, photovoltaic panel assembly 3401/3410 are connected to purlin 3430 by a single U-shaped channel rail 3442. U-shaped channel rail 3442 is connected to purlin 3430 by bolt or screw or rivet 3482. In one embodiment, an inverted U-shaped 3475 gasket is added to the top of each side of the U-shaped channel rail 3442 to reduce the potential for water intrusion beneath the panels and reduce the friction or impact of the top of the U-shaped channel rail 3442 against the horizontal portion of the L-shaped side rail 3424 and/or bottom of the panels. FIG. 34A shows a preferred embodiment allowing adjacent panels to be connected with a single channel rail to reduce the overall number of components required for the structure 3400.

Figure 34B:
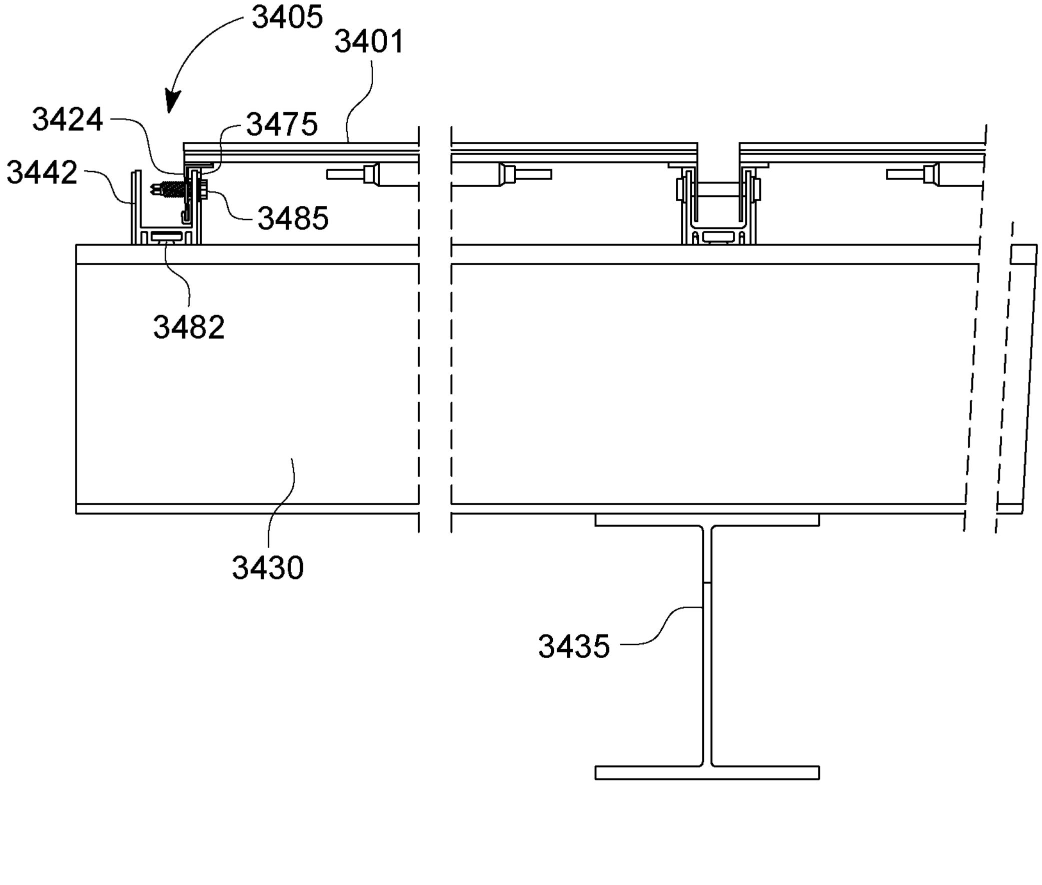
FIG. 34B is an expanded side perspective view of FIG. 34A showing the end side channel rail connection of an assembled photovoltaic panel.
Figure 34C:
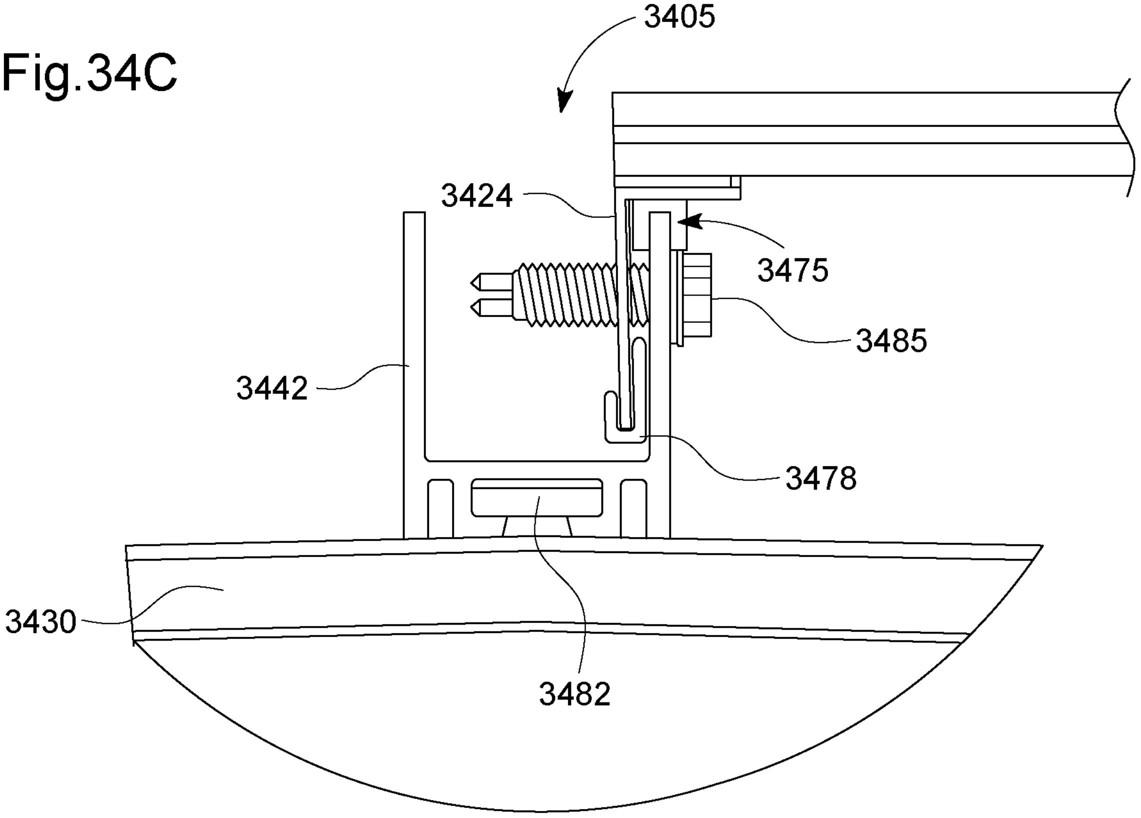
FIG. 34C is a close-up side perspective view of the end side channel rail connection of the assembled photovoltaic panel of FIG. 34B.

FIG. 34B shows the connection shown in FIG. 34A and also shows the opposed edge portion 3405 of photovoltaic panel assembly 3401. As shown, end edge portion 3405 of photovoltaic panel assembly 3401 is secured to purlin 3430 by inverted L-shaped side rail 3424 attached to the bottom of the panel on one side and also connected to U-shaped channel rail 3442 on the other side using connector 3485. U-shaped channel rail 3442 is connected to purlin 3430 bolt or screw or rivet 3482. Gasket 3475 (shown as inverted U-shaped component) is incorporated at the top of the side of the U-shaped channel rail 3442 and may support or be attached to L-shaped side rail 3424. FIG. 34B shows a preferred embodiment allowing end edge portions of panels to be connected using the same components (e.g., L-shaped side rail 3424, U-shaped channel rail 3442 and bolt or screw or rivet 3482/3485) as used for interior and/or adjacent panels to reduce the overall number of components required for the structure 3400. FIG. 34C is a close-up view of the end edge portion 3405 of photovoltaic panel assembly 3401 shown in FIG. 34B including optional or additional J-shaped gasket 3478 attached to the bottom of L-shaped 3424.

Preferably, the support connector 3485 is a screw (e.g., tek-screw) or bolt or rivet or glue or other means for connecting.

According to another embodiment, the structure further comprises a gasket 3478 attachable to the bottom of the side rail 3424.

According to another embodiment, the structure further comprises a gasket 3475 attachable to the top of the side rail 3424.

According to another embodiment, the structure further comprises a gasket 3478 attachable to the bottom of the side rail 3424 and a gasket 3475 attachable to the top of the side rail 3424.

Figure 10:
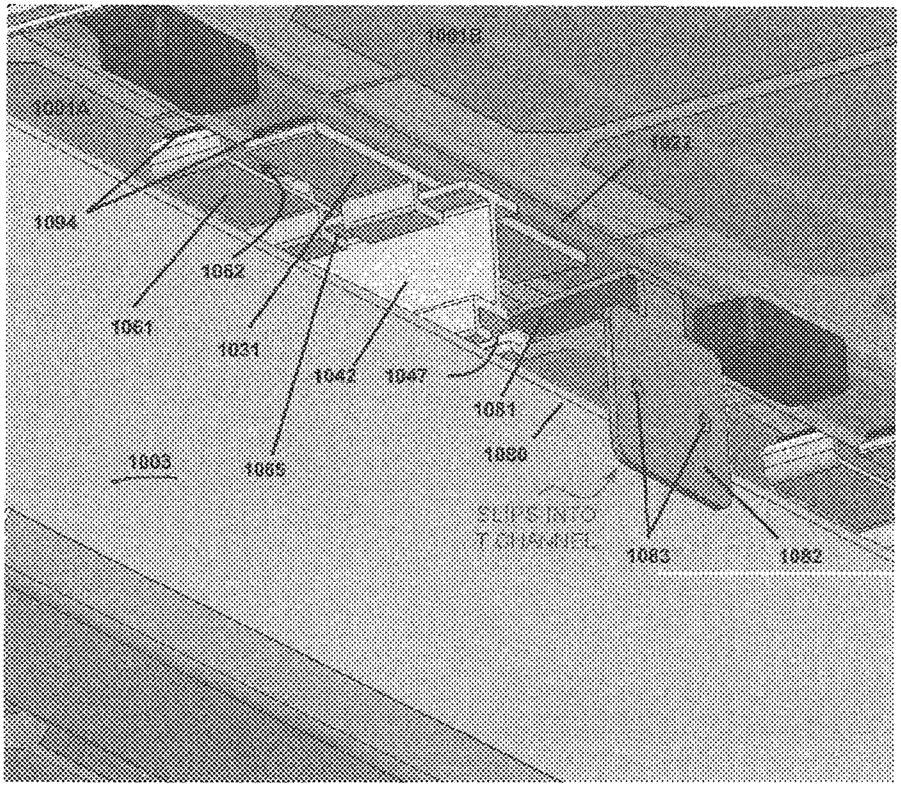
FIG. 10 is a side perspective bottom view of a support bracket for a photovoltaic panel structure according to another embodiment of the disclosure.
Figure 11:
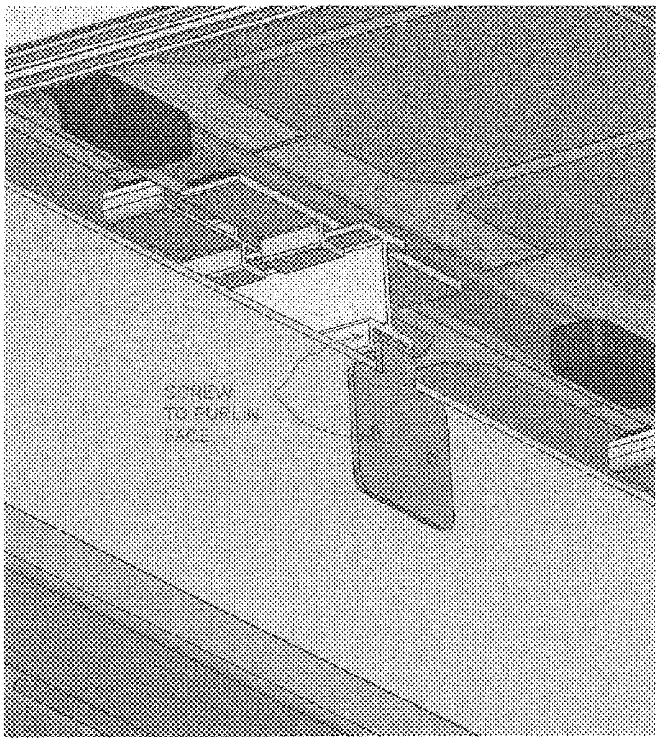
FIG. 11 is a side perspective bottom view of the support bracket of FIG. 10 assembled into the support structure for the photovoltaic panel.

FIG. 10 is a bottom view showing a support 1022 based on support 922 shown in FIG. 9. Support 1022 is shown supporting both panel 1001A and adjacent lower, shingled, panel 1001B on purlin 1003. Support 1022 comprises a second support component 1042 including a channel 1047 and first support component 1031 supporting panel 1001B and higher support component 1061 supporting panel 1001A. Support 1022 further comprises bracket 1080 configured to connect second support component 1042 to purlin 1003. Preferably, as shown in FIG. 10, bracket 1080 is L-shaped comprising a prong 1081 configured to slidably fit into channel 1047 and a perpendicular or substantially perpendicular plate 1082. Plate 1082 is configured to attach to a surface of purlin 1003 and preferably includes at least one opening 1083 to insert bolts or screws to connect the plate 1082 to purlin 1003, as shown. Preferably, panels 1001A and 1001B are attached to top surfaces of components 1061 and 1031 using tape, glue, or adhering means 1094, as shown. As shown in FIG. 10, first support component 1031 comprising a single horizontal surface, while higher support component 1061 comprises two parallel or substantially parallel horizontal surfaces with a vertical gap 1062 in between providing the elevation (as more clearly described in FIG. 9) allowing panel 1001A to be higher than panel 1001B. FIG. 11 shows the support 1022 assembled to connect the panels to the purlin.

In embodiments, the structure 1022 comprises one or more foam spacers (not shown) inserted in gap 1065 between first support component 1031 and adjacent first support component 1061. Preferably, the foam spacers are configured to set the desired distance between the first support component 1031 and adjacent first support component 1061 and allow for expansion/contraction between adjacent panels caused by, for example, exposure to high/low temperatures.

Preferably, the prong is flat and substantially perpendicular to the plate surface.

Preferably, the plate surface is configured to connect to a side of the first purlin and wherein the side of the first purlin is substantially perpendicular to the prong. Preferably, the plate surface includes at least one opening configured to insert a connector to attach the plate component to the first purlin, preferably the connector is a bolt, rivet, screw (e.g., tek-screw) or other means for connecting. Preferably, the plate component is configured to insert into a plate channel of the first purlin.

According to another embodiment, the plate component has a plate component width and the prong has a prong width and wherein the plate component width is at least 1.5× as large as the prong width, preferably at least 2× as large as the prong width.

Preferably, the L-shaped bracket to secure the second component to the purlin is angled to further hold or secure the support to the purlin.

Figure 12:
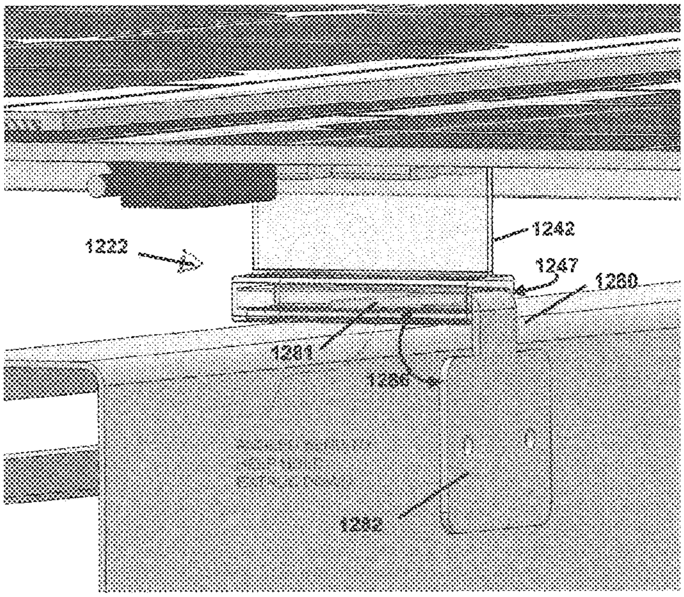
FIG. 12 is a side perspective side view of an assembled support bracket for a support structure for a photovoltaic panel according to another embodiment.

FIG. 12 shows support 1222 including second support component 1242 and bracket 1280 wherein the angle 1286 between prong 1281 and plate 1282 is less than 90 degrees to further secure the prong 1281 into channel 1247.

Preferably, the prong and plate component form an angle less than 90 degrees, preferably less than 87 degrees, more preferably less than 85 degrees. According to preferred embodiments, the angle is between 80 and 90 degrees, more preferably between 85 and 98 degrees. Preferably, the angle is shallow enough to allow parts to slot into the I-beam support.

According to another embodiment, the second support component has an L-shaped structure including a second support contact component and a substantially perpendicular second support vertical component, wherein the second support vertical component comprises a proximal end connected to the second support contact component and a distal end comprising a first wing configured to substantially slide into a first channel of the first component and configured substantially perpendicular to the second support vertical component and a second wing configured to substantially slide into a second channel of the first component and configured substantially perpendicular to the second support vertical component.

Figure 13:
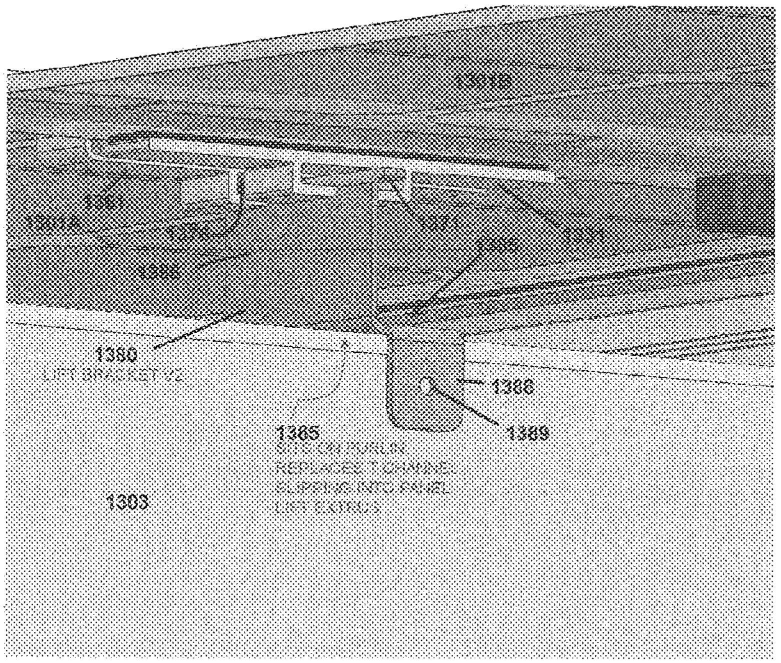
FIG. 13 is a side perspective bottom view of a support bracket for a photovoltaic panel according to another embodiment of the disclosure.

FIG. 13 shows a variation of the second support component comprising a lift bracket 1380 connected to first support component 1331 attached to the bottom of panel 1301B and a higher first support component 1361 attached to higher panel 1301A. Lift bracket 1380 comprises second support contact component 1385 configured to contact the top surface of purlin 1303 and a perpendicular or substantially perpendicular second support vertical component 1386, as shown. Preferably, second support vertical component 1386 comprises a proximal end connected to the second support contact component 1385 and a distal end comprising a first wing 1371 configured to substantially slide into a first channel of the first support component 1331 and configured perpendicular or substantially perpendicular to the second support vertical component 1386 and a second wing 1376 configured to substantially slide into a second channel of the higher first support component 1361 and also configured perpendicular or substantially perpendicular to the second support vertical component 1386. As shown in FIG. 13, lift bracket 1380 combines the second support component and the component configured to attached to purlin 1303.

Lift bracket 1380 preferably also comprises connecting plate 1388 perpendicular or substantially perpendicular to the contact surface 1385 and configured to connect to a first side of the first purlin 1303, as shown. Preferably, connecting plate 1388 comprising at least one opening 1389 to insert a bolt or screw or rivet to secure the connecting plate 1388 (and therefore the lift bracket 1380) to purlin 1303.

As shown in FIG. 13, first wing 1371 and second wing 1376 appear to have the same height or level, while first support component 1331 includes a single surface layer while higher first support component 1361 appears to have at least two stack surface layers (as shown in FIG. 9) resulting panel 1301A being higher than panel 1301B. As an alternative embodiment, second wing 1376 can be configured to be higher than first wing 1371 to allow both the first support component 1331 and the higher first support component 1361 to have the same single surface configuration (as shown as first support component 1331) to allow panel 1301A to be higher than adjacent panel 1301B.

Figure 14:
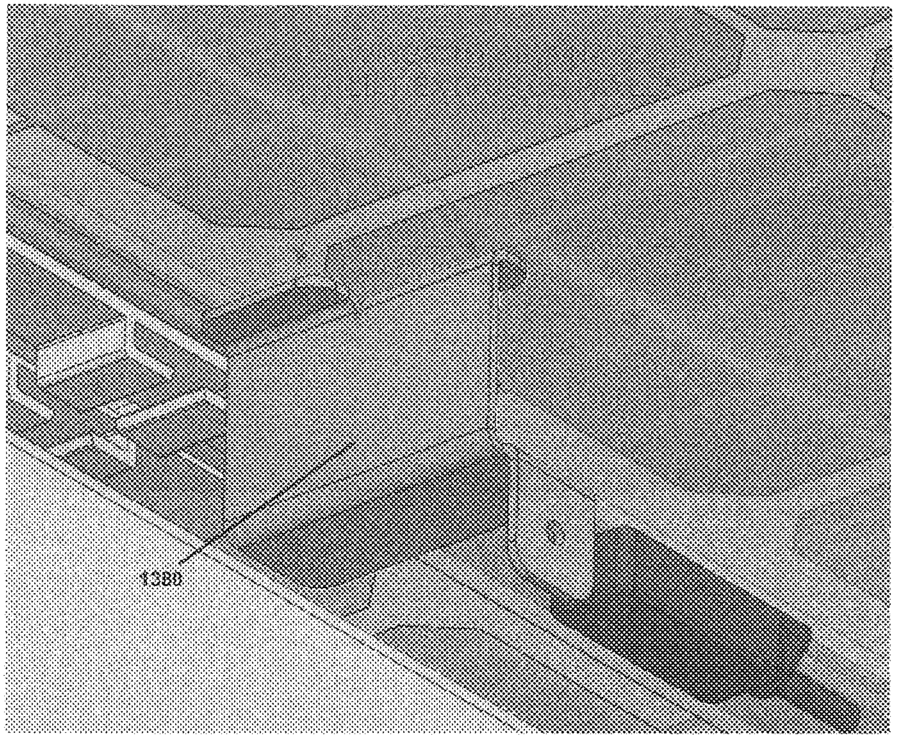
FIG. 14 is a side perspective bottom view of the support bracket of FIG. 13 unassembled and configured for insertion into the support for the photovoltaic panel.

FIG. 14 shows a bottom view of support lift bracket 1380 aligned to be inserted to the first component channel and attached to the purlin. FIG. 15 shows an alternative embodiment side view of support lift bracket 1380. FIG. 15 shows second support contact component 1385 overhanging purlin 1503. Preferably, second support contact component 1385 further comprises an additional wing (not shown) shaped to conform to the purlin front bend 1513 to further secure the support lift bracket 1380 to purlin 1503.

Preferably, the first wing and the second wing extend from the distal end in opposing directions, as shown in FIG. 13.

Preferably, the first wing and the second wing each have a wing width along the distal end and each wing width is approximately 50% of the distal end width.

Preferably, the second support contact component comprises a contact surface configured to contact a top surface of the first purlin and further comprises at least one connecting plate substantially perpendicular to the contact surface and configured to connect to a first side of the first purlin.

According to preferred embodiments, the at least one connecting plate includes at least one opening to insert a connector to attach the plate surface to the first purlin, preferably the connector is a bolt, screw, rivet, or tek-screw.

According to preferred embodiments, the second support contact component further comprises a second connecting plate substantially perpendicular to the contact surface and configured to connect to a second side of the first purlin. Preferably, the second connecting plate includes at least one opening to insert a connector to attach to the second side of the first purlin.

According to preferred embodiments, the second support contact component comprises a first end and an opposing second end, wherein the first connecting plate is connected to the first end and the second connecting plate is connected to second end.

Yet another aspect of the invention relates to a solar panel structure comprising:

- a support structure means including a plurality of essentially parallel support means;
- a plurality of photovoltaic panel assemblies, wherein each photovoltaic panel assembly comprises a top end edge, a bottom end edge, a first side edge and a second side edge and wherein the first side edge is connected to a first parallel support means and the second side edge is connected to a second parallel support means; and
- at least one top end edge support means between the first side edge and the second side edge and at least one bottom end edge support means between the first side edge and the second side edge, where the top end edge support means is affixed to a first purlin orthogonal to the plurality of essentially parallel support means and where the bottom end edge support means is affixed to a second purlin essentially parallel to the first purlin.

FIGS. 16A-B show a solar panel structure 1600 including alternative lift support structures 1621.

FIG. 17A is a bottom view of panel 1701 and first support structures 1731 attached thereto. FIG. 17B is a top view of panel 1701 and unassembled first support structures 1731 and unassembled side supports 1799 and tapes 1798. FIG. 17C shows support structures 1721 comprising first support component 1731, second support component 1742 and connector bracket 1780 for securing second support component 1742 to purlin 1703. As shown in FIG. 17C, second support component 1742 comprises a shaped top portion configured to insert into the channel of first support component 1731 and a J-shaped bottom portion configured to attached to connector bracket 1780. FIG. 17D is a bottom view of panel 1701 and first support structures 1731 attached to both ends of the panel 1701.

FIG. 18A-C shows a solar panel structure 1800 including alternative support structures 1821. FIG. 18A shows the solar panel structure 1800 including unassembled panels 1811 and support structures 1821. FIG. 18B is a close-up partial view of the solar panel structure 1800 shown in FIG. 18A showing unassembled second support component 1842, bracket 1880 and screws/bolt/rivet 1881. FIG. 18C is a side view of the solar panel structure 1800 shown in FIG. 18A including assembled panel 1801 on purlin 1803. Assembled panel 1801 is connected to purlin 1803 with panel side connectors 1899 and further secured to purlin 1803 with support structures 1821. Support structure 1821 comprises first support component 1831 connected to the bottom of assembled panel 1801. First support component 1831 is also connected to second support component 1842 which is connected to purlin 1803 with bracket 1880 having at least one opening 1881 to secure the bracket 1880 to the purlin 1803 with one or more screws or bolts or rivets 1881.

FIGS. 19A-B show a solar panel structure 1900 including alternative support structures 1921.

FIG. 20A is a bottom view of solar panel 2001 including first support structures 2031 attached to the bottom of the panel 2001. FIG. 20B is a top view of the solar panel structure 2001 including unassembled first support structures 2031. FIG. 20C is a close-up partial side view of the solar panel structure 2000 including assembled panel 2001 on purlin 2003. Assembled panel 2001 is connected to purlin 2003 with side panel connectors and channel rails (not shown, describe above) and further secured to purlin 2003 with support structure 2021. Support structure 2021 comprises first support component 2031 connected to the bottom of assembled panel 2001. First support component 2031 is connected to second support component 2042 which is connected to purlin 2003 with bracket 2080 having at least one opening 2081 to secure the bracket 2080 to the purlin 2003 with a bolt or screw or rivet 2081.

Figure 21A:
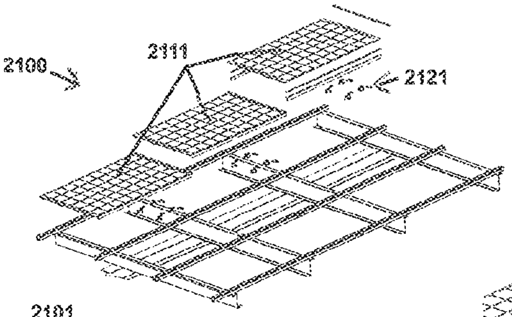
FIG. 21A is a top perspective view of an unassembled photovoltaic panel structure according to another embodiment of the disclosure.
Figure 21B:
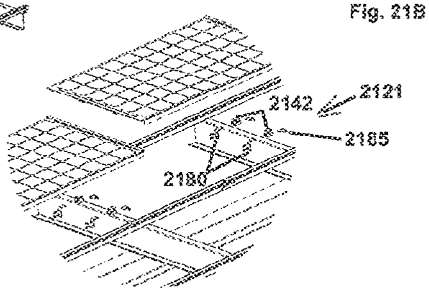
FIG. 21B is an exploded side perspective partial view of the structure of FIG. 21A showing unassembled photovoltaic panels.
Figure 21C:
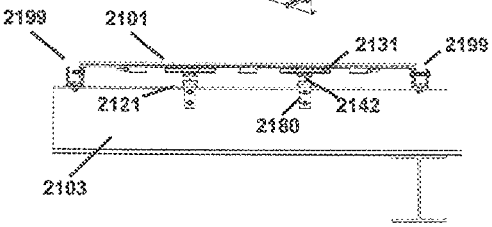
FIG. 21C is a front view of a photovoltaic panel structure of FIG. 21A assembled according to one embodiment of the disclosure.

FIG. 21A-C shows a solar panel structure 2100 including alternative support structures 2121. FIG. 21A shows the solar panel structure 2100 including unassembled panels 2111 and support structures 2121. FIG. 21B is a close-up partial view of the solar panel structure 2100 shown in FIG. 21A showing the components of support structure 2121 including second support component 2142, bracket 2180 and second opposing bracket 2185. According to preferred embodiments, second opposing bracket 2185 is added and is configured to clip around the purlin flange edge to prevent pull-up during wind uplift events. Preferably, second opposing bracket 2185 is configured to maintain the second support component 2142 securely fastened to the upper edge of the purlin. FIG. 21C is a side view of the solar panel structure 2100 shown in FIG. 21A including assembled panel 2101 assembled onto purlin 2103. Assembled panel 2101 is connected to purlin 2103 with panel connectors 2199 and further secured to purlin 2103 with support structures 2121. Support structure 2121 comprises first support component 2131 connected to the bottom of assembled panel 2101. First support component 2131 is connected to second support component 2142 which is connected to purlin 2103 with bracket 2180 and second opposing bracket 2185 to secure the bracket 2180 to the purlin 2103.

Figure 22A:
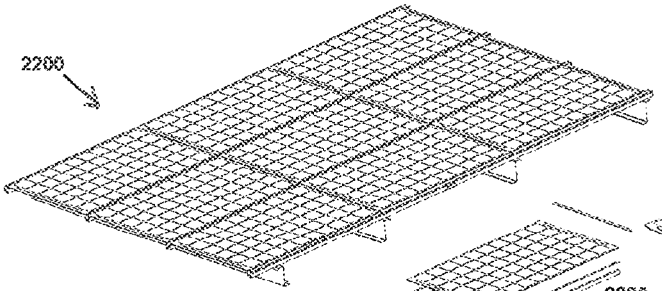
FIG. 22A is a top perspective view of a photovoltaic panel structure according to another embodiment of the disclosure.
Figure 22B:
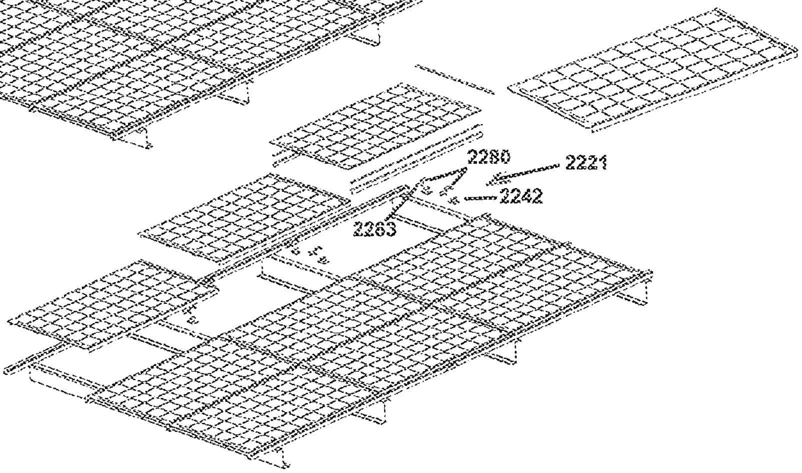
FIG. 22B is a top perspective view of the photovoltaic panel structure of FIG. 22A partially assembled.

FIGS. 22A-B show a solar panel structure 2200 as assembled (FIG. 22A) and partially assembled (FIG. 22B). FIG. 22B shows alternative support structures 2221 including second support component 2242 and bracket 2280 (and screws 2283).

FIG. 23A is a bottom view of solar panel 2301 showing first support components 2331 attached to the bottom of the panel 2301. FIG. 23B is a top view of the solar panel 2301 of FIG. 23A showing unassembled support structures 2331. FIG. 23C is a side view of the solar panel structure 2300 including assembled panel 2301 on purlin 2303. Assembled panel 2301 is connected to purlin 2303 with panel connectors (not shown) and further secured to purlin 2303 with support structure 2321. Support structure 2321 comprises first support component 2331 connected to the bottom of assembled panel 2301. First support component 2331 is connected to second support component 2342 which is connected to purlin 2303 with bracket 2380 to secure the bracket 2380 to the purlin 2303 with bolts or screws or rivets 2383.

FIG. 24A-C shows a solar panel structure 2400 including panels 2401 and alternative support structures 2421. FIG. 24A shows the solar panel structure 2400 including unassembled panels 2401 and support structures 2421. FIG. 24B is a close-up partial view of the solar panel structure 2400 shown in FIG. 24A showing the components of support structure 2421 including second support component 2442 and bracket 2480. FIG. 24C is a side view of the solar panel structure 2400 shown in FIG. 24A including assembled panel 2401 on purlin 2403. Assembled panel 2401 is connected to purlin 2403 with panel connectors 2499 and further secured to purlin 2403 with support structures 2421. Support structure 2421 comprises first support component 2431 connected to the bottom of assembled panel 2401. First support component 2431 is connected to second support component 2442 which is connected to purlin 2403 with bracket 2480 to secure the second support component 2442 to the purlin 2403.

FIGS. 25A-B shows a solar panel structure 2500 as assembled (FIG. 25A) and partially assembled (FIG. 25B). FIG. 25B shows alternative second support component 2542 having longer dimension compared to the second support components described above.

Another aspect of the invention relates to solar panel structures including rail center supports in between the side supports and configured to further secure the panels to the supporting purlin or other structure.

FIG. 26A is a partial side view of solar panel structure 2600 showing panel 2601 connected to purlin 2603 by connectors 2699 (e.g., side rails/channel rails) and further secured using center support structures 2621. FIG. 26B is a close-up view of FIG. 26A showing center support structures 2621 including underside receiving center rail component 2631 connected to second support component 2642 which is secured to purlin 2603 with bolt or screw or rivet 2686 or various second support components discussed herein. FIG. 26C shows a bottom view of panel 2601 and unassembled underside receiving center rail support components 2631. FIG. 26D shows the bottom view of panel 2601 and assembled underside receiving center rail components 2631.

One embodiment relates to a solar panel structure comprising:

a support structure including a plurality of essentially parallel panel side supports and a plurality of essentially parallel central panel supports, wherein the support structure comprises at least one of the plurality of essentially parallel central panel supports between two of the plurality of essentially parallel panel side supports; and a plurality of photovoltaic panel assemblies, wherein each photovoltaic panel assembly comprises a top surface, a bottom surface, top end edge, a bottom end edge, a first side edge and a second side edge and wherein the first side edge is connected to a first parallel panel side support and the second side is connected to a second parallel panel side support;

wherein each photovoltaic panel assembly comprises at least one underside receiving center rail attached to the bottom surface and essentially parallel to the first side and the second side and configured to slidably connect to at least one of the plurality of essentially parallel central panel supports to support a central portion of the photovoltaic panel assembly.

Figure 27A:
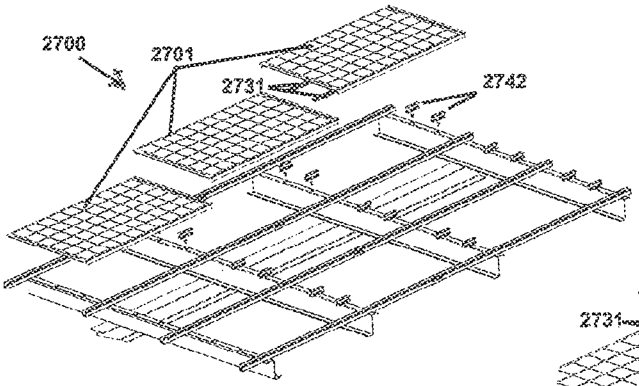
FIG. 27A is a top perspective view of an unassembled photovoltaic panel structure according to another embodiment of the disclosure.
Figure 27B:
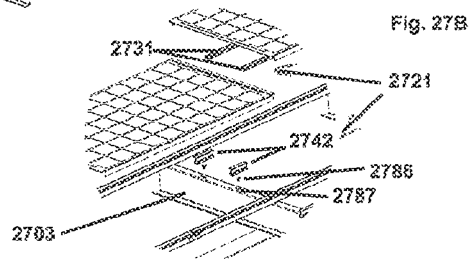
FIG. 27B is an exploded side perspective partial view of the disassembled photovoltaic panel structure of FIG. 27A.

FIG. 27A is a solar panel structure 2700 showing unassembled panels 2701 and support structures 2721 connected to or configured to be connected to purlin 2703. FIG. 27B is a close-up view of FIG. 27A showing unassembled support structures 2721 including second support components 2742 and unassembled underside receiving center rail components 2731. As shown, second support components 2742 are configured to be connect to purlin 2301 using bolts or screws 2786 inserted into slots 2787 on top surface of purlin 2703.

Figure 28:
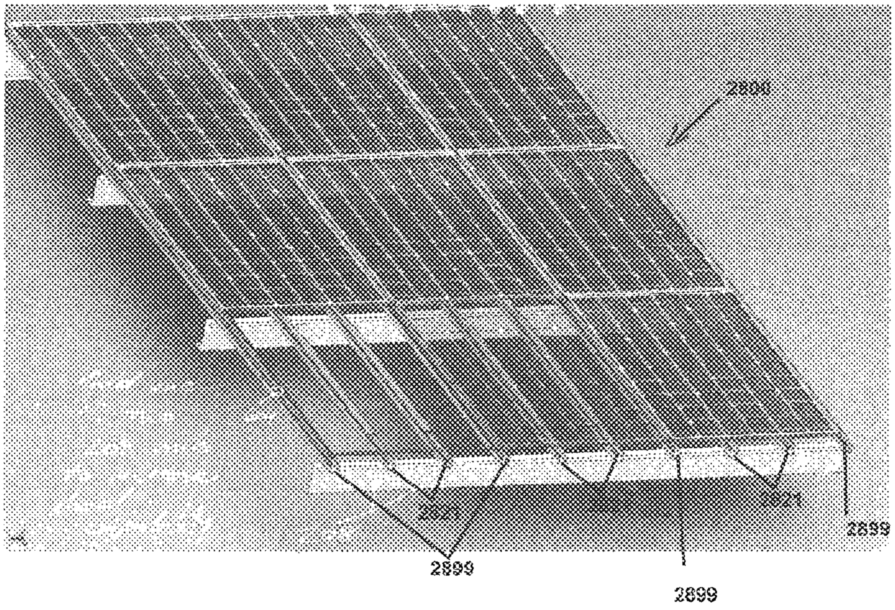
FIG. 28 is a top side perspective view of a partially assembled photovoltaic panel structure according to another embodiment of the disclosure.

FIG. 28 is a top perspective view of partially assembled solar panel structure 2800 showing side supports 2899 and center channel rail supports 2821.

FIGS. 29A-B show a solar panel structure 2900 as assembled (FIG. 29A) and partially assembled (FIG. 29B). FIG. 29B shows center rail support structures 2921 between the side support 2999, according to another embodiment of the invention. As shown, center support structures 2921 comprise underside T-shaped rail components 2931 and second/central support components 2942 (preferably U-shaped as shown) configured to receive the T-shaped rail components 2931 (preferably a pair of jointed inverted L-shaped rails to form a T-shape). According to alternative embodiments, second/central support component 2942 is a solid rail (not U-shaped channel) and T-shaped rail components 2931 could be positioned on each side or on one side of the solid rail second/central support component 2942 and attached with tek-screws, rivets, etc., for example if the solar panel structure does not have to be configured to shed water.

FIG. 30A is bottom view of solar panel 3001 having an underside receiving center rail component 3031 (including receiving channel 3037) attached to the bottom surface of panel 3001 according to another embodiment. FIG. 30B is a top view of the solar panel 3001 of FIG. 30A showing unassembled components of receiving channel rail component 3031 including a pair of L-shaped rails 3035 and tape 3036 configured to adhere the pair of L-shaped rails 3035 to the bottom of solar panel 3001 to combine to form receiving channel 3037. FIG. 30C is a side view of a portion of solar panel structure 3000 showing solar panel 3001 assembled on purlin 3003 and connected with connectors 3099 and further secured with support structures 3021. Support structures 3021 includes the pair of L-shaped rails 3035 adhered to the bottom of solar panel 3001 and combined to form receiving channel 3037 to receive second/central support rail component (not shown) which is configured to slidably fit within channel 3037 and is attached to purlin 3003 by bolt or screw or rivet 3086. FIG. 30D bottom view of solar panel 3001 and unassembled underside L-shaped rail components 3035 and tape 3036 configured to adhere the L-shaped rail components 3035 to the bottom surface of solar panel 3001 to form central receiving channel 3037 to receive second support rail component 3042.

Figure 31A:
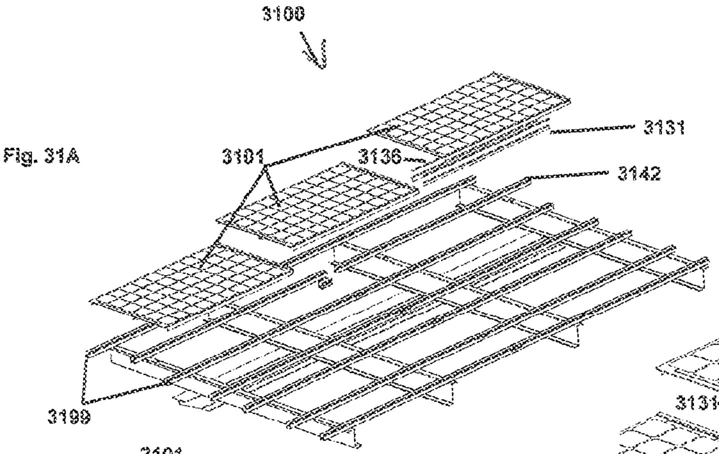
FIG. 31A is a top perspective view of an unassembled photovoltaic panel structure according to another embodiment of the disclosure.
Figure 31B:
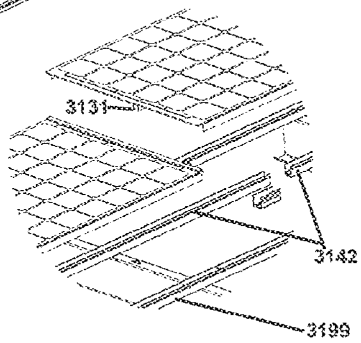
FIG. 31B is a side perspective partial view of the disassembled photovoltaic panel structure of FIG. 31A.
Figure 31C:
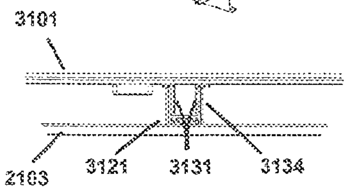
FIG. 31C is a front view of the photovoltaic panel structure of FIG. 31A assembled according to one embodiment of the disclosure.

FIG. 31A-C shows a solar panel structure 3100 including alternative support rail structures. FIG. 31A shows the solar panel structure 3100 including unassembled panels 3101, side supports 3199 and center support structures 3131/3142. Center support structures include first rail component 3131 and second channel component 3142 having bottom channel 3147 configured to slidably receive first rail component 3131. FIG. 31B is a close-up partial view of the solar panel structure 3100 shown in FIG. 31A showing the components of rail support structure 3121 including first rail component 3131 and second channel component 3142. FIG. 31C is a side view of the solar panel structure 3100 shown in FIG. 31A including assembled panel 3101 on purlin 3103. Assembled panel 3101 is connected to purlin 3103 with panel connectors (not shown) and further secured to purlin 3103 with support structures 3121. Support structure 3121 comprises first rail component 3131 connected to the bottom of assembled panel 3101. First rail component 3131 is connected to second channel component 3142 (seated within channel 3147 of component 3142) which is connected to purlin 3103 with bolt or screw or rivet 3186.

Figure 32:
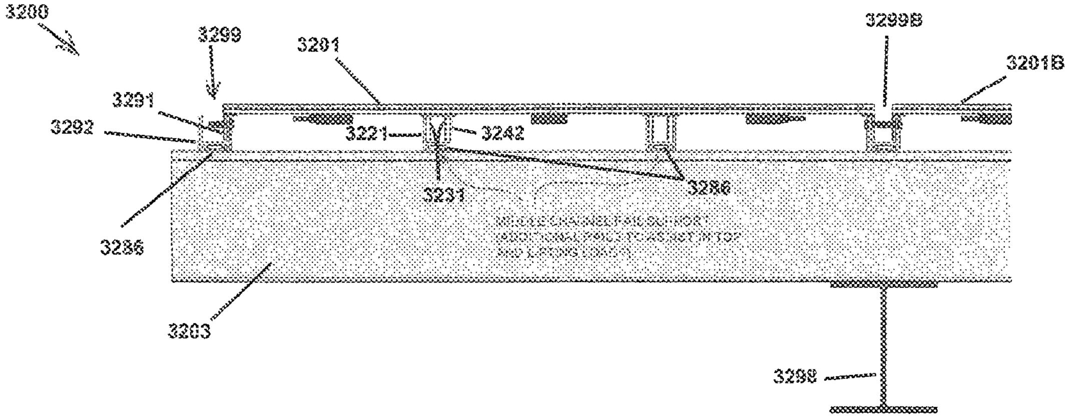
FIG. 32 is a front view of an assembled photovoltaic panel structure according to another embodiment of the disclosure.

FIG. 32 is a side view of solar panel structure 3200 including first panel 3201 and adjacent second panel 3201B (side-by-side panels vs stepped panels) and including side rail supports 3299 securing the panels to purlin 3203 (which is shown resting or assembled on perpendicular I-beam 3298). FIG. 32 shows first panel 3201 further secured to purlin 3203 by a pair of support structures 3221. Support structures 3221 comprise first support component 3231 (preferably T-shaped or shaped as two combined Ts (i.e., TT-shaped)) and configured to slidably fit within a bottom channel of second support component 3242, as shown in FIG. 32. Preferably, second support component 3242 has a U-shape and configured to receive first support component 3231. Preferably, second support component 3242 is attached or connected to purlin 3203 by bolt or screw or rivet 3286.

As shown in FIG. 32, side rail supports 3299 comprise a side rail support first component 3291 and side rail support second component 3292 which are configured to secure the sides of the panels to purlin 3203. Preferably, side rail support first component 3291 is an inverted L-shaped rail attached to the bottom side of the panel and side rail support second component 3292 is preferably U-shaped and configured to receive and be connected to side rail support first component 3291 with bolt or screw or rivet 3286 as shown.

According to preferred embodiments, the inverted L-shaped rail used for side rail support first component 3291 is the same as the first support component 3231 or is ½ of the first support component 3231 (i.e., the first support component 3231 is comprised of two combined side rail support first components 3291) to allow the same components used for both functions.

According to preferred embodiments, the second support component 3242 is used as side rail support second component 3292 and so the same second components can be used for either the side connectors or the center support structures 3221.

According to one embodiment, the solar panel structure further comprises a plurality of purlin supports configured essentially perpendicular to the plurality of essentially parallel panel side supports and the plurality of essentially parallel central panel supports, wherein the plurality of essentially parallel panel side supports and the plurality of essentially parallel central panel supports to connected to the plurality of purlin supports.

According to another embodiment, each of the plurality of essentially parallel central panel supports includes a channel for receiving each underside receiving center rail.

Preferably, the plurality of essentially parallel central panel supports has a cross-section U-shaped channel configured to receive the at least one underside receiving center rail.

Preferably, the at least one underside receiving center rail has a Π-shaped cross-section configured to slidably fit within the channel of the plurality of essentially parallel central panel supports.

Preferably, each of the plurality of essentially parallel central panel supports is connected to at least one of plurality of purlin supports by a T-bolt or tek-screw or rivet or other means for connecting.

Yet another aspect of the invention relates to a solar panel structure comprising:

a support structure including a plurality of essentially parallel panel side support means and a plurality of essentially parallel central panel support means, wherein the support structure comprises at least one of the plurality of essentially parallel central panel support means between two of the plurality of essentially parallel panel side support means; and a plurality of photovoltaic panel assemblies, wherein each photovoltaic panel assembly comprises a top surface, a bottom surface, top end edge, a bottom end edge, a first side edge and a second side edge and wherein the first side edge is connected to a first parallel panel side support means and the second side is connected to a second parallel panel side support means;

wherein each photovoltaic panel assembly comprises at least one underside receiving center rail means attached to the bottom surface and essentially parallel to the first side and the second side and configured to slidably connect to at least one of the plurality of essentially parallel central panel support means to support a central portion of the photovoltaic panel assembly.

Another aspect of the invention solar panel structures comprising connecting structures configured to allow adjacent solar panels to be assembled in a stepped or shingled relation, that is, the bottom of one panel overlying a top portion of the next panel in a column of panels. Preferably, the stepped configuration improves the draining of rain, snow and debris and/or improves the angle of the panels to capture the solar energy. Preferably, the entire structure is angled and the panels also preferably angled and shingled to provide a "roof" over the ground.

One embodiment relates to a solar panel structure comprising:

a support structure including a plurality of essentially parallel supports;

at least one purlin orthogonal to the plurality of essentially parallel supports and configured to support the plurality of essentially parallel supports;

a plurality of photovoltaic panel assemblies, wherein each photovoltaic panel assembly comprises a top end edge, a bottom end edge, a first side edge and a second side edge and wherein the first side edge is connected to a first parallel support and the second side edge is connected to a second parallel support, wherein the plurality of photovoltaic panel assemblies comprises a first photovoltaic panel assembly adjacent a second photovoltaic panel assembly;

at least one top end edge support between the first side edge and the second side edge of a first photovoltaic panel assembly and at least one bottom end edge support between the first side edge and the second side edge of the first photovoltaic panel assembly; and at least one alternative top end edge support between the first side edge and the second side edge of the second photovoltaic panel assembly and the at least one bottom end edge support between the first side edge and the second side edge of the second photovoltaic panel assembly; and wherein the at least one alternative top end edge support of the second photovoltaic panel assembly is shorter than the at least one bottom end edge support of the first photovoltaic panel assembly.

Figure 33:
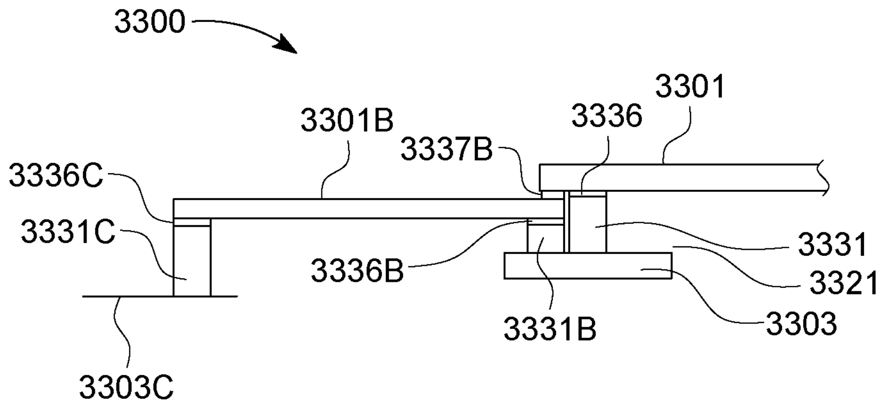
FIG. 33 is a side view of an assembled photovoltaic panel structure according to another embodiment of the disclosure.

FIG. 33 is a side cross-sectional view of a portion of solar panel structure 3300 showing a bottom edge portion of a first panel 3301 and an adjacent lower second panel 3301B and connecting structure 3321. As shown in FIG. 33, the bottom edge portion of a first panel 3301 preferably overlaps with the top edge portion of an adjacent lower second panel 3301B and each panel portion is connected to I-beam 3303. As shown, the bottom edge portion of a first panel 3301 is connected to I-beam 3303 using support rail 3031 which is secured to the bottom surface of first panel 3301 using tape 3336, while top edge portion of adjacent lower second panel 3301B is also attached to I-beam 3303 using support rail 3031B which is secured to the bottom surface of panel 3301B by tape 3336B. Preferably, the tape 3336B is 3M VHB (Very High Bond) architectural, structural tape which works well in this preferred embodiment.

As shown in FIG. 33, support rail 3331 is vertically larger or higher than support rail 3331B allowing first panel 3301 to be elevated or higher or stepped up compared to adjacent lower second panel 3301B. Preferably, support rail 3331 is between 0.2 and 1 inch higher than support rail 3331B Preferably, the solar panel structure 3300 further comprise a top gasket 3337B between the top edge portion of adjacent lower second panel 3301B and the overlapping bottom edge portion of a first panel 3301, as shown, to further secure the panels and/or seal the connector structure 3321 from water damage, dust, etc. According to preferred embodiments, top gasket 3337B is a single sided adhesive UV stable foam gasket adhered to the top edge portion of the lower panel to ensure the glass of the upper adjacent panel rests on top of the 3337B and does not directly contact the glass surface of the adjacent lower panel. In the preferred embodiments, single sided adhesive is preferred over double-sided adhesive so that the panels 3301 and 3301B are able to expand and contract without tearing apart the gasket 3337B.

As also shown in FIG. 33, the bottom edge portion of adjacent lower second panel 3301B is secured to another I-beam 3303C using support rail 3331C using tape 3336C. Although not shown in FIG. 33, one of ordinary skill in the art would understand the next panel (3301C, not shown) adjacent to lower second panel 3301B would be attached to I-beam 3303C using a support rail (3031D, not shown) smaller or shorter than support rail 3031C allowing second panel 3301B to be elevated or higher or stepped up compared to adjacent lower second panel 3301C. Alternately, in the event lower second panel 3301B is the final panel in a column, support rail 3331C is attached to I-beam 3303C supported on the lower-most purlin of the structure. The panel connecting structure 3321 shown in FIG. 33 allows the panels to be stepped down, while securing each panel and using common I-beams or purlins for each adjacent panel edges. Alternatively, the solar structure includes I-beams having a top surface configured (e.g., including a top surface for the first panel and lower surface for adjacent lower surface) to allow for support rails having the same or substantially the same dimensions.

According to one embodiment, each of the essentially parallel supports has an open central channel bounded on sides of the essentially parallel support by parallel walls.

According to another embodiment, the at least one alternative top end edge support comprises a gasket between the at least one alternative top end edge support and the bottom of the second photovoltaic panel assembly.

According to another embodiment, at least one top end edge support comprises a first support component attached to a bottom surface of the photovoltaic panel assembly and a second support component attached to a support structure and wherein the first support component and the second support component are configured to connect to support the photovoltaic panel assembly.

According to another embodiment, at least one alternative top end edge support comprises a first alternative support component attached to a bottom surface of the photovoltaic panel assembly and the second support component attached to a support structure and wherein the first alternative support component and the second support component are configured to connect to support the photovoltaic panel assembly. Preferably, the first alternative support component is shorter than the first support component.

According to another embodiment, each photovoltaic panel assembly comprises a pair of shingling connectors and a photovoltaic panel, where the shingling connectors are connected on opposed sides of the photovoltaic panel. Preferably, the shingling connector extends beyond a surface of the photovoltaic panel a distance greater than twice a thickness of the photovoltaic panel and less than a height of the parallel walls of the essentially parallel supports.

Yet another aspect of the invention relates to a solar panel structure comprising:

a support structure including a plurality of essentially parallel support means;

at least one purlin orthogonal to the plurality of essentially parallel support means and configured to support the plurality of essentially parallel support means;

a plurality of photovoltaic panel assemblies, wherein each photovoltaic panel assembly comprises a top end edge, a bottom end edge, a first side edge and a second side edge and wherein the first side edge is connected to a first parallel support means and the second side edge is connected to a second parallel support means, wherein the plurality of photovoltaic panel assemblies comprises a first photovoltaic panel assembly adjacent a second photovoltaic panel assembly;

at least one top end edge support means between the first side edge and the second side edge of a first photovoltaic panel assembly and at least one bottom end edge support means between the first side edge and the second side edge of the first photovoltaic panel assembly; and at least one alternative top end edge support means between the first side edge and the second side edge of the second photovoltaic panel assembly and the at least one bottom end edge support means between the first side edge and the second side edge of the second photovoltaic panel assembly; and wherein the at least one alternative top end edge support means of the second photovoltaic panel assembly is shorter than the at least one bottom end edge support means of the first photovoltaic panel assembly.

Figure 35B:
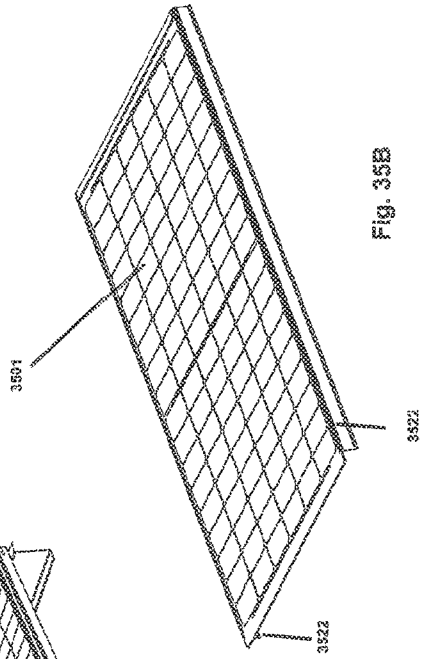
FIG. 35B is a perspective view of a photovoltaic panel used in the structure shown in FIG. 35A.
Figure 35A:
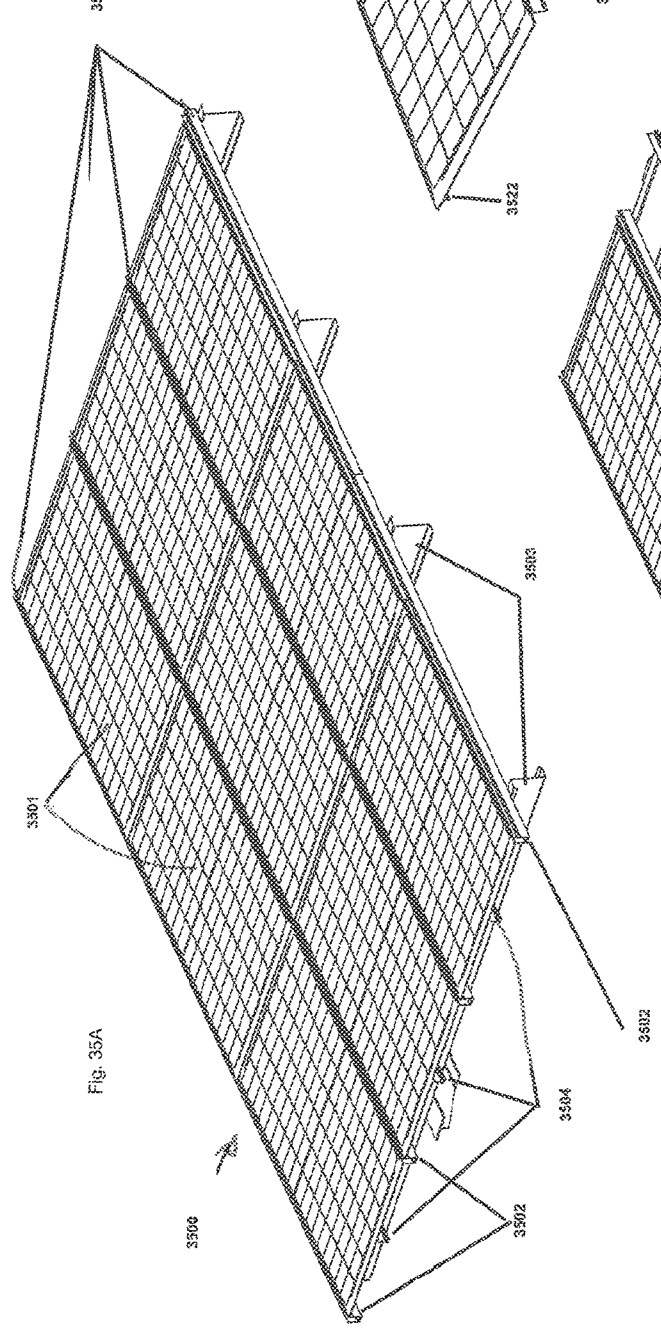
FIG. 35A is a perspective view of an assembled solar support structure with assembled photovoltaic panels and support structure according to another aspect of the disclosure.
Figure 35C:
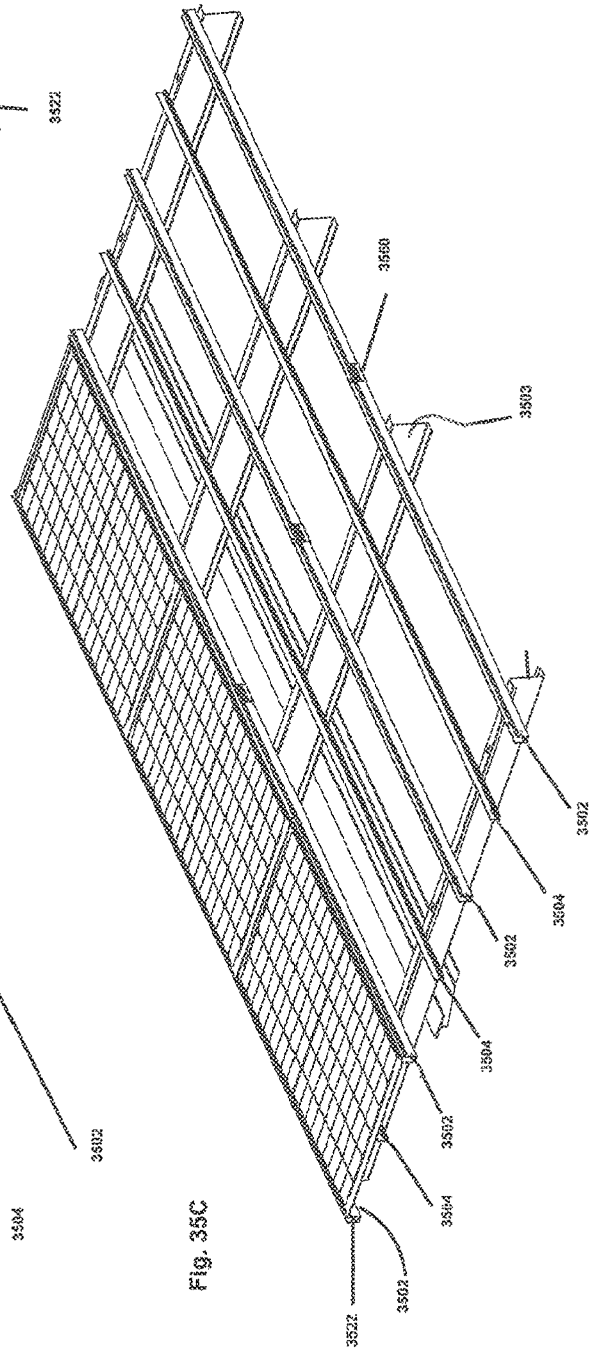
FIG. 35C is a perspective view of the solar support structure of FIG. 35A with a row of assembled photovoltaic panels and supports.

FIG. 35A shows assembled solar support structure 3500 including photovoltaic panels 3501 assembled onto purlins 3503 with channel rail supports 3502 and center rail supports 3504 according to another aspect of the disclosure. FIG. 35B is a perspective view of a photovoltaic panel 3501 comprising edge rails 3522 configured or adapted to connect to the channel rail supports 3502 shown in FIG. 35C. FIG. 35C is a perspective view of the solar support structure of FIG. 35A with a row of assembled photovoltaic panels and exposed channel rail supports 3502 and center rail supports 3504. FIG. 35C further shows optional edge rail support connector splice 3560 configured or adapted to connect adjacent channel rail supports 3502 as shown. Optionally, the structure 3500 may also comprise splices (not shown) for the center rail supports 3504.

Figures 36A, 36B, 36C, 36D:
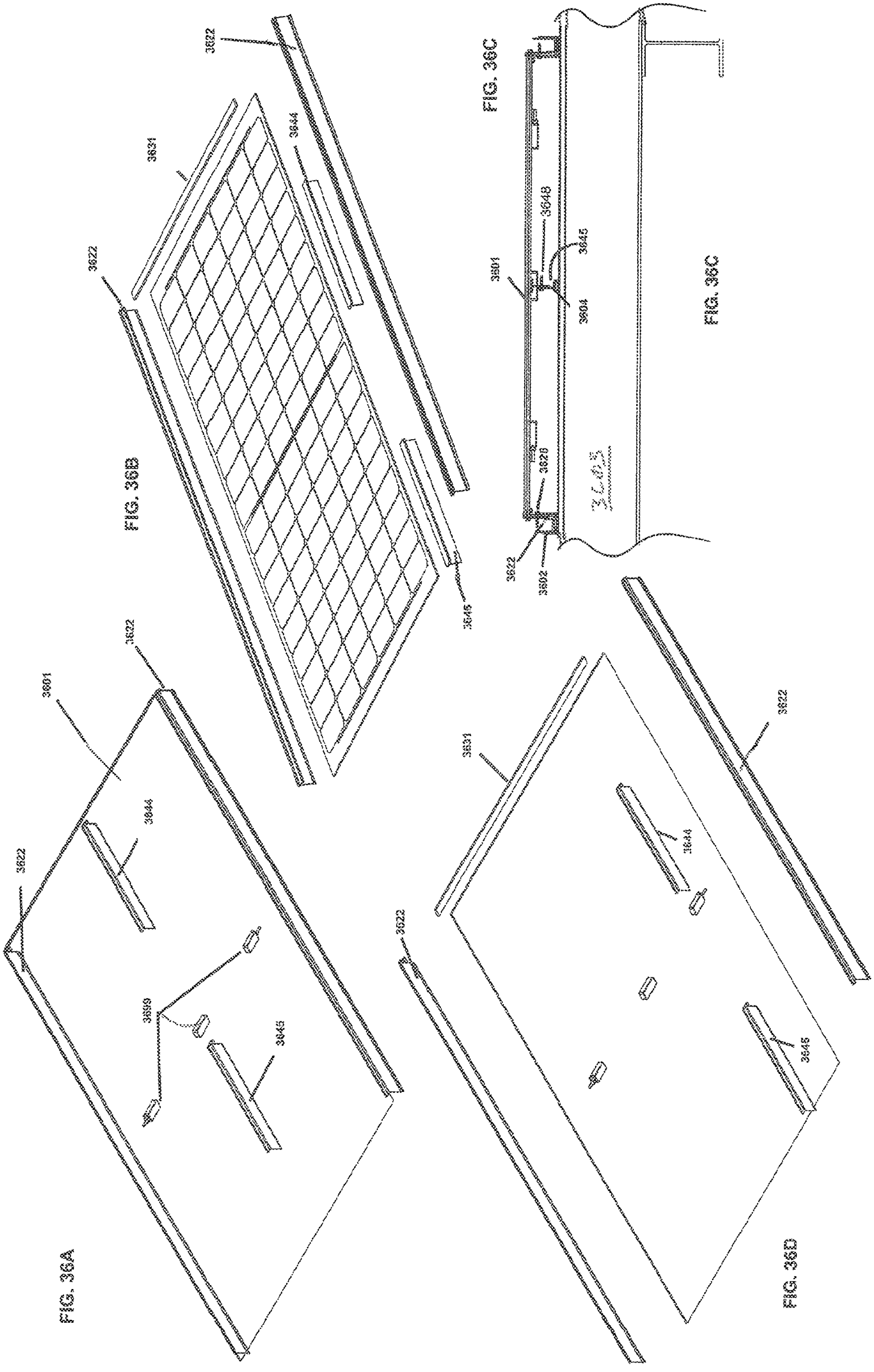
FIG. 36A is a perspective bottom view of a photovoltaic panel according to another embodiment.
FIG. 36B is a perspective top view of the photovoltaic panel of FIG. 36A unassembled.
FIG. 36C is a front view of the photovoltaic panel of FIG. 36A assembled onto a structure.
FIG. 36D is a perspective bottom view of the photovoltaic panel of FIG. 36A unassembled.

FIG. 36A shows the bottom of a photovoltaic panel 3601 according to another embodiment comprising side rails 3622 on each side of panel 3601 and a pair of center support rails 3644/3645 configured and adapted to further secure and support panel 3601 and avoid electrical connectors 3699 or other features placed on the bottom of the panel 3601. FIG. 36B is a perspective top view of the photovoltaic panel of FIG. 36A showing unassembled side rails 3622, center rails 3644/3545 and an optional shingling gasket 3631 to at least partially seal the area where shingled panels in a column overlap as described herein. FIG. 36C is a front view of the photovoltaic panel 3601 of FIG. 36A assembled onto a structure including purlin 3603, and side rails 3622 connected to side rail supports 3602 with screw or bolt 3628 and center rail 3645 connected to center rail support 3604 with screw or bolt 3648. FIG. 36D is a perspective bottom view of the photovoltaic panel 3601 of FIG. 36A showing unassembled side rails 3622 on each side of panel 3601 and a pair of center support rails 3644/3645 and shingling gasket 3631.

Figure 37A:
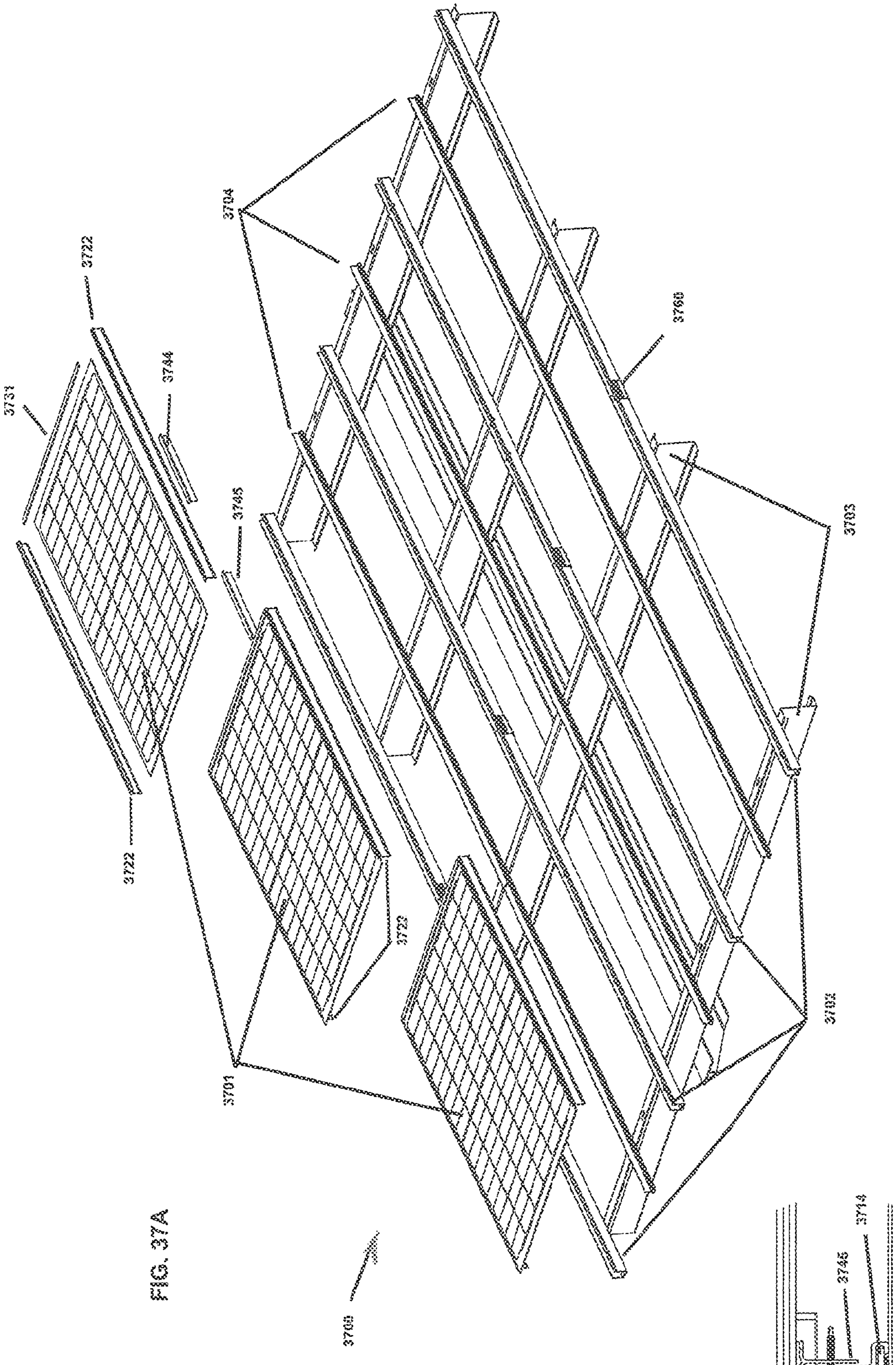
FIG. 37A is a perspective view of a solar support structure with a row of unassembled photovoltaic panels according to another aspect of the disclosure.
Figure 37B:
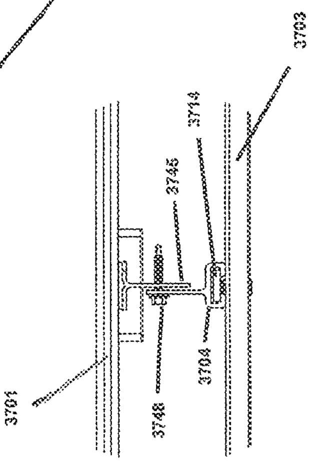
FIG. 37B is a front view of the solar support structure of FIG. 37B showing the center of an assembled photovoltaic panel.

FIG. 37A is a perspective view of a solar support structure 3700 with unassembled photovoltaic panels 3701 having side rails 3722 (shown both assembled and unassembled), center rail supports 3744/3745, optional shingling gaskets 3731 (shown both assembled and unassembled) and support structure comprising purlins 3703 having edge rail supports 3702 and center rails 3704 aligned perpendicular to purlins 3703 as shown. FIG. 37B is a front view of the solar support structure of FIG. 37B with an assembled photovoltaic panel 3701 secured onto and/or supported by purlin 3703 by center rail 3745 connected to center rail support 3704 via screw or bolt 3748 and center rail support 3704 connected to purlin 3703 by screw or T-bolt 3714. As shown in FIG. 37A, center rails 3744/3745 and center rail supports 3704 positioned between edge rails 3722/edge rail supports 3702 to provide additional or supplement support for the center of panel 3701 against snow load, wind, heavy rain, watershed or other impacts on the structure.

Figures 38A, 38B, 38C, 38D:
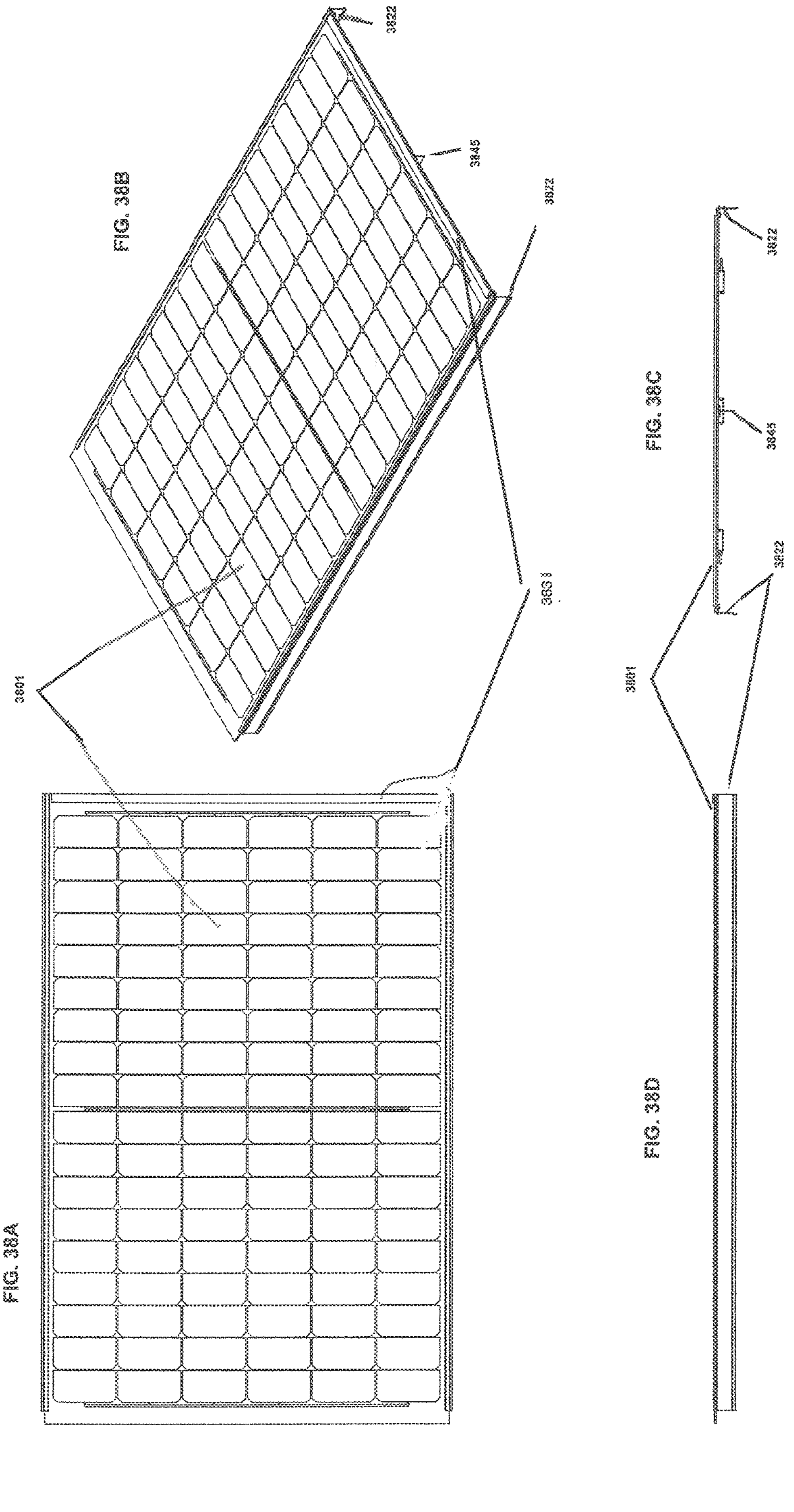
FIG. 38A is a top view of a photovoltaic panel according to another embodiment.
FIG. 38B is a perspective top view of the photovoltaic panel of FIG. 38A.
FIG. 38C is a front view of the photovoltaic panel of FIG. 38A.
FIG. 38D is a side view of the photovoltaic panel of FIG. 38A.

FIG. 38A is a top view of a photovoltaic panel 3801 according to another embodiment. FIG. 38B is a perspective top view of the photovoltaic panel of FIG. 38A showing side rails 3822, portion of center rail 3845 and optional gasket 3831. FIG. 38C is a front view of the photovoltaic panel of FIG. 38A highlighting an exemplary location of center rail 3845 between edge rails 3822. FIG. 38D is a side view of the photovoltaic panel of FIG. 38A.

Figures 39A, 39B, 39C, 39D:
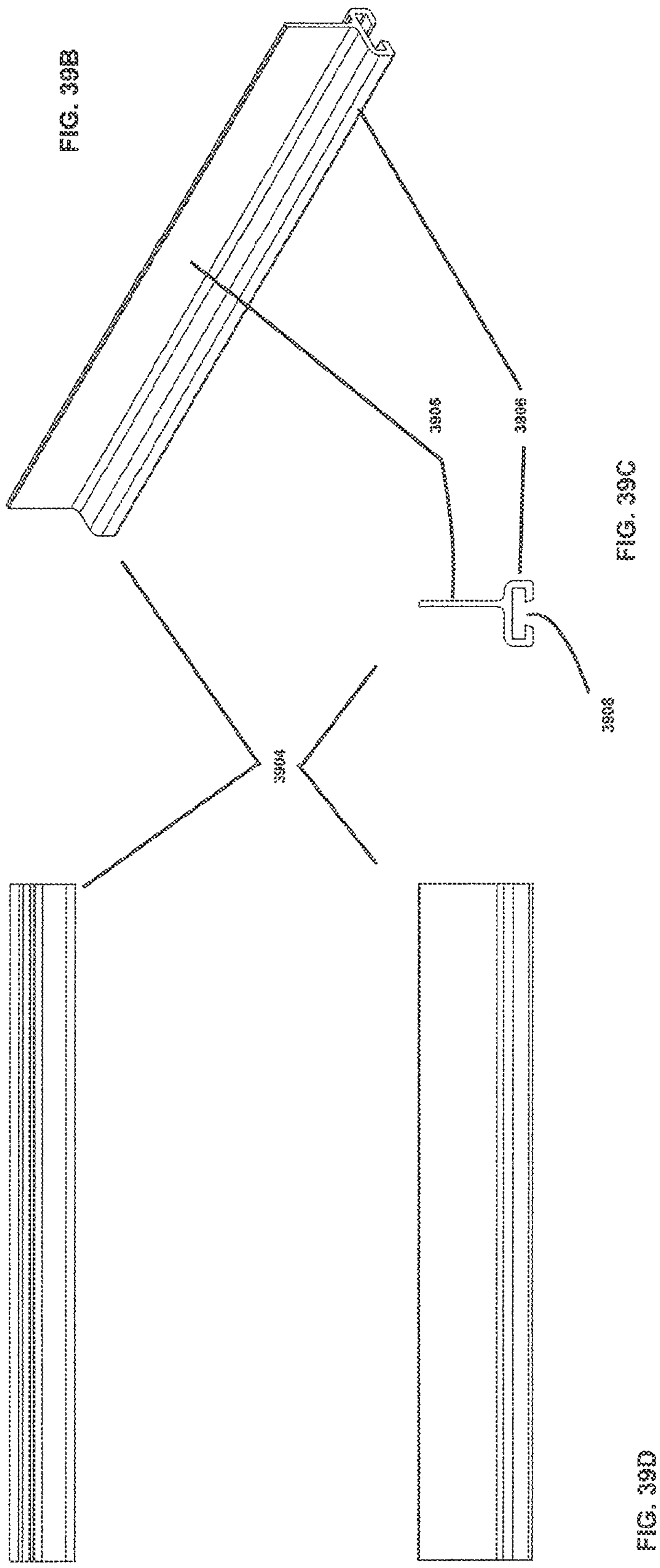
FIG. 39A is a top view of a center rail support according to one embodiment.
FIG. 39B is a side perspective view of the center rail support of FIG. 39A.
FIG. 39C is a front view of the center rail support of FIG. 39A.
FIG. 39D is a side view of the center rail support of FIG. 39A.

FIG. 39A is a top view of a center rail support 3904 according to one embodiment. FIG. 39B is a side perspective view of the center rail support 3904 of FIG. 39A comprising top vertical connector 3905 that is configured or adapted to connect to center rail (not shown) connected to base 3906. Base 3906 is configured or adapted to be connected to purlin or other support structure (not shown) and preferably comprises an opening 3908 configured to receive a screw or bolt (not shown). FIG. 39C is a front view of the center rail support 3904 of FIG. 39A. FIG. 39D is a side view of the center rail support 3904 of FIG. 39A.

Figures 40A, 40B, 40C, 40D, 40E:
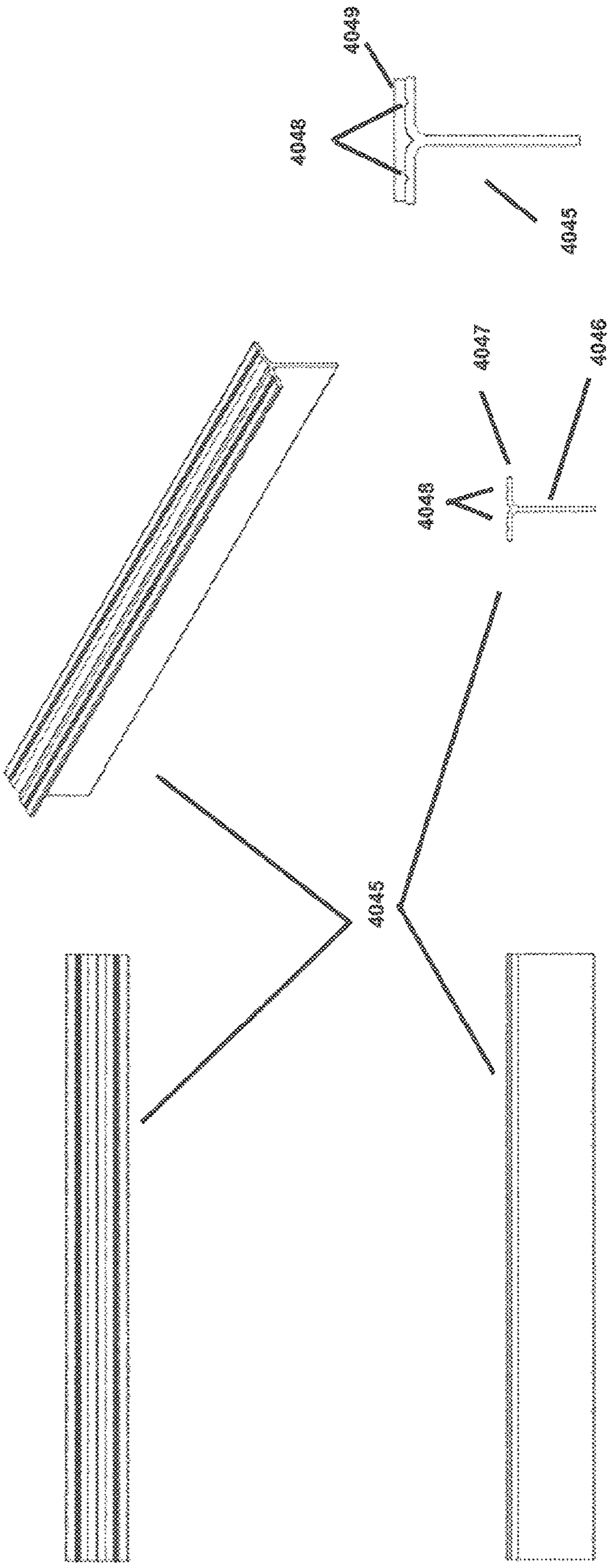
FIG. 40A is a top view of a T-shaped center rail according to another embodiment.
FIG. 40B is a side perspective view of the T-shaped center rail of FIG. 40A.
FIG. 40C is a front view of the T-shaped center rail of FIG. 40A and glue or adhesive tape on top surface of rail.
FIG. 40D is a front view of the T-shaped center rail of FIG. 40A.
FIG. 40E is a side view of the T-shaped center rail of FIG. 40A.

FIG. 40A is a top view of a T-shaped center rail 4045 according to another embodiment. FIG. 40B is a side perspective view of the T-shaped center rail 4045 of FIG. 40A. FIG. 40C is a front view of the T-shaped center rail 4045 of FIG. 40A comprising vertical connector component 4046 and connecting top surface 4047 configured to adhere or otherwise connect to underside of panel (not shown) and glue or adhesive tape 4049 on top surface 4047 of rail 4045. Top surface 4047 preferably comprises one or more, more preferably two or more divots 4048 on the top surface 4047 to increase adherence to bottom of panel. FIG. 40C shows two divots 4048. FIG. 40D is a front view of the T-shaped center rail 4045 of FIG. 40A without glue or adhesive tape 4049. FIG. 40E is a side view of the T-shaped center rail 4045 of FIG. 40A.

Figures 41A, 41B, 41C, 41D, 41E:
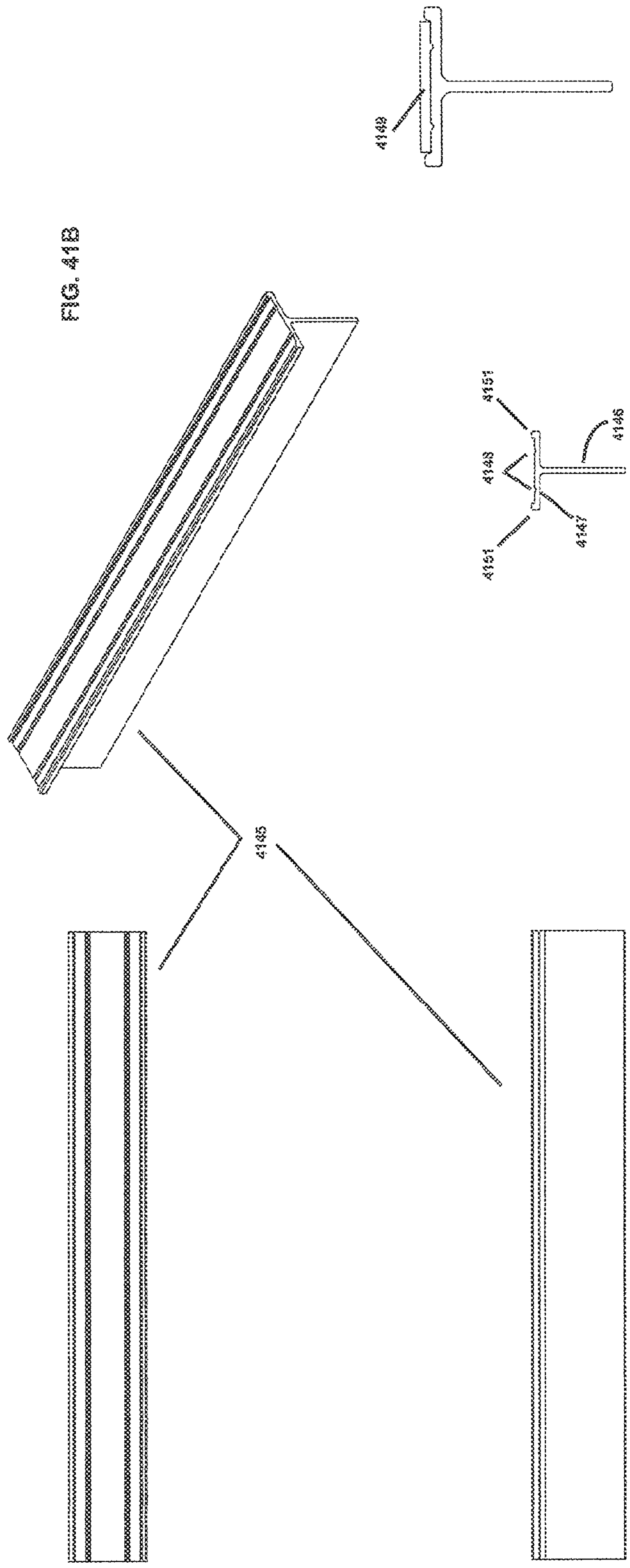
FIG. 41A is a top view of a T-shaped center rail according to another embodiment.
FIG. 41B is a side perspective view of the T-shaped center rail of FIG. 41A.
FIG. 41C is a front view of the T-shaped center rail of FIG. 41A and glue or adhesive tape on the top surface of the rail.
FIG. 41D is a front view of the T-shaped center rail of FIG. 41A.
FIG. 41E is a side view of the T-shaped center rail of FIG. 41A.

FIG. 41A is a top view of a T-shaped center rail 4145 according to another embodiment. FIG. 41B is a side perspective view of the T-shaped center rail 4145 of FIG.

41A. FIG. 41C is a front view of the T-shaped center rail of FIG. 41A comprising vertical connector component 4146 and horizontal top surface 4147 and glue or adhesive tape 4149 on top surface 4147 of rail 4149. FIG. 41D is a front view of the T-shaped center rail of FIG. 41A showing divots 4148 and top surface edge tab 4151 on each end of top surface 4147 as shown. FIG. 41E is a side view of the T-shaped center rail of FIG. 41A.

Figure 42C:
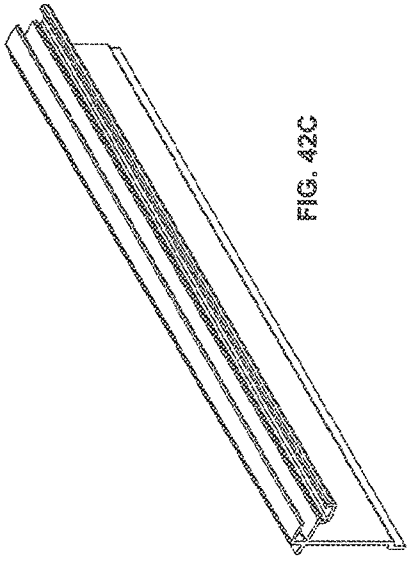
FIG. 42C is a top perspective side view of the side rail of FIG. 42A.
Figure 42D:
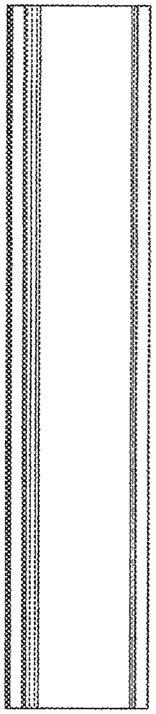
FIG. 42D is a side view of the side rail of FIG. 42A.
Figure 42B:
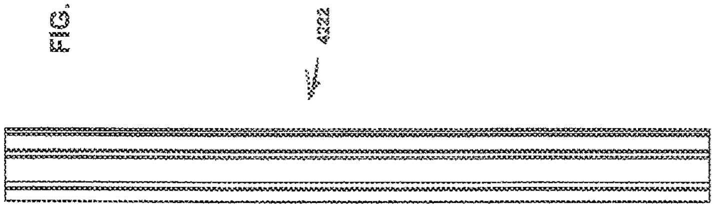
FIG. 42B is a top view of the side rail of FIG. 42A.
Figure 42E:
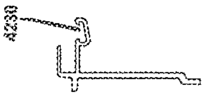
FIG. 42E is a front view of the side rail of FIG. 42A.
Figure 42A:
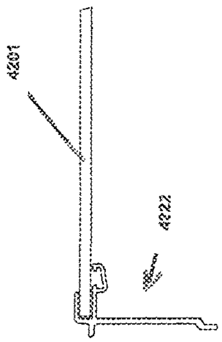
FIG. 42A is a side view of a side rail according to another embodiment connected to a side edge of a solar panel.
Figure 42F:
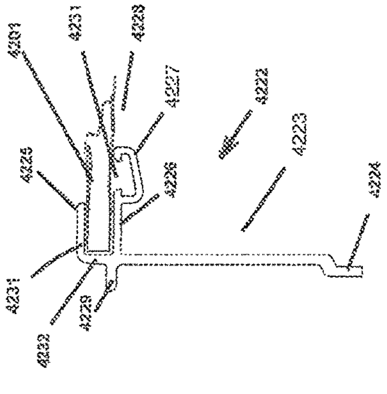
FIG. 42F is an enlarged front view of the side rail of FIG. 42A connected to a side edge of a solar panel.

FIG. 42A is a side view of a side rail 4222 according to another embodiment supporting a side edge of a solar panel 4201. FIG. 42B is a side view of the side rail 4222 of FIG. 42A. FIG. 42C is a top perspective side view of the side rail 4222 showing of FIG. 42A showing the elongated dimension with the consistent cross-section profile. FIG. 42D is a side view of the side rail 4222 of FIG. 42A. FIG. 42E is a front view of the side rail 4222 of FIG. 42A. FIG. 42F is a front view of the side rail 4222 of FIG. 42A supporting a side edge of a solar panel 4201. FIG. 42F shows the cross-sectional profile of side rail 4222 including vertical component 4223 including distal end vertical tip 4224 connected to and parallel to but displaced from vertical component 4223 on opposing side of side rail 4222 compared to top connecting component 4228. Side rail 4222 further comprises top connecting component 4228 connected to the proximal top end of vertical component 4223 and comprising top horizontal surface 4231 and bottom horizontal surface 4226 connected by vertical connecting component 4232 forming a C-shaped profile. As shown in FIG. 42F, bottom horizontal surface 4226 further comprises glue or adhesive well 4227 (accessible through opening 4230 shown in FIG. 42E) adapted to contain glue or adhesive 4231. Side rail 4222 further comprises side rail step 4229 on opposing side of side rail 4222 opposite the C-shaped top connecting component 4228 and having a top horizontal or substantially horizontal surface and preferably a bottom horizontal or substantially horizontal surface and side rail step 4229 is connected to the bottom of top connecting component 4228 or top of vertical component 4223.

Figure 43A:
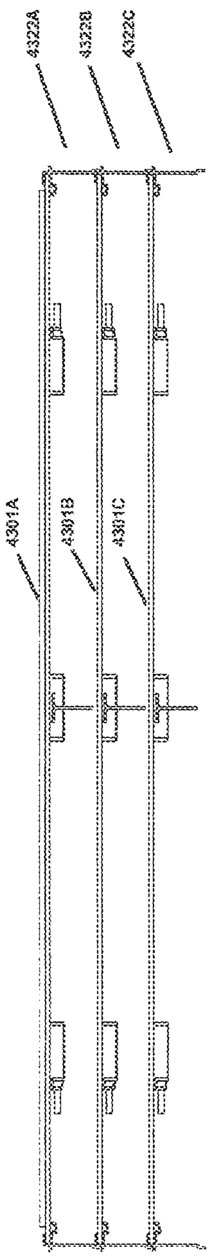
FIG. 43A is a front view of three stacked solar panels according to another embodiment.
Figure 43B:
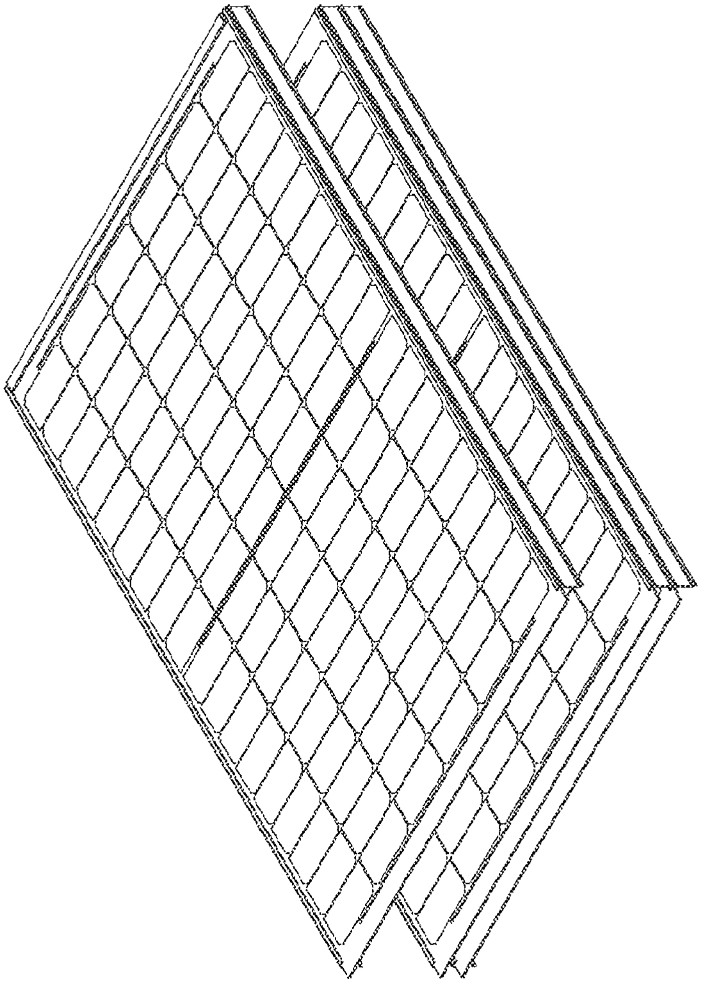
FIG. 43B is a top perspective view of the stacked solar panels of FIG. 43A with the top panel separated.
Figure 43C:
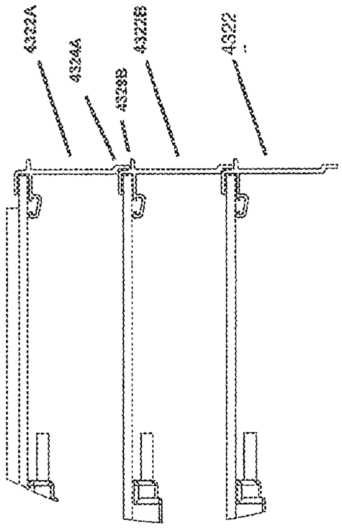
FIG. 43C is a close-up front view of one side of the three stacked solar panels of FIG. 43A.

With attention now also to FIG. 43, a stacking arrangement is illustrated for shipping and storage of panels. Preferably, when panels 4201/4301 are stacked, distal end vertical tip 4224/4324 of panel 4201A/4301A are supported on side rail step 4229/4329 of lower panel 4201B/4301B. For example, FIG. 43A is a front view of three stacked solar panels 4301A, 4301B, and 4301C wherein each of side rails 4322A, 4322B and 4322C are stacked so that each distal end vertical tip 4224 of a top panel is resting on the side rail step of the bottom panel, as shown. FIG. 43B is a top perspective view of the stacked solar panels of FIG. 43A. FIG. 43C is a close-up view of the side rails 4322A, 4322B and 4322C of the three stacked solar panels 4301A, 4301B, and 4301C of FIG. 43A showing the fit of each distal end vertical tip 4224 on the lower side rail step 4229, allowing for improved and more efficient stacking of panels. For example, demonstrating how 4324A of panel 4333A fittingly rests onto rail step 4329B of panel 4322B. The configuration of the side rails 4322 allows panels to be more efficiently stacked as shown in FIG. 43C with increased stability.

Figure 44A:
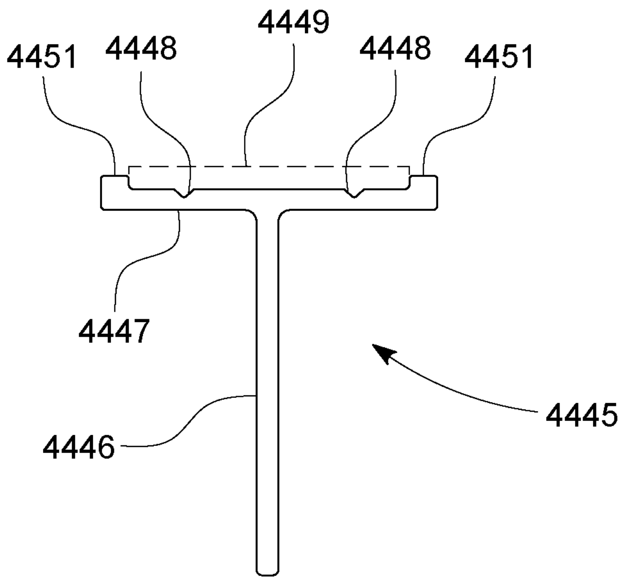
FIG. 44A is a front view of a center rail according to another embodiment of the invention.
Figure 44B:
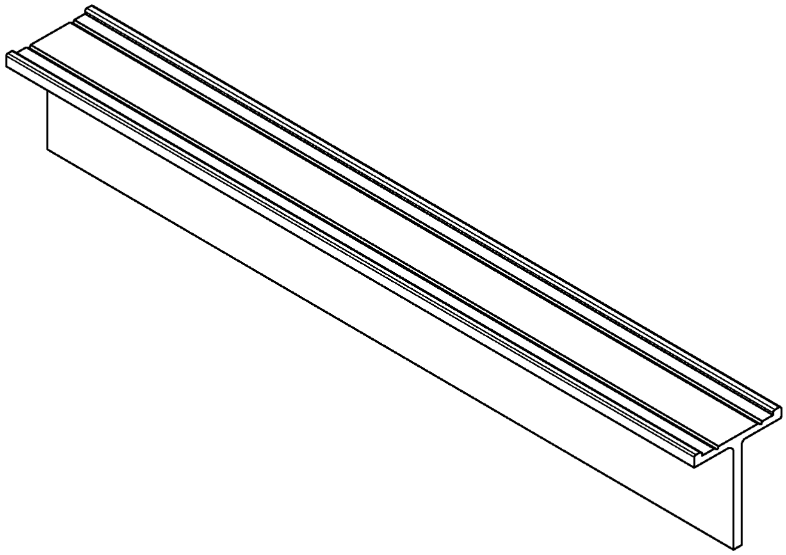
FIG. 44B is a top perspective view of the center rail of FIG. 44A.

FIG. 44A is a front view of a T-shaped center rail 4445 according to another embodiment of the invention comprising a vertical component 4446 and top horizontal component 4447. As shown, top horizontal component 4447 comprises a top surface having two or more divots 4448 on the top surface to increase adherence to bottom of the panel (shown) and preferably a pair of top surface edge tabs 4451 on each end of the top surface as shown to contain glue or adhesive 4449 applied to the top surface of top horizontal component 4447. FIG. 44B is a top perspective view of the center rail 4445 of FIG. 44A.

Figure 45B:
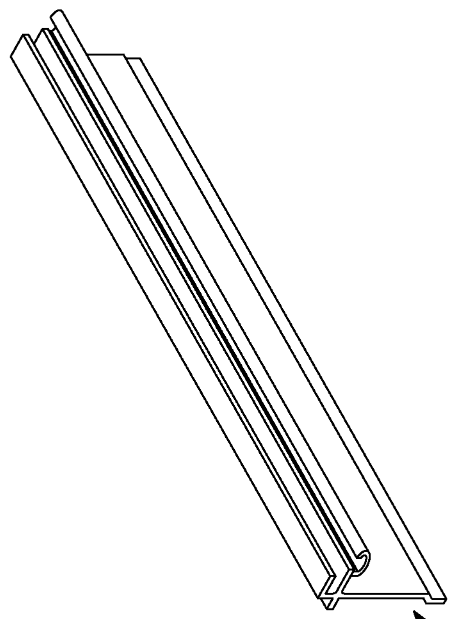
FIG. 45B is a top perspective view of the center rail of FIG. 45A.
Figure 45A:
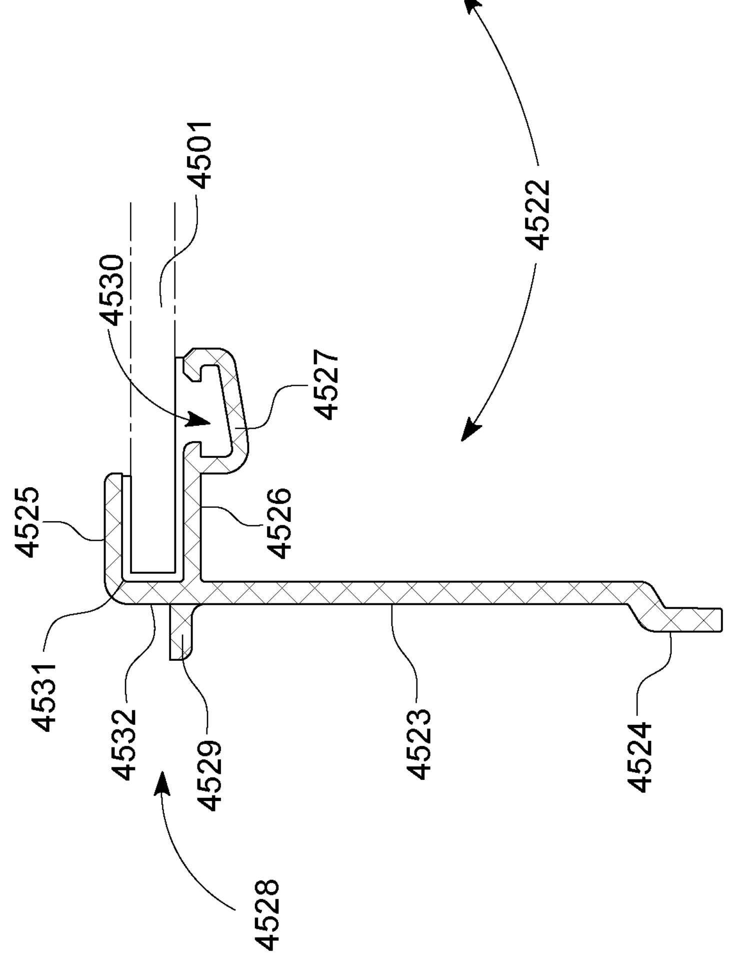
FIG. 45A is a front view of a side rail according to another embodiment of the invention.

FIG. 45A is a view of a side rail 4522 according to another embodiment of the invention including the currently preferred dimensions and shown supporting a side edge of a solar panel 4501. FIG. 45A shows the cross-sectional profile of side rail 4522 including vertical component 4423 including distal end vertical tip 4524 connected to and parallel to but displaced from vertical component 4523 on opposing side of side rail 4522 compared to top connecting component 4528. Side rail 4522 further comprises top connecting component 4528 connected to the proximal top end of vertical component 4523 and comprising top horizontal surface 4525 and bottom horizontal surface 4526 connected by vertical connecting component 4532 forming a C-shaped profile. As shown in FIG. 45A, bottom horizontal surface 4526 further comprises glue or adhesive well 4527 providing opening 4530 adapted to contain glue or adhesive 4531 (not shown). Preferably, the C-shaped structure formed by top horizontal surface 4525, bottom horizontal surface 4526 and vertical connecting component 4532 is configured, designed and adapted to allow or provide a gap or space between the outer surfaces of the panel 4501 to provide room for glue or adhesive 4531, as shown in FIG. 45A. Side rail 4522 further comprises side rail step 4529 on opposing side of side rail 4522 opposite the C-shaped top connecting component 4528 and having a top horizontal or substantially horizontal surface and preferably a bottom horizontal or substantially horizontal surface and side rail steel 4529 is connected to the bottom of top connecting component 4528 or top of vertical component 4523. Preferably, when panels 4501 are stacked, distal end vertical tip 4524 of panel 4501A is configured to rest on side rail step 4529B of lower panel 4501B (as shown in FIG. 43C). FIG. 45B is a top perspective view of the center rail 4522 of FIG. 45A.

Figure 46:
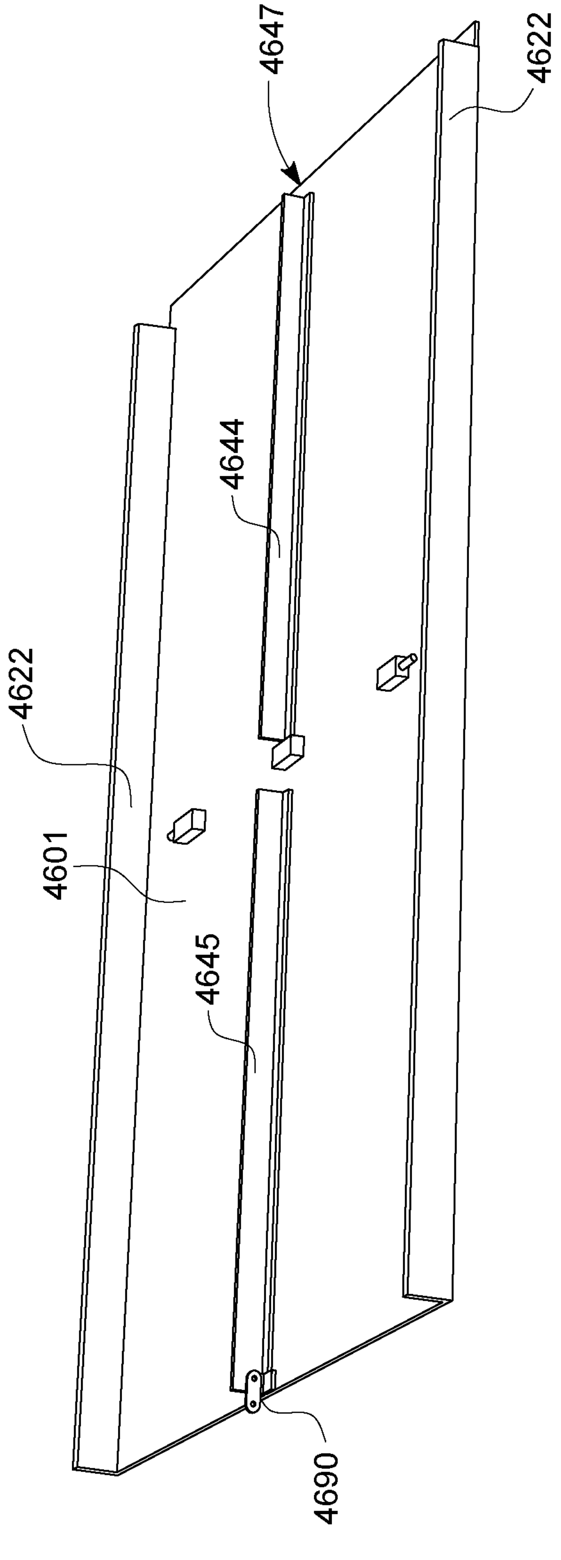
FIG. 46 is a bottom perspective view of a solar panel according to another embodiment of the invention.

FIG. 46 is a bottom perspective view of a solar panel 4601 according to another embodiment of the invention. Solar panel 4601 comprises side rails 4622 on opposing sides of the panel and a pair of center rails 4644/4645 shown positioned approximately on the center of the bottom of the panel and parallel to side rails 4622. In other embodiments, the center rails may be offset to accommodate or not interfere with junction boxes or other features on the bottom of a panel. In the illustrated embodiment, center rails 4644/4645 are the same or substantially the same length and are each T-shaped. Preferably, there is a gap between center rail 4644 and center rail 4645, as shown. In the illustrated embodiment, center rail 4645 is in-set 4647 from the edge of panel 4601, while center rail 4645 ends at the opposing edge of panel 4601, as shown. In the illustrated embodiment, solar panel 4601 further comprises bracket 4690, preferably connected to center rail 4645. Preferably bracket 4690 is configured to connect adjacent solar panels during assembly of solar panel structure (as shown in FIG. 47A).

Figure 47A:
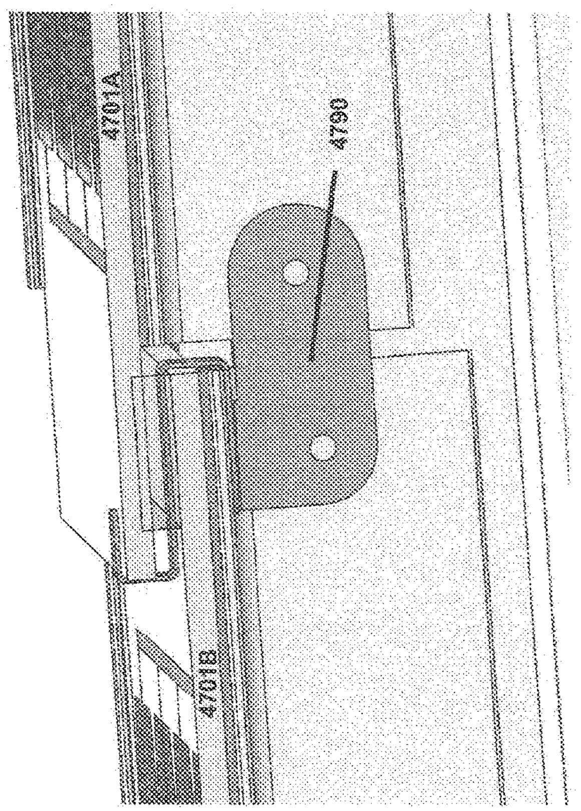
FIG. 47A is a side view of a solar panel bracket according to another embodiment connecting a pair of adjacent, overlapping solar panels within a shingled row.
Figure 47B:
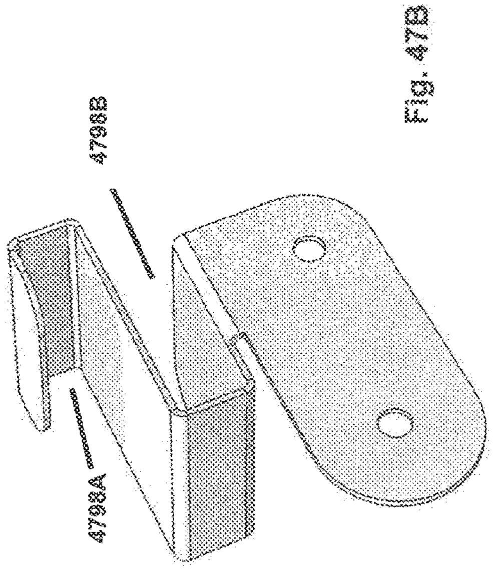
FIG. 47B is a first side view of the solar panel bracket of FIG. 47A.
Figure 47C:
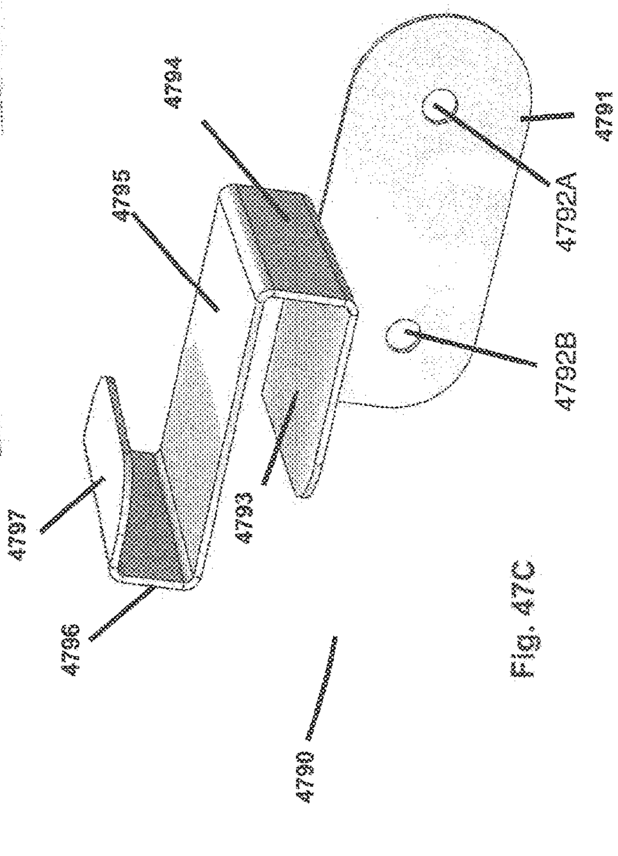
FIG. 47C is a second side view of the solar panel bracket of FIG. 47A.

FIG. 47A is a side view of a solar panel bracket 4790 according to another embodiment connecting a pair of solar panels 4701A and 4701B. FIG. 47B is a first side view of the solar panel bracket 4790 of FIG. 47A showing first panel slot opening 4798A configured to receive an edge of solar panel 4701A and opposing second panel slot opening 4798B configured to receive an edge of solar panels 4701B. FIG. 47C is a second side view of the solar panel bracket 4790 of FIG. 47A showing first panel slot opening 4798A is formed by bracket top surface 4797, top vertical connecting component 4796 and shared surface 4795, while second panel slot opening 4798B is formed by shared surface 4795, bottom vertical connecting component 4794 and bracket bottom surface 4793. Preferably, the cross-section profile of first panel slot opening 4798A and second panel slot opening 4798B is S-shaped. Preferably, bracket bottom surface 4793 is preferably connected to perpendicular bracket surface 4791 comprising at least one, preferably two through-holes 4792A/B for connecting solar panel bracket 4790 to adjacent solar panels, preferably a through-hole 4792B configured to connecting to solar panel 4701B with screw or bolt (not shown) and through-hole 4792A configured to connecting to solar panel 4701A with screw or bolt (not shown).

Figure 48:
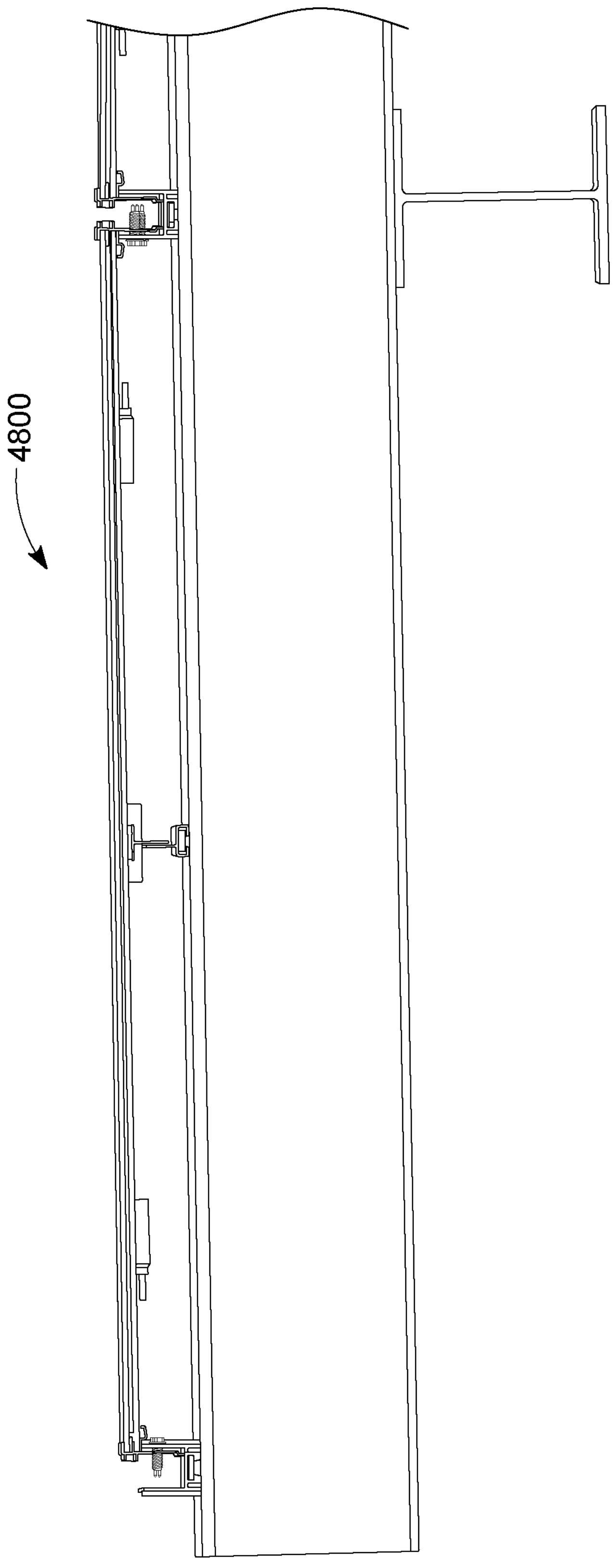
FIG. 48 is a front view of a solar panel structure according to another embodiment.

FIG. 48 is a front view of a solar panel structure 4800 according to another embodiment.

Figure 49A:
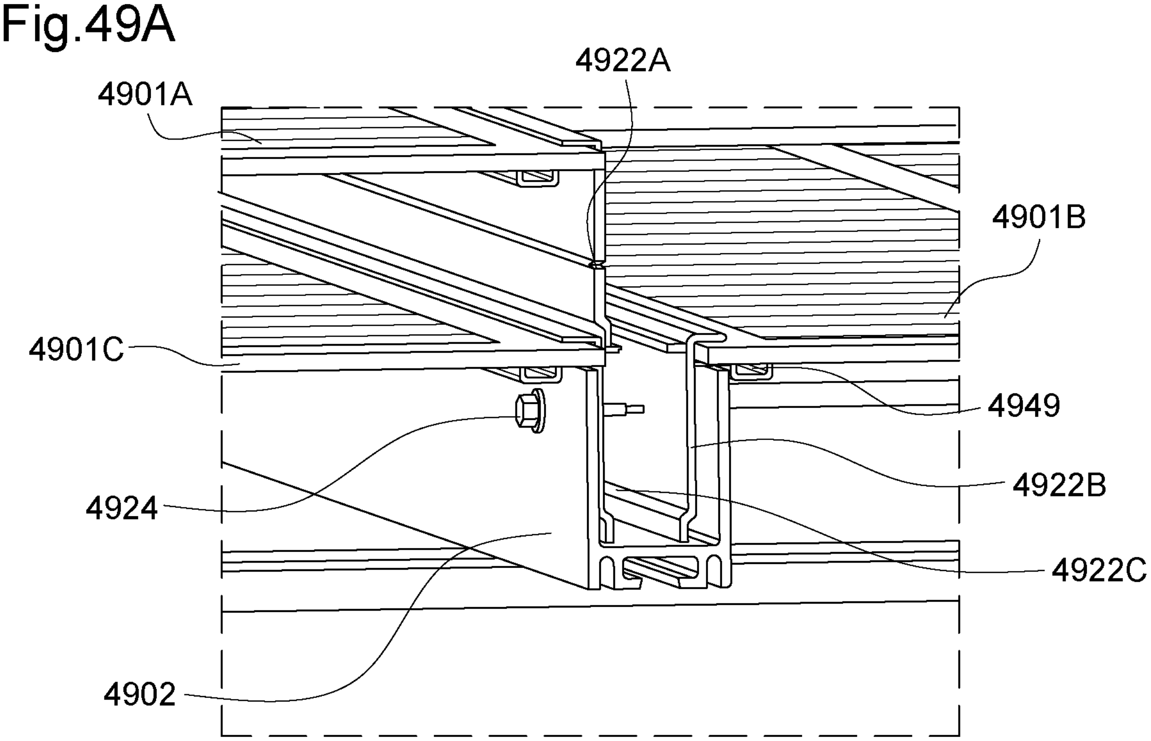
FIG. 49A is a front perspective view of the sides of adjacent stacked solar panels according to another embodiment.

FIG. 49A is a front view of stacked solar panels 4901A, 4901B, and 4901C according to another embodiment. Preferably, each solar panel 4901 comprises side rails 4922 configured to fit onto the adjacent lower side rails. For example, as shown in FIG. 49A, side rail 4922A rests onto the step of side rail 4922C. As shown, glue or adhesive 4949 is used to attach solar panels 4901 to side rail 4922. Preferably, horizontally adjacent solar panels 4901C and 4901B are connected to the same side rail support 4902. As shown, side rail 4922C is connected to side rail support 4902 using screw or bolt 4924 via a through-holes in each of side rail and side rail support (not shown). While not envisioned to install panels in the stacked arrangement illustrated, the stacking feature can aid in panel installation allowing installation of one panel and permitting following panels to be slid over the installed panel to the next opening for installation.

Figure 49B:
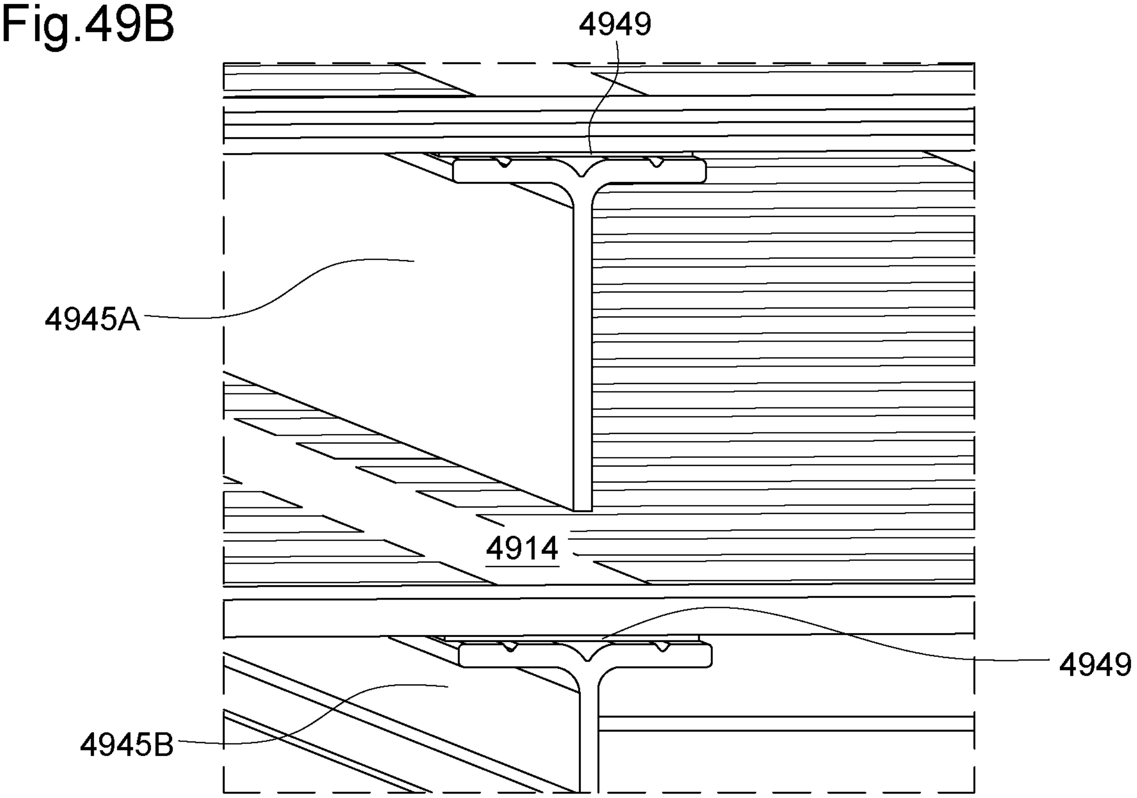
FIG. 49B is a front perspective view of the center rails of a pair of stack panels aligned and spaced in the stacked configuration.

FIG. 49B is a front view of the center rails 4945A/4945B of a pair of stacked panels. When stacked, a vertical component 4913A of center rail 4945A (or any upper panels) should not touch the panel below, instead a gap 4913 is maintained between the panels to allow for stacking without damaging the solar panels. Each center rail 4945A/4945B is connected to the bottom of respective solar panel using glue, adhesive or tape 4949.

Figures 50A, 50B, 50C, 50D:
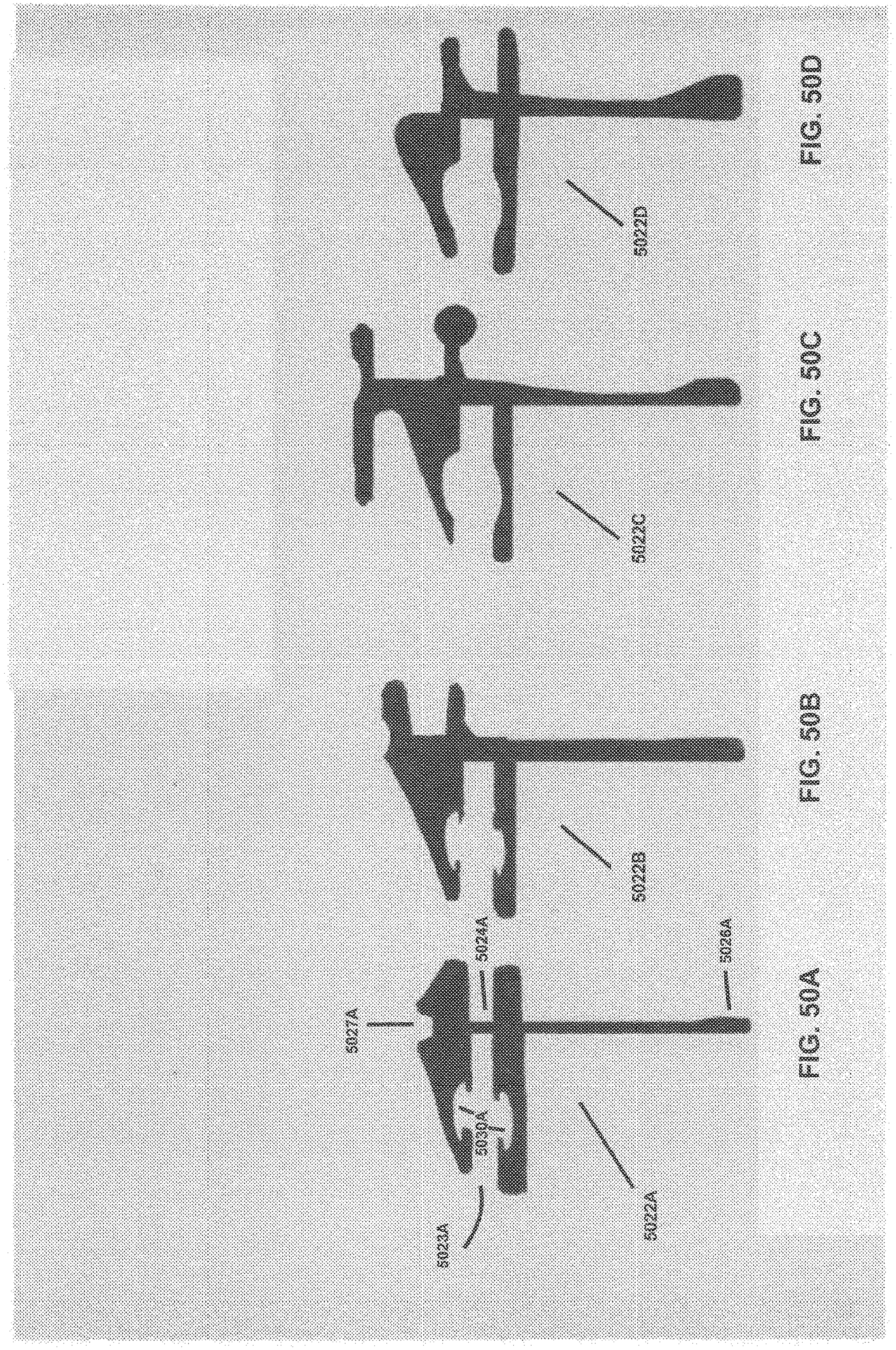
FIGS. 50A-D are front views of alternative side rails according to other embodiments of the invention.

FIGS. 50A-D are side views of alternative side rails 5022 according to other embodiments. For example, FIG. 50A shows side rail 5022A comprising first panel opening 5023A for receiving a first panel (not shown). First panel opening 5023A comprises cavities 5030A for receiving glue or adhesive (not shown). Side rail 5022A comprises foot 5026A configured to fit into foot seat 5027A to allow for stacking of vertically adjacent side rails 5022. FIGS. 50B-50D illustrate alternative designs permitting panel connection, securing in place with cavities for adhesive, and stacking.

Figure 51:
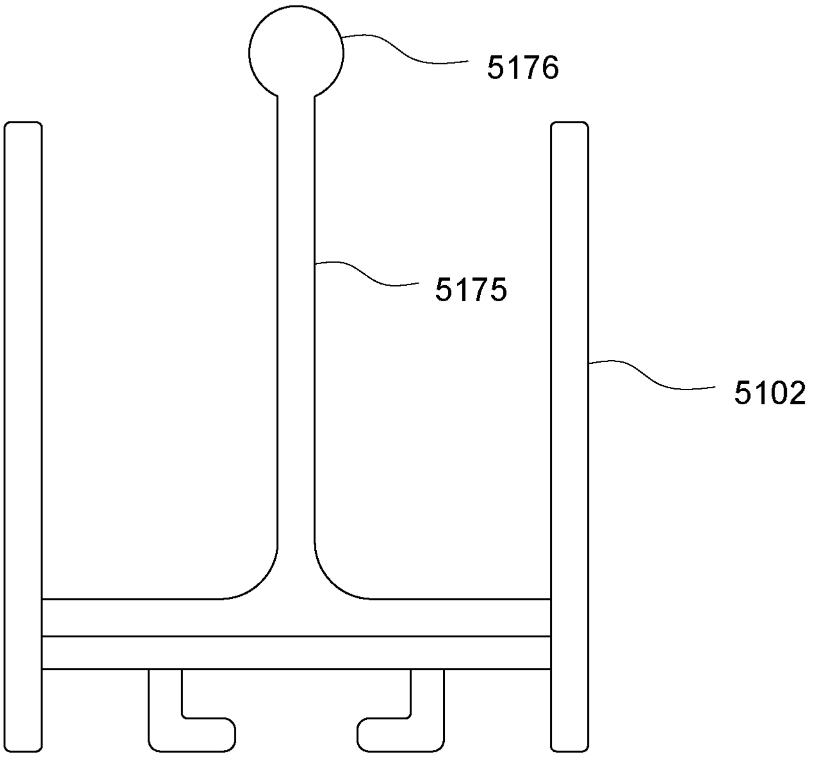
FIG. 51 is a front view of a W-shaped support rail including a center integrated cleaning track according to one embodiment.

FIG. 51 is a side view of a W-shaped support rail 5102 including a center integrated cleaning track 5175 according to another embodiment. Center integrated cleaning track 5175 comprises a vertical distal end having a knob 5176 to engage with a cleaning mechanism (not shown) to clean panels while engaging the mechanism on knob 5176 to secure it to the structure. Preferably, track 5175 is configured for self-clean mechanism (brush or squeegee for example) that is movably supported on opposed sides by cleaning tracks 5175 on either side of the panel or columns of panels. The cleaning mechanism tracks down the sides of the panels (e.g., the gaps between adjacent panels) as it moves across the surface of the panels.

Figure 52:
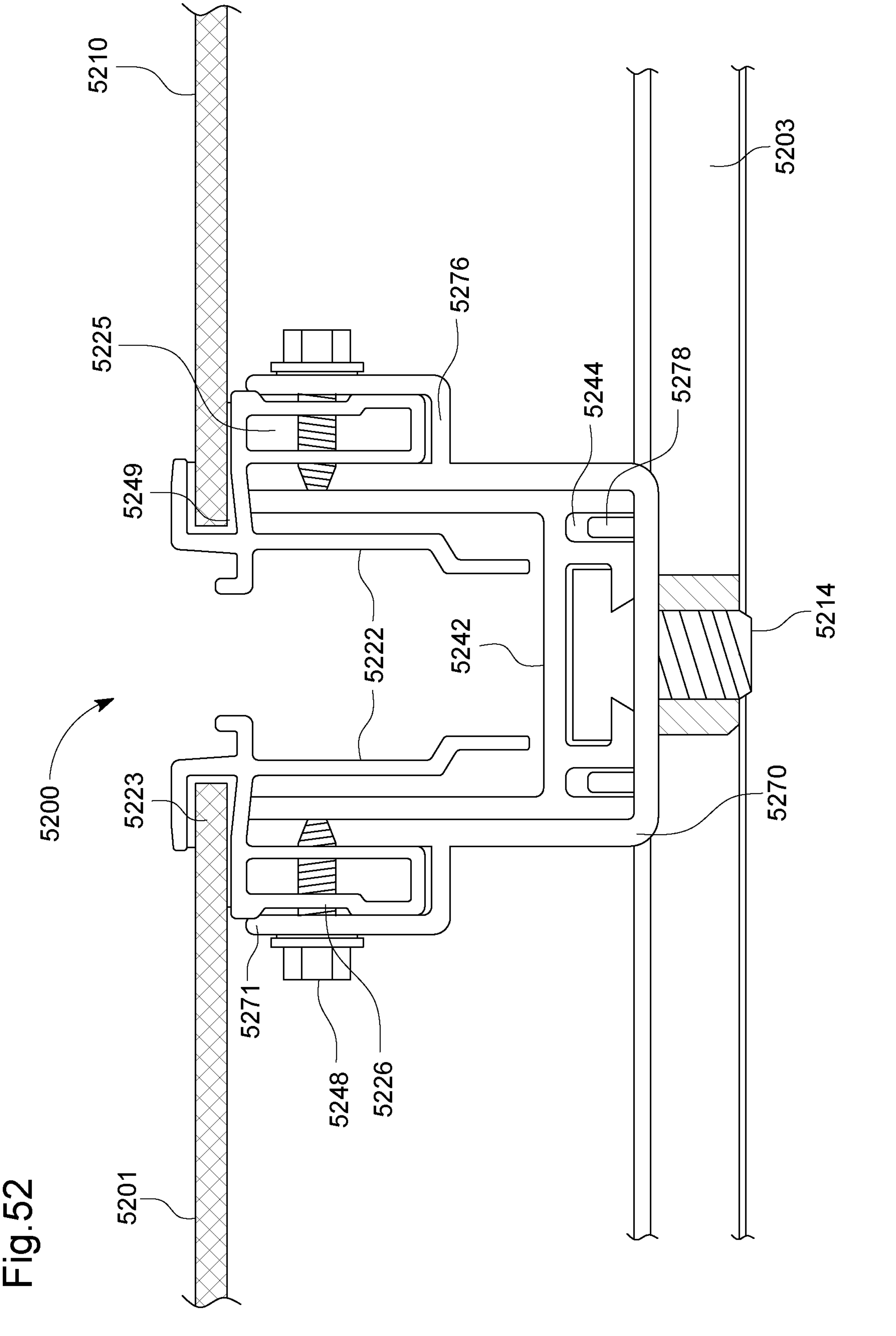
FIG. 52 is a front view of adjacent sides of a pair of solar panels connected to a purlin by side rails and a shaped clip bolted to a channel rail according to one embodiment.

FIG. 52 shows a front view of a section of an assembled photovoltaic panel structure 5200 according to one embodiment including a side edge of photovoltaic panel 5201 and a side edge of adjacent photovoltaic panel 5210, each connected to purlin 5203 by "f-o shaped" side rails 5222 and a U-shaped channel rail 5242. The term "f-o shaped" refers to a shape comprised of a stylized "f" connected to a stylized "o" or rectangular feature as shown. Side edge of photovoltaic panel 5201 and side edge of adjacent photovoltaic panel 5210 are each connected to purlin 5203 by an f-o shaped side rail 5222 having a top slot opening 5223 configured to insert the edge of respective photovoltaic panels 5201/5210 and secured with glue 5249, as shown. Each f-o shaped side rail 5222 is connected to a side of the U-shaped channel rail 5242 using bolts or screws 5248, according to one embodiment. In the illustrated embodiment, structure 5200 comprises a U-shaped clip 5270 configured to be placed anywhere along the length of U-shaped channel rail 5242 and rails 5222 and to help align the solar panels and rails 5222. Preferably, rails 5222 comprise an open cavity 5225 (as shown) in the "o" shaped portion of the side rails 5222 to increase the strength of the structure and allow insertion of screw 5243 that need not penetrate into the channel rail 5242. Preferably, U-shaped clip 5270 comprises U-shaped clip structures 5276 configured to accommodate the "o" shaped portion and cavity 5225 of a side rail 5222 and screw 5248. Preferably, U-shaped clip 5270 is configured to accommodate insertion of the U-shaped channel rail 5242, as shown. Preferably, U-shaped channel rail 5242 comprises bottom slots 5244 configured to accommodate one or more protrusions 5278 on the bottom of the interior volume of the U-shaped clip 5270, as shown, to align and orient the U-shaped channel rail 5242 within the U-shaped clip 5270. Preferably, the outer distal ends of U-shaped clip 5270 include a snap-on component 5271 (preferably a hook-like structure, as shown) configured to snap onto slot or indent 5226 on the outer surface of the "o" shaped portion of cavity 5225 to allow the U-shaped clip 5270 to be snapped on anywhere along the length of the rail 5222. Further, U-shaped clip 5270 is loosely connected to the U-shaped channel rail 5242, illustrated with a T-bolt 5214 slidably held within a channel under the channel rail 5242, and extending away through the clip 5270 held with the nut threadably engaged with the T-bolt 5214. When desirable to secure the assembled panel and components, the nut is tightened securing the assembly together.

Figure 53:
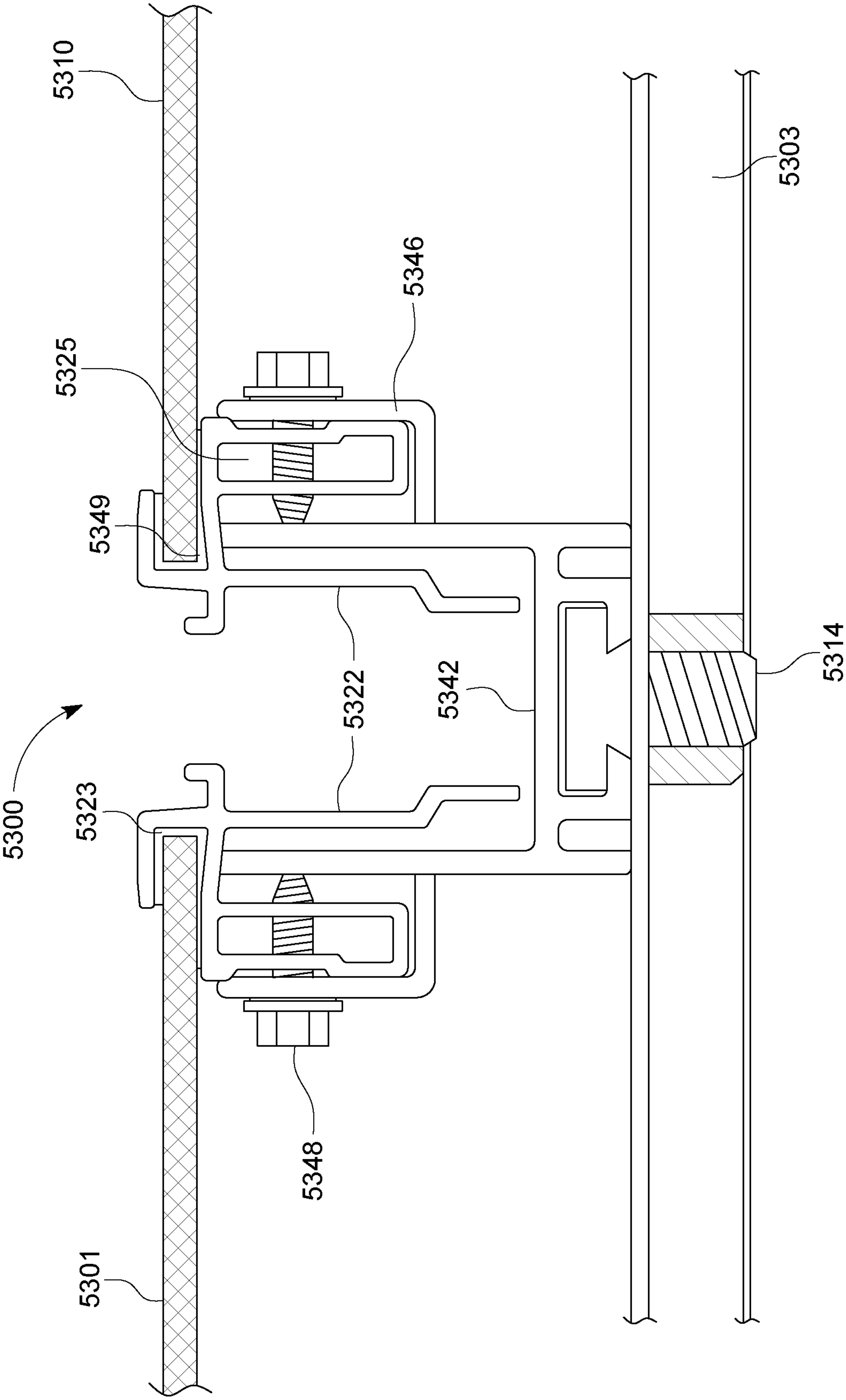
FIG. 53 is front view of adjacent sides of a pair of solar panels connected to a purlin by side rails connected to a channel rail according to another embodiment.

FIG. 53 shows a front view of a section of an assembled photovoltaic panel structure 5300 according to another embodiment including a side edge of photovoltaic panel 5301 and a side edge of adjacent photovoltaic panel 5310, each connected to purlin 5303 by an "f-o shaped" side rail 5322 for each panel and a triple-U-shaped rail support 5342 for both panels 5301/5310. The term "f-o shaped" refers to a shape comprised of a stylized "f" connected to a stylized "o," as shown. Side edge of photovoltaic panel 5301 and side edge of adjacent photovoltaic panel 5310 are each connected to purlin 5303 by an f-o shaped side rail 5322 having a top slot opening 5323 configured to insert the edge of respective photovoltaic panels 5301 or 5310 and secured with glue 5349, as shown. Each f-o shaped side rail 5322 is connected to a side of the triple-U-shaped channel rail 5342 using bolts or screws 5348, according to one embodiment. The triple-U-shaped channel rail 5342 is connected directly to the purlin 5303 using bolt or screw 5314, as shown. Preferably, side rails 5322 comprise an open cavity 5325 in the "o" shaped portion of the side rails 5322 (as shown) to increase the strength of the structure and includes an opening (not shown) to allow insertion of screw 5348. FIG. 53 is similar to FIG. 52 but omits the U-shaped clip 5270 shown in FIG. 52, integrating U-shaped structures 5346 on either side of the center U-shaped channel. More specifically, triple-U-shaped channel rail 5342 comprises opposed U-shaped structures 5346 configured to accommodate the "o" shaped portion of the side rails 5322 and cavity 5325 of rail 5322 and screw 5348, as shown.

Figure 54A:
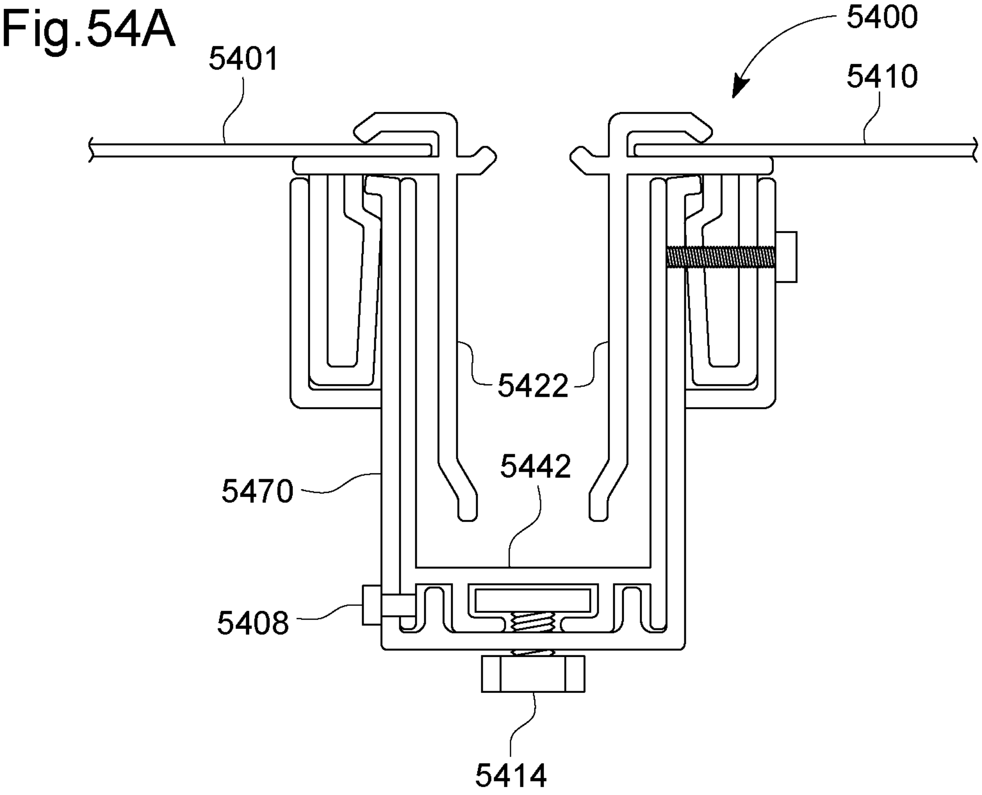
FIG. 54A is a front view of adjacent sides of a pair of solar panels connected to side rails and a shaped clip bolted to a channel rail according to another embodiment.

FIG. 54A shows a front view of a section of an assembled photovoltaic panel structure 5400 according to another embodiment including a side edge of photovoltaic panel 5401 and a side edge of adjacent photovoltaic panel 5410, each connected to purlin (not shown) by an "f-o shaped" side rail 5422 and a U-shaped rail support 5442. Preferably, structure 5400 comprises a U-shaped clip 5470 configured to be placed at desirable locations along the length of side rails 5422, preferably three or four on each side of a panel, and to help align the solar panels and rails 5422. Further, U-shaped clip 5470 is loosely connected to the U-shaped channel rail 5442, illustrated with a T-bolt 5414 slidably held within a channel under the channel rail 5441, and extending away through the clip 5470 held with a nut threadably engaged with the T-bolt 5414. When desirable to secure the assembled panel and components, the nut is tightened securing the assembly together. Additionally, a screw 5408 may be placed through a bottom of the U-shaped clip 5470 and into the U-shaped channel rail 5442 as shown to ensure electrical bonding between the U-shaped clip 5470 and the U-shaped channel rail 5442, and beneficially also prevent the U-shaped clip 5470 from slipping relative to the U-shaped channel rail 5442.

Figure 54B:
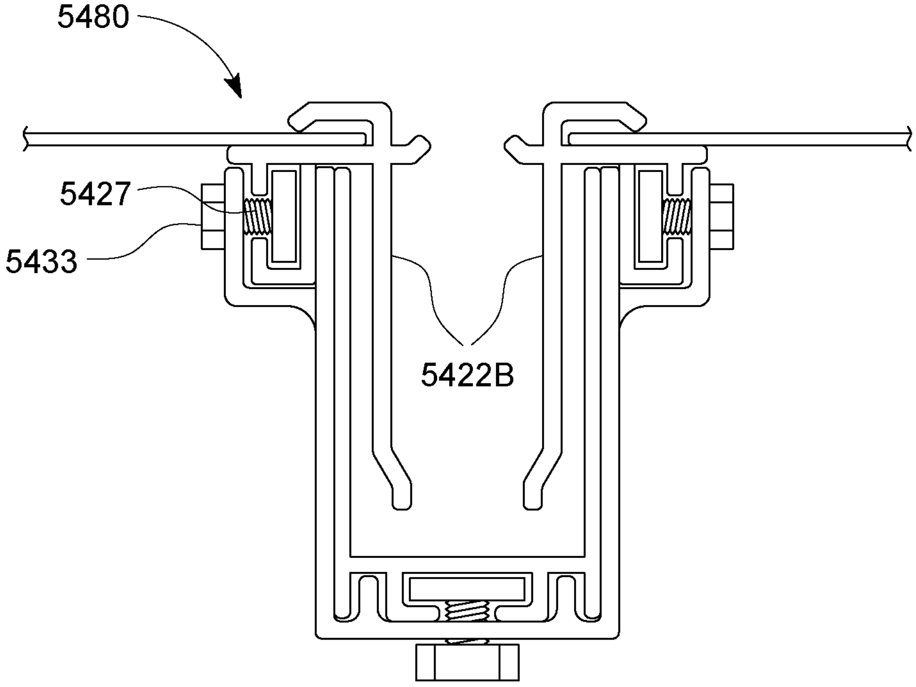
FIG. 54B is a front view of adjacent sides of a pair of solar panels connected to side rails and a shaped clip bolted to a channel rail according to another embodiment.
Figure 54C:
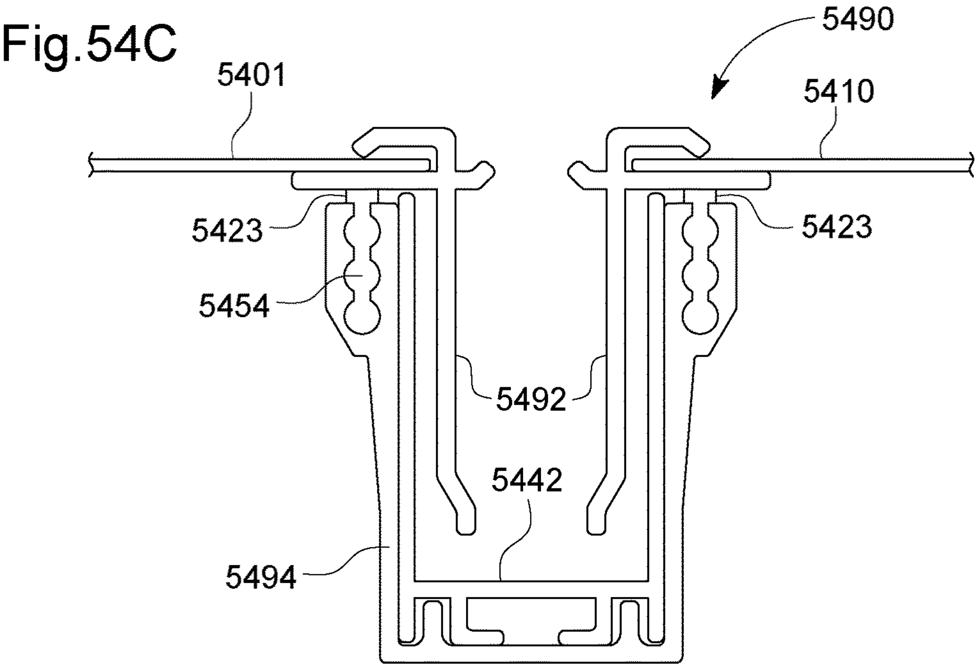
FIG. 54C is a front view of adjacent sides of a pair of solar panels connected to side rails and a U-shaped clip placed beneath a channel rail according to another embodiment.
Figure 54D:
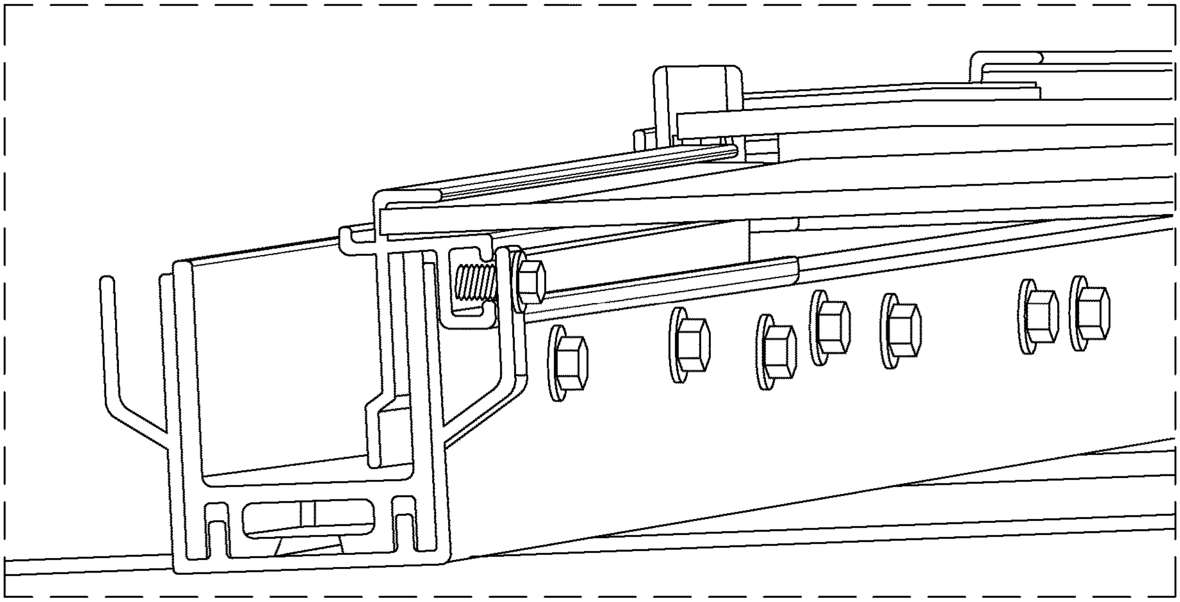
FIG. 54D is a front side perspective view of the embodiment shown in FIG. 54A including a section of a row of three shingled panels.

FIG. 54B shows a front view of a section of an assembled photovoltaic panel structure 5480 according to another embodiment. One feature is an opening 5427 in the "o" shaped portions of the side rails 5422B allowing a t-bolt 5433 or other nut/bolt type assembly to be slid into the "o" shaped portion with the threaded end extending through the opening 5427 permitting the clip and side rail to be loosely connected during install and then tightened when the structure is complete. Alternately, the opening 5427 could be located in the bottom of the "o" shaped portions of the side rails 5422B and secured from below. FIG. 54C shows a front view of a section of an assembled photovoltaic panel structure 5490 according to another alternative embodiment where the connection between the rails 5492 and clip 5494 is made via an interlocking configuration as shown. Specifically, in one embodiment, side rails 5492 are formed including a top slot opening 5423 configured to receive and secure the edge of respective photovoltaic panels 5401/5410. Side rails additionally include a descending friction fit connector 5454, for example having spaced, shaped protrusions or alternately indentations to engage with a U-shaped clip 5494. The clip 5494 may be placed at desired locations, anywhere along the length of U-shaped rail support 5442 but preferably not where the channel rail intersects with purlin supports (not shown). In this embodiment, U-shaped clip 5494 comprises a complimentarily shaped female receptacle to accept the friction fit connector 5454 either: pressed down onto the receptacle until the protrusions are accommodated; or slid in sideways/axial manner over the protrusions to the desired location. The clip 5494 connects to the bottom channel of the U-shaped rail support 5442 as described above. In embodiments, the connector/receptacle interface can be further secured with adhesive. FIG. 54D is a front side perspective view of the embodiment shown in FIG. 54B.

Figure 55:
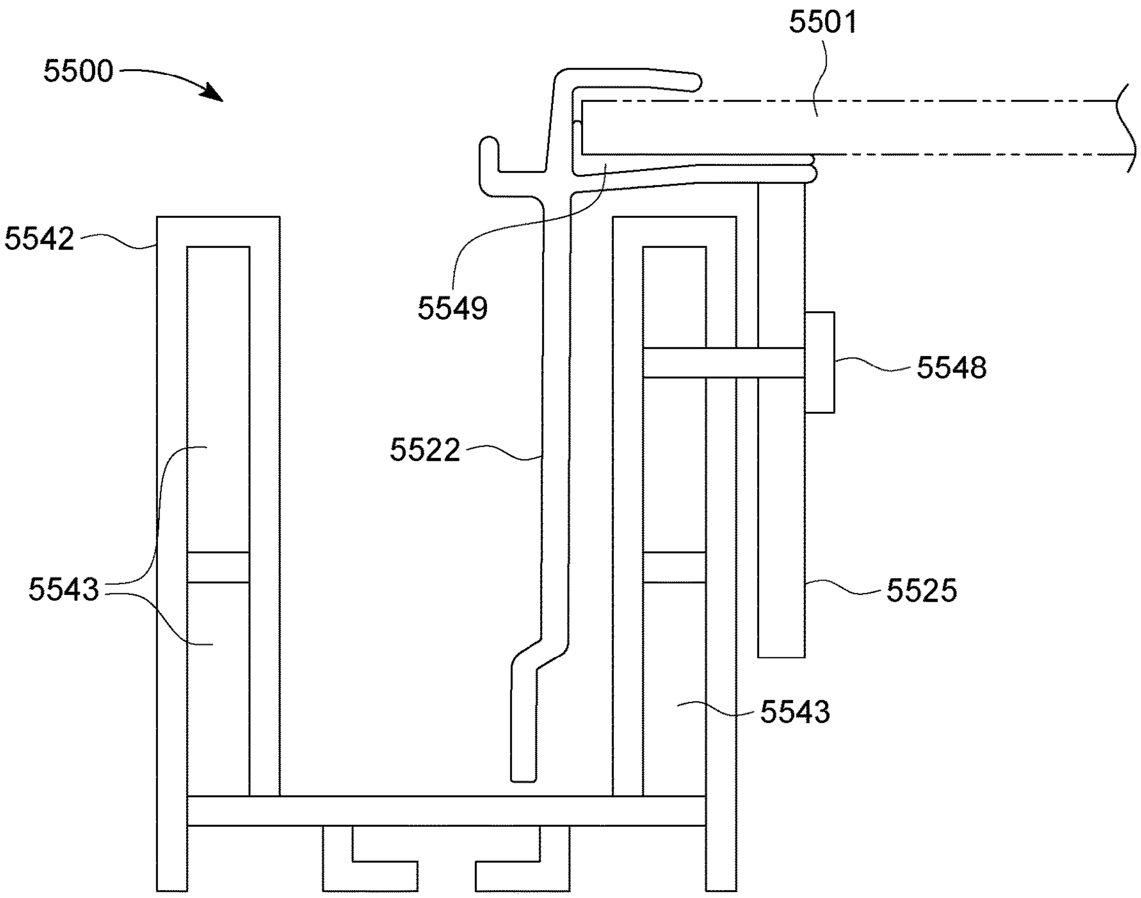
FIG. 55 is a front view of a side rail embodiment connected to the side of a panel and connected to a modified channel rail according to one embodiment.

FIG. 55 shows an alternate embodiment of side rails 5522 and channel support 5542. Side rail 5522 includes a top slot 5523 connected to the side of a solar panel 5501 (and secured with glue 5549). Below top slot 5523, side rail 5522 also includes a downward extending flange 5525 to define a space to accommodate one side of a channel support 5542. As shown, the U-shaped rail support 5542 comprises cavities 5543 formed by double-walls for further strength and support and to prevent or minimize the screw or bolt 5548 extending into the central channel.

Figure 56:
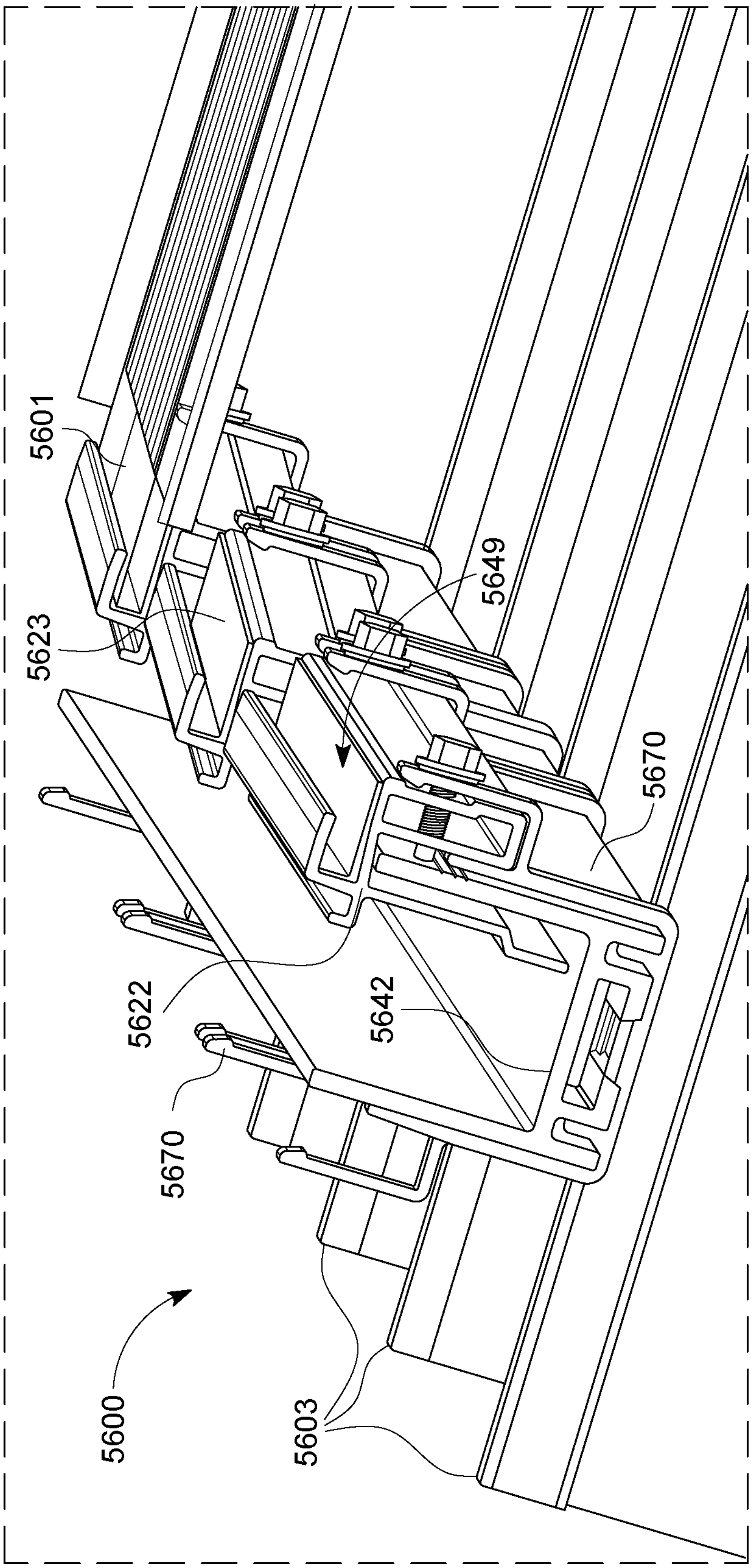
FIG. 56 is a front perspective view of a row of side rails in the shingling configuration connected to a shaped clips connected to a channel rail according to one embodiment.

FIG. 56 shows a front view of a section of a partially assembled photovoltaic panel structure 5600 according to another embodiment with some panels missing to reveal detail. The structure 5600 includes a side edge of photovoltaic panel 5601 connected to purlin 5603 by an "f-o shaped" side rail 5622 and a U-shaped rail support 5642. As shown, structure 5600 comprises a U-shaped clip 5670 configured to be placed anywhere along the length of rail 5622 and U-shaped channel rail 5642 and to help align and/or orient the solar panels and rails 5622 and hold the assembly to the purlin 5603. As illustrated above, the U-shaped clip 5670 connects under the U-shaped channel rail 5642 to a channel that receives the head of a T-bolt (not shown) and extends through the clip 5670 held in place with a nut. As shown, the forward most side rail in a parallel orientation with the channel rail, and successive side rails are disposed in a "shingled" orientation—not parallel to the channel rail.

Figure 57A:
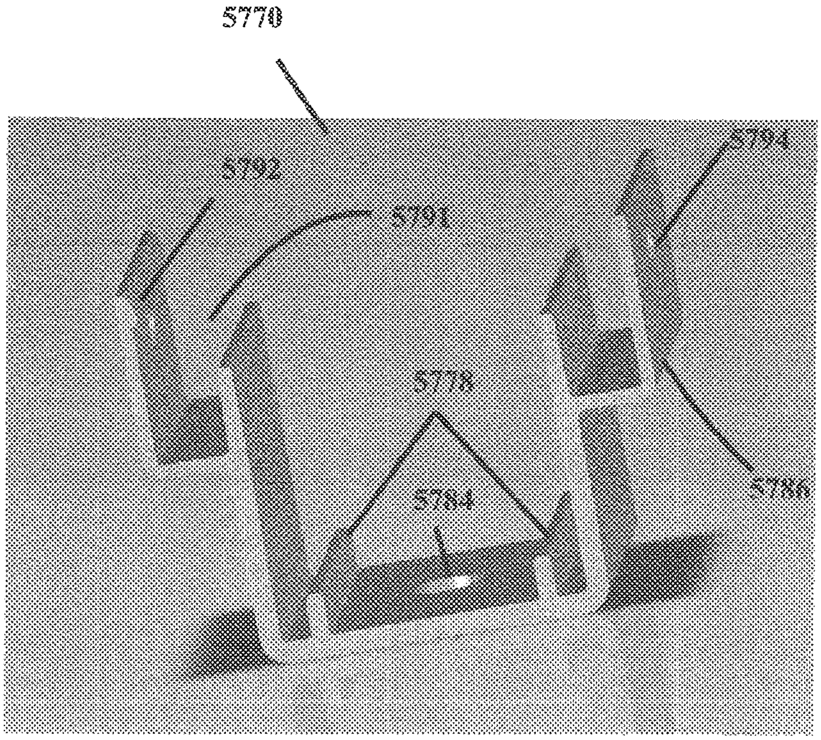
FIG. 57A is a front side perspective view of a shaped clip according to one embodiment.
Figure 57B:
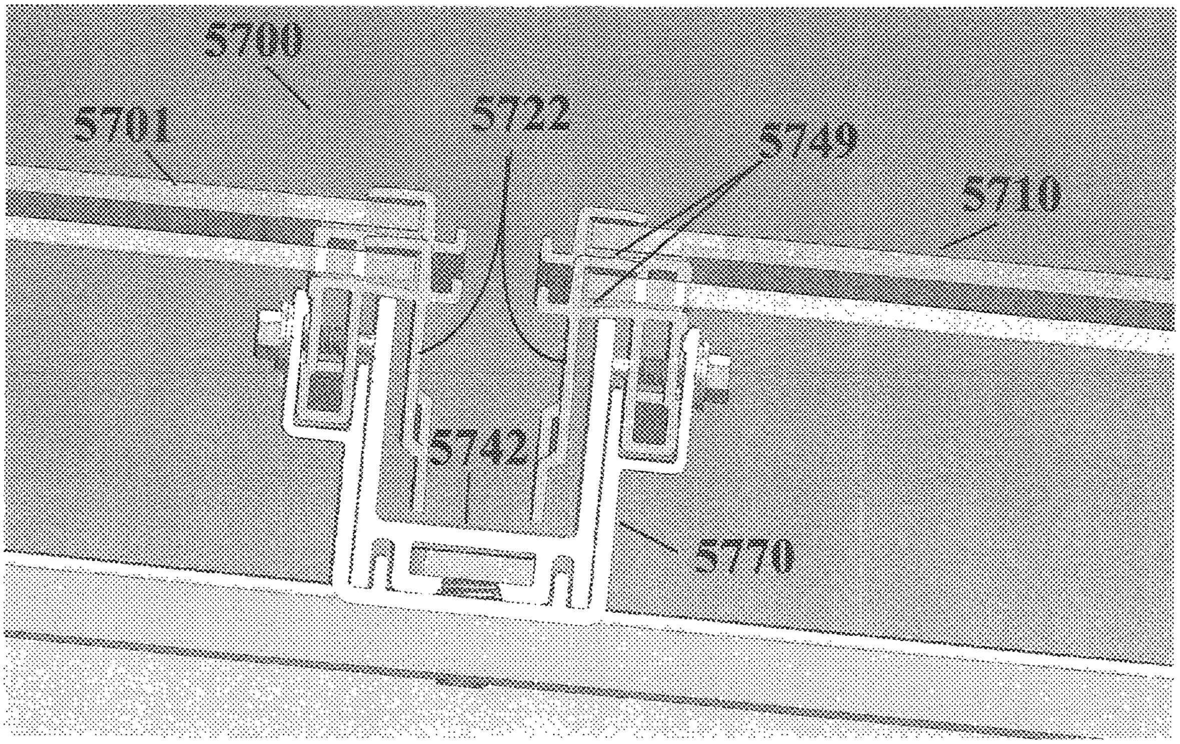
FIG. 57B is a front view of a portion of an assembled photovoltaic panel structure showing the shaped clip of FIG. 57A connected to a pair of side rails of a pair of adjacent panels.

FIG. 57A shows a triple-U-shaped clip 5770 according to one embodiment. As shown, the triple-U-shaped clip 5770 has an opening 5784 through the bottom of the middle U-shape for a bolt, nut or screw (not shown). The inner bottom of the middle of U-shaped clip 5770 includes protrusions 5778 configured to slidably fit into corresponding slots on the bottom of a U-shaped side panel support or channel rail (not shown). U-shaped clip 5770 includes U-shaped slots 5791 configured to accommodate a component (e.g., the o-portion of the f-o shaped rail), not shown. Preferably, U-shaped slots 5791 comprise a snap-on component as shown and opening 5794 for nut, bolt or screw (not shown). FIG. 57B is a front perspective view of a portion of an assembled photovoltaic panel structure showing the U-shaped clip 5770 of FIG. 57A connected to a U-shaped rail support 5742 and to the side rails 5722 of adjacent panels 5701/5710. Panels 5701/5710 are connected to side rails 5722 with glue 5749 (or tape or other adhesive).

Figure 58:
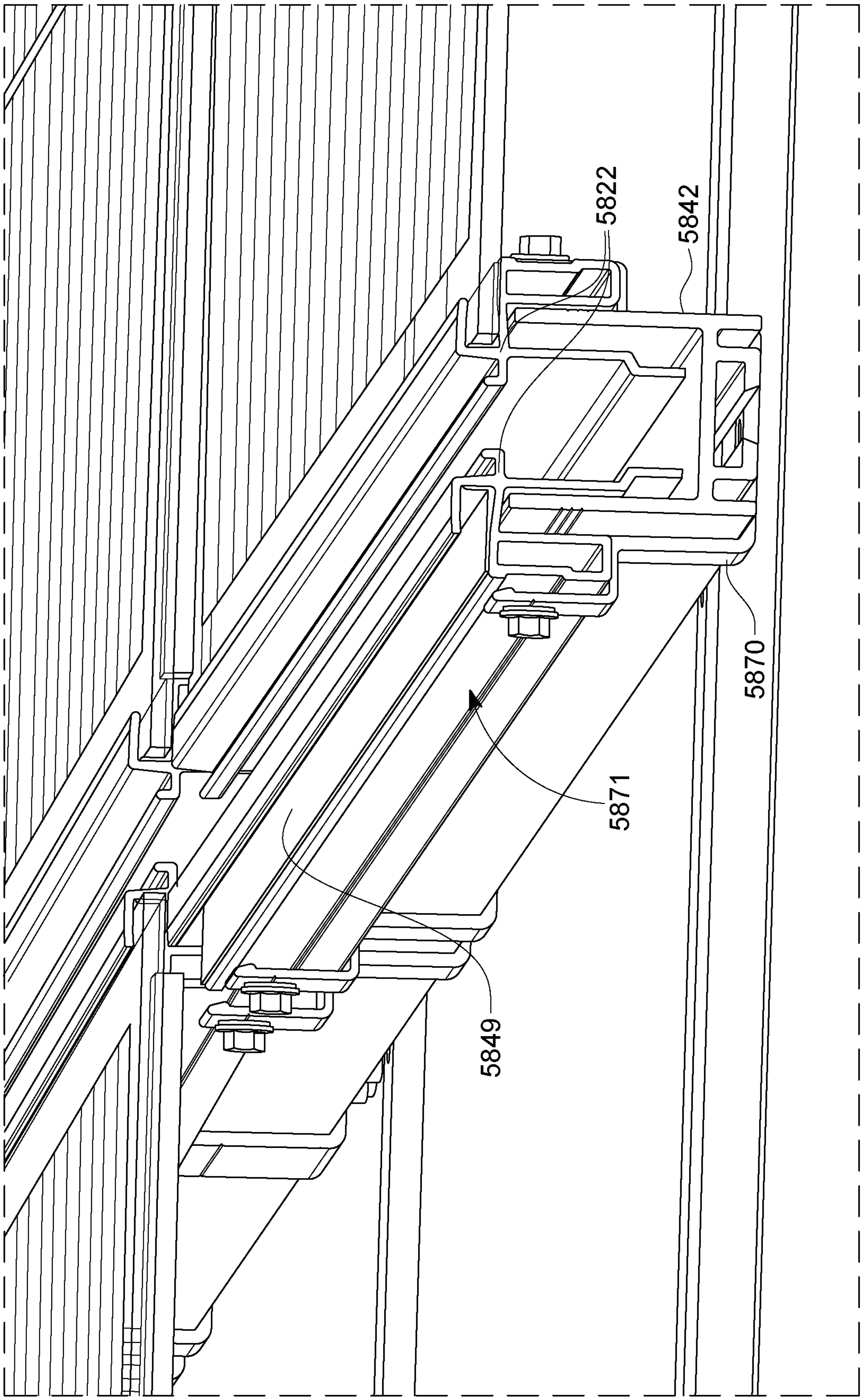
FIG. 58 is a top side perspective from view of a photovoltaic panel structure including the adjacent sides of a pair of adjacent panels and shingled panels and showing a side front view of side rails connected to a shaped clip according to one embodiment of the invention.

FIG. 58 shows a partially assembled photovoltaic panel structure showing a side front view of side rails 5822 connected to a U-shaped side rail support 5842 and U-shaped clip 5870 according to one embodiment of the invention. As shown in FIG. 58, slot 5871 allows clip 5870 placement anywhere along the length of side rail 5822 and the clip may be temporarily held in place in the slot. Moreover, clip 5870 engages with the side rail 5822 variably to permit a range of connection points caused by the shingling effect of panels in a column. Glue 5849 (or tape or other adhesive) can be applied to one or more surfaces of the panel slot of the side rail 5822, as shown.

Moreover, the preferred embodiments using pre-punched components means faster field installation. In addition, preferably, the screws only have to penetrate through the panel's shingle rail which eliminates the need for tek screws to penetrate through the channel rail.

Figure 59:
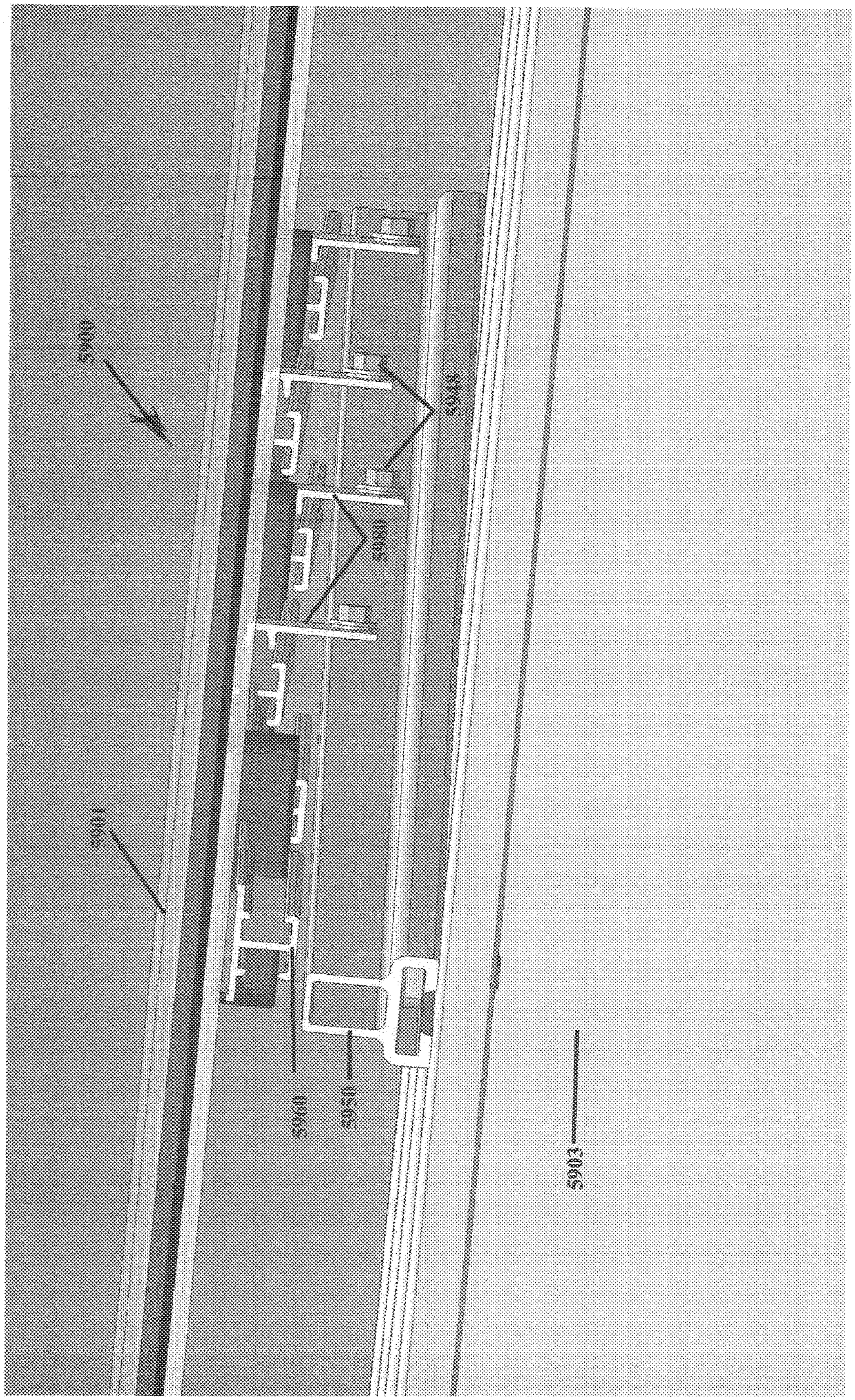
FIG. 59 is a side front perspective view of a center of a partially assembled photovoltaic panel structure showing a side front view of a center rail connected to a purlin and a center supports connected to a panel and center clips connecting the center rail to the center supports according to one embodiment of the invention.

FIG. 59 shows an assembled photovoltaic panel structure 5900 showing a side front view of center rails 5960, a center rail support 5950 and clips 5980 configured to slidably or otherwise connect to center rails 5960 and connected to center rail support 5950 with nut, bolt or screw 5948. Center rail support 5950 is an alternative design compared to the center rail support shown in FIG. 39 and includes a double-wall rail for added strength. This secondary wall also creates a cavity that hides the screws tips which penetrate first through the added clip 5980, then through one of the side walls of the double-wall rail. Center rail 5960 performs the same functions as the center rail shown in FIG. 41 but has a lower profile that allows for tighter stacking and nesting of the panels. Preferably, clips 5980 are F-shaped as shown and configured to snap, clip, or slide onto the center rail 5960 and extend down to connect to center rail support 5950 as shown.

Figure 60C:
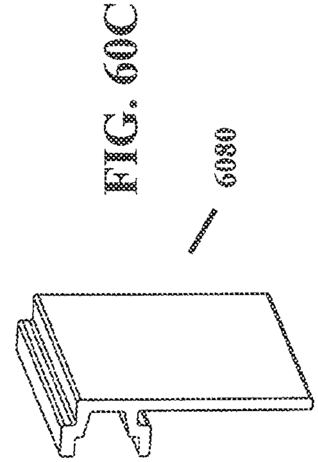
FIG. 60C is a F-shaped vertical clip shaped to be received by or slide into a slot of the T-shaped center support of FIG. 60B.
Figure 60B:
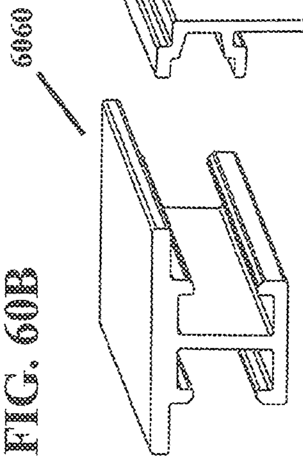
FIG. 60B is a front perspective view of a T-shaped center support having a configured slot in each side.
Figure 60D:
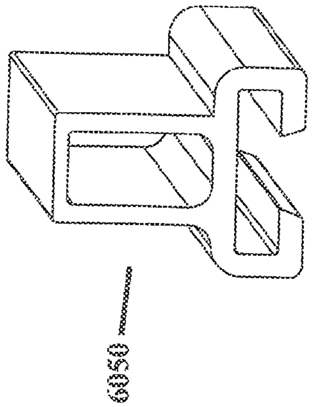
FIG. 60D is a front perspective view of a doubled walled center rail according to one embodiment.
Figure 60A:
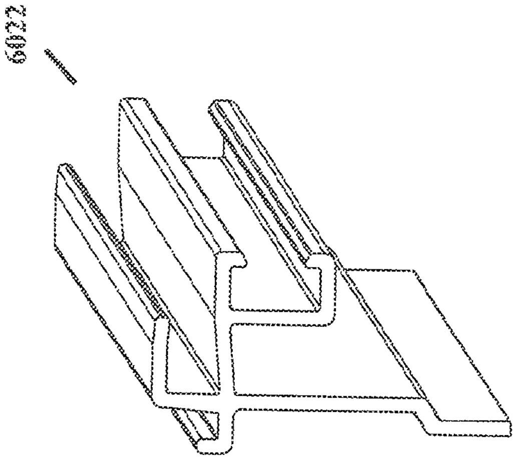
FIG. 60A is a front perspective view of an F-shaped side rail according to one embodiment of the invention.

FIG. 60A shows F-shaped side rail 6022 according to one embodiment of the invention. FIG. 60B shows a T-shaped center rail 6060 having a configured slot in each side. FIG. 60C is a F-shaped vertical extender 6080 configured to clip into or slide into the slot of the T-shaped connector 6060 of FIG. 60B. FIG. 60D is a front perspective view of a center rail support 6050 according to one embodiment.

FIG. 61A shows assembled solar support structure 6100 with assembled photovoltaic panels 6101 and purlin support structure 6103 according to another embodiment. FIG. 61B shows the photovoltaic panel support structure shown in FIG. 61A showing a single row of exploded panels. FIGS. 61A/61B show exemplary clips 6160 connected to side rails/side rail supports.

Figure 62C:
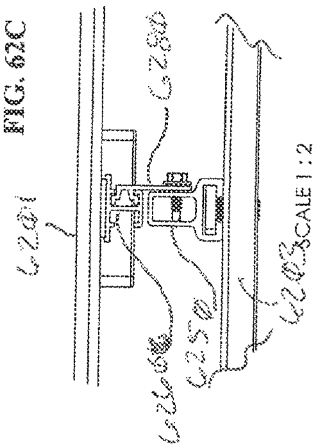
FIG. 62C is a front view of the center of a panel showing a center rail connected on a purlin and a T-shaped center support connected together by an F-shaped clip according to another embodiment.
Figure 62B:
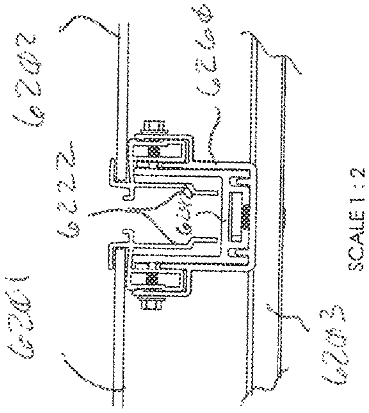
FIG. 62B is a front view of adjacent sides of a pair of panels connected to a purlin with side rails connected to a shaped clip connected to a channel rail.
Figure 62D:
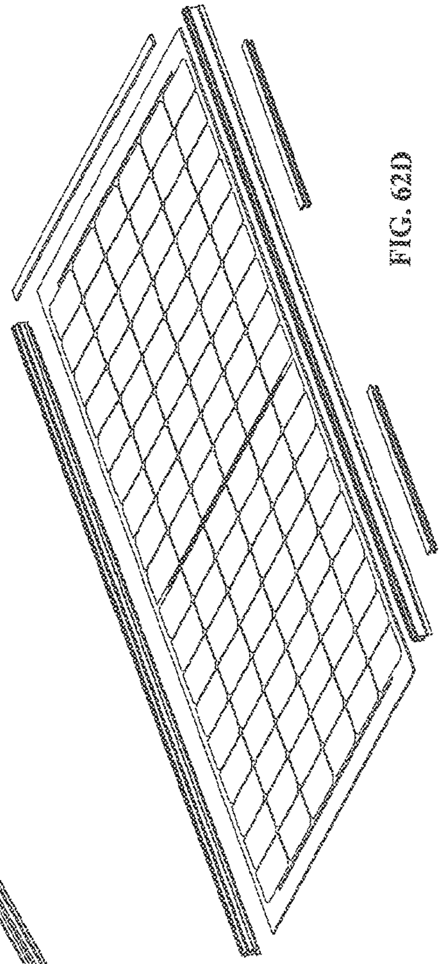
FIG. 62D is a top side view of a solar panel and the unassembled side rails, unassembled center supports and an unassembled gasket according to one embodiment.
Figure 62A:
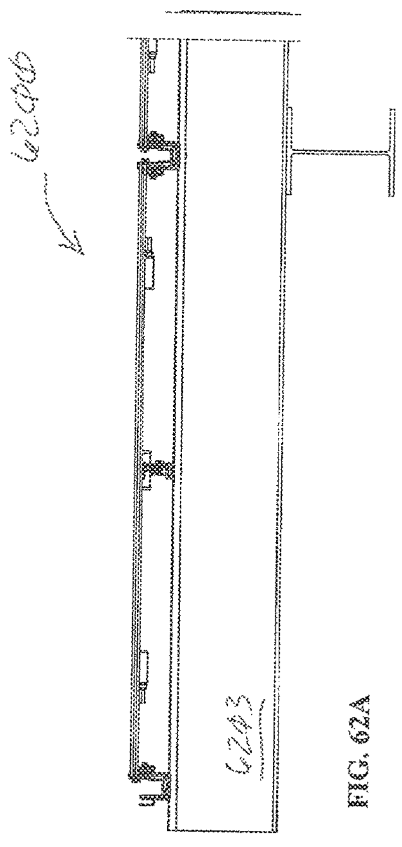
FIG. 62A is a front view of an assembled solar support structure according to one embodiment.
Figure 62E:
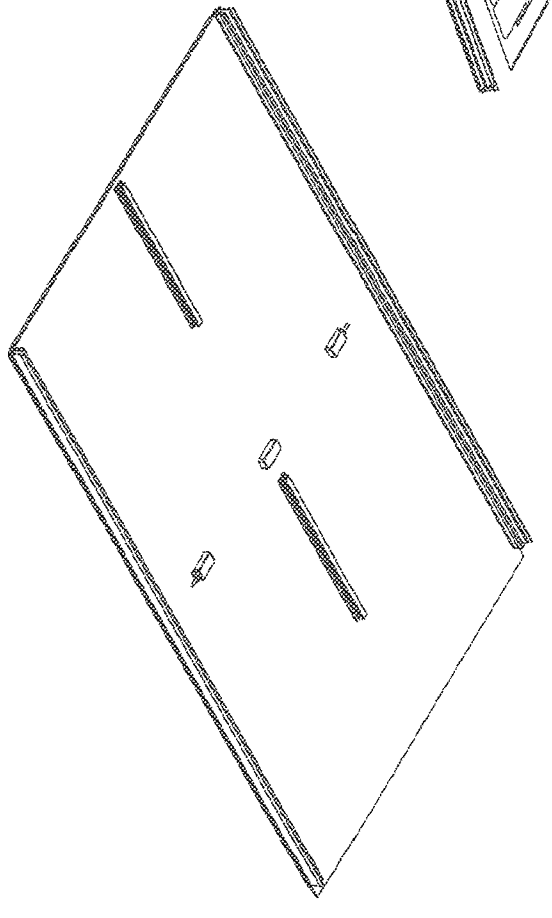
FIG. 62E is a bottom view of a solar panel with side rails and center supports connected according to one embodiment.

FIG. 62A shows an assembled solar support structure 6200 according to one embodiment. FIG. 62B shows adjacent panels 6201, 6202 connected on a purlin 6203 with side rails 6222, a U-shaped side rail support 6242 and U-shaped clip 6260. FIG. 62C shows a center rail 6260 connected 6280 on a purlin 6203 by a center rail support 6250. FIG. 62D shows a solar panel and the unassembled side rails and side rail supports according to one embodiment. FIG. 62E is a bottom view of a solar panel and a side rail connected on each side and center rails according to one embodiment.

Figure 63B:
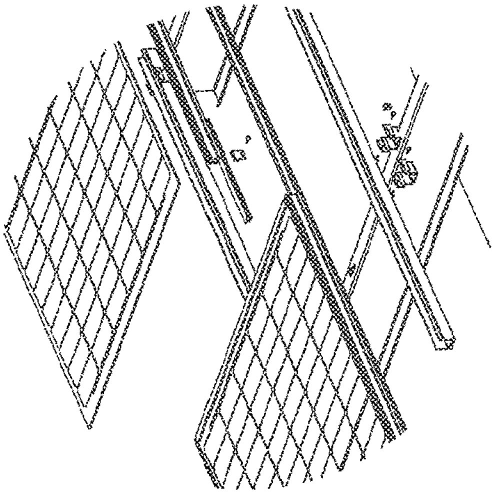
FIG. 63B is a close-up side top perspective view of unassembled panels and unassembled side rails and center rails and clips according to another embodiment.
Figure 63A:
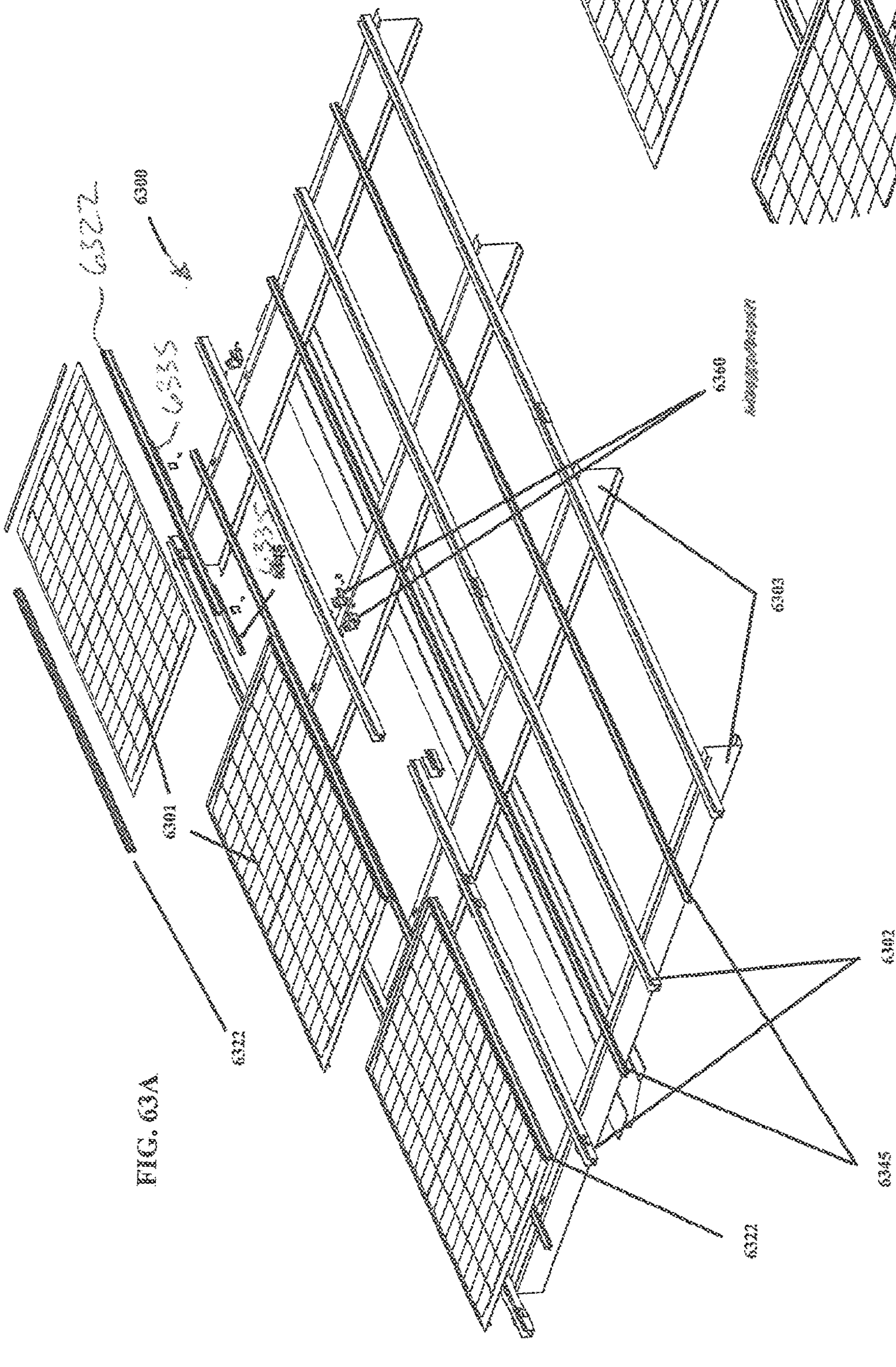
FIG. 63A is a perspective top view of a solar support structure with a row of unassembled photovoltaic panels and partially assembled support structure according to one embodiment.

FIG. 63A shows a partially assembled solar support structure 6300 with a row of three unassembled photovoltaic panels 6301 configured to be assembled onto a purlin 6303 support structure according to another embodiment. FIG. 63A shows assembled and unassembled side rails 6322, assembled and unassembled side rail supports 6302, assembled and unassembled center rails 6335, center rail supports 6345, and unassembled U-shaped clips 6360 and other components of the system. FIG. 63B shows an excerpt of the photovoltaic panel support structure shown in FIG. 63A showing a row of adjacent partially assembled panels including unassembled clips 6360.

Figure 64:
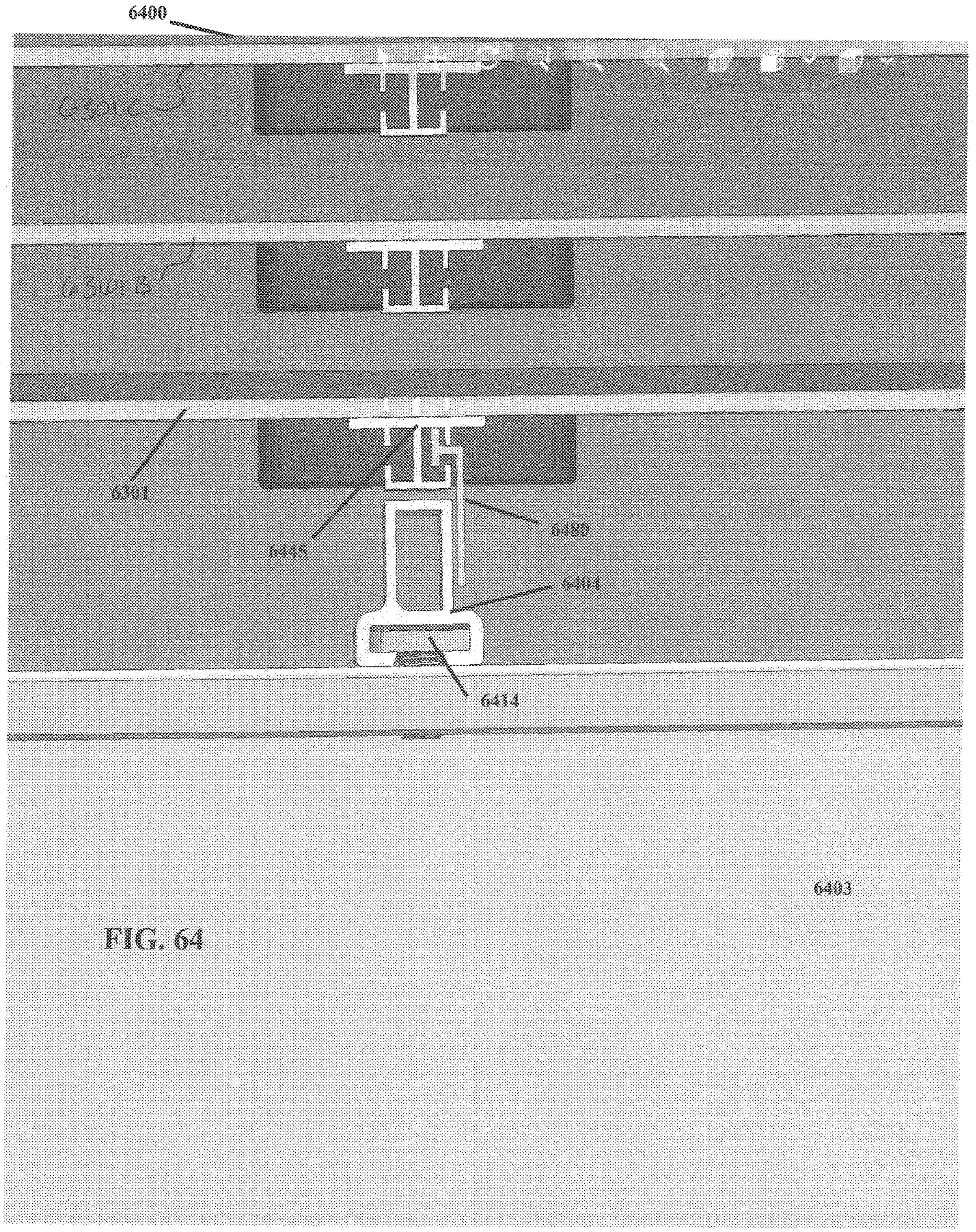
FIG. 64 is a front view of the center of a solar panel connected to a purlin by a center rail and center support with clip and showing for illustration purposes spacing provided by the stacked arrangement.

FIG. 64 shows a center section of a first assembled solar support structure 6400 and attached to purlin 6403 by center rail 6445, a center rail support 6404 and an unconnected vertical extender clip 6480. Also illustrated are two panels 6301B and 6301C to illustrate the clearance with the panels in the stacked arrangement.

Figure 65:
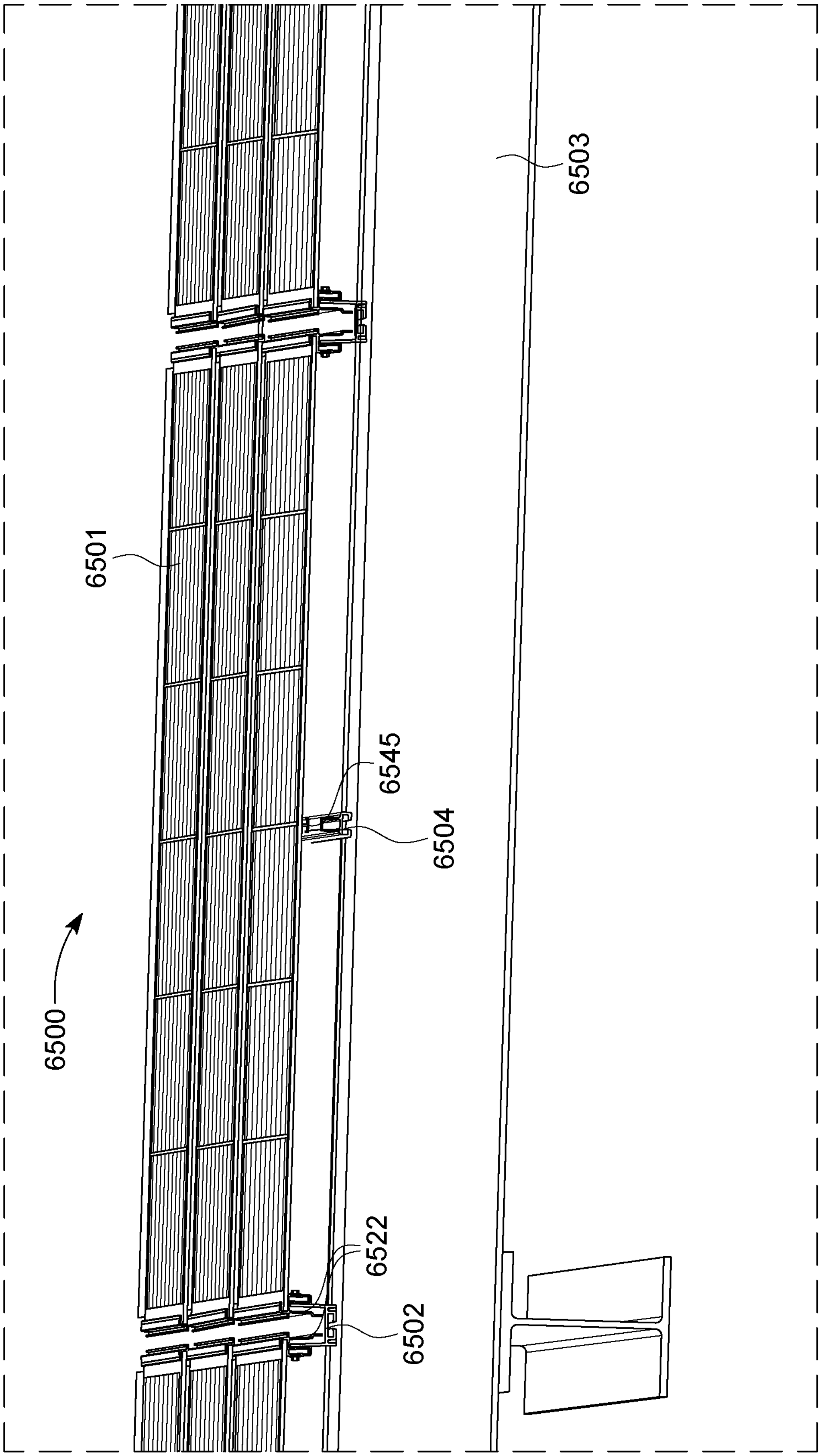
FIG. 65 is a top view of an assembled solar support structure according to one embodiment.

FIG. 65 is a top view of an assembled solar support structure 6500 according to one embodiment. Structure 6500 includes solar panels 6501 assembled onto purlin 6503 by side rails 6522 connected to the sides of each panel 6501 and the side rails 6522 connected to U-shaped rail supports 6502, which in turn connected to purlin 6503. Structure 6500 further includes center rails 6545 connected to center rail supports 6504 to provide additional support for each panel 6501. As shown, the U-shaped rail supports 6502 can each accommodate the side rails 6522 from adjacent panels 6501. The configuration of components shown in FIG. 64 allow the U-shaped rail supports 6502 and pair of adjacent rails 6522 to act as automatic rail placement spacers and guides to aid in installation. That is, after the panels are placed on the rails 6522, the rails will self-align and thus square-up the panels 6501. The rails 6522 can then be torqued to specifications via the T-bolt (not shown). This is advantageous compared to methods where the rails are first torqued down and then the panels placed on top of the rails and fastened to the rails.

In the description above, for purposes of explanation only, specific nomenclature is set forth to provide a thorough understanding of the present disclosure. However, it will be apparent to one skilled in the art that these specific details are not required to practice the teachings of the present disclosure.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The description of the scope of the present devices, systems and methods, etc., may include both means plus function and step plus function concepts. However, the claims are not to be interpreted as indicating a "means plus function" relationship unless the word "means" is specifically recited in a claim, and are to be interpreted as indicating a "means plus function" relationship where the word "means" is specifically recited in a claim. Similarly, the claims are not to be interpreted as indicating a "step plus function" relationship unless the word "step" is specifically recited in a claim, and are to be interpreted as indicating a "step plus function" relationship where the word "step" is specifically recited in a claim.

It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

The invention claimed is:

1. A solar panel structure comprising:

a support structure including a plurality of essentially parallel channel rail supports including a first parallel channel rail support and a second parallel channel rail support;

a plurality of photovoltaic panel assemblies including a first photovoltaic panel assembly, wherein each of said plurality of photovoltaic panel assemblies comprises a top end edge, a bottom end edge, a first side edge and a second side edge and wherein the first side edge is essentially parallel to and connected to the first parallel channel rail support and the second side edge is essentially parallel to and connected to the second parallel channel rail support;

a first purlin supporting the plurality of essentially parallel channel rail supports including the first parallel channel rail support and the second parallel channel rail support and attached thereto in an orthogonal arrangement, the first purlin further connected to at least one top end edge support affixed (i) between said first side edge and said second side edge, (ii) on a bottom surface of the first photovoltaic panel assembly, (iii) between the first parallel channel rail support and the second parallel channel rail support and (iv) adjacent the top end edge of the first photovoltaic panel assembly; and a second purlin supporting the plurality of essentially parallel channel rail supports including the first parallel channel rail support and the second parallel channel rail support and attached thereto in an orthogonal arrangement, the second purlin further connected to at least one bottom end edge support affixed (i) between said first side edge and said second side edge, (ii) on the bottom surface of the first photovoltaic panel assembly, (iii) between the first parallel channel rail support and the second parallel channel rail support and (iv) adjacent the bottom end edge of the first photovoltaic panel assembly.

2. The solar panel structure of claim 1, wherein said at least one top end edge support and said at least one bottom end edge support each comprise a first support component attached to the bottom surface of the first photovoltaic panel assembly and a second support component attached to the first purlin or second purlin and wherein said first support component slidably interfaces with said second support component to resist photovoltaic panel assembly deflection relative to the first photovoltaic panel assembly.

3. The solar panel structure of claim 2, wherein said first support component comprises a channel and said second support component includes an element configured to slidably interface with the channel, wherein said channel is configured to receive and connect the element of the second support component.

4. The solar panel structure of claim 2, wherein said second support component (a) is configured to connect to a shaped channel of said first support component using a connector configured to connect to the shaped channel and (b) said second support is also configured to connect to said first purlin or second purlin thereby connecting the second support component to said first purlin or second purlin.

5. The solar panel structure of claim 4, wherein the connector is configured to snap into an opening in said first purlin or second purlin.

6. The solar panel structure of claim 1, further comprising at least one foam spacer in between the at least one top end edge support of the first photovoltaic panel assembly and at least one bottom end edge support of an adjacent photovoltaic panel assembly.

7. The solar panel structure of claim 1, wherein the plurality of photovoltaic panel assemblies further includes a second photovoltaic panel assembly and wherein said at least one top end edge support and at least one bottom end edge support of the first photovoltaic panel assembly each comprise a first support component attached to the bottom surface of the first photovoltaic panel assembly and a second support component attached to said first purlin using the at least one top end support or attached to said second purlin using the at least one bottom end support and wherein said at least one top end edge support of the second photovoltaic panel assembly (i) is adjacent to the bottom end edge of the first photovoltaic panel assembly, (ii) comprises a first support component attached to a bottom surface of the second photovoltaic panel assembly, and (iii) is connected to the second support component of the at least one bottom end support of the first photovoltaic panel assembly to thereby affix both the first photovoltaic panel assembly and the second photovoltaic panel assembly to the second purlin.

8. The solar panel structure of claim 1, wherein each of said at least one top end edge support and each of said at least one bottom end edge support comprise at least one adhesive surface configured to adhere to the bottom surface of the first photovoltaic panel assembly.

9. The solar panel structure of claim 1, wherein the plurality of photovoltaic panel assemblies further includes a second photovoltaic panel assembly, wherein the at least one top end edge support of the second photovoltaic panel assembly is shorter than the at least one bottom end edge support of the first photovoltaic panel assembly so that the bottom end edge of the first photovoltaic panel assembly is higher than and overlaps the top end edge of the second photovoltaic panel assembly.

10. The solar panel structure of claim 1, wherein the plurality of photovoltaic panel assemblies further comprises a second photovoltaic panel assembly and wherein the first parallel channel rail support comprises (i) at least a first channel rail support component connected to the first photovoltaic panel assembly and (ii) a second first channel rail support component connected to the second photovoltaic panel assembly, wherein the first channel rail support component is connected to the second channel rail support component with a support connector, wherein the support connector is a screw, bolt, or rivet.

11. The solar panel structure of claim 2, further comprising a gasket between the at least one top end edge support and the bottom surface of the first photovoltaic panel assembly.

12. The solar panel structure of claim 2, wherein the second support component is L-shaped and comprises a prong configured to insert into a prong channel of the first support component and the second support component further comprises a plate component having a plate surface configured to connect to the first purlin.

13. The solar panel structure of claim 2, wherein the second support component has an L-shaped structure including a second support contact component and a substantially perpendicular second support vertical component, wherein the second support vertical component comprises (a) a proximal end connected to the second support contact component and (b) a distal end comprising (i) a first wing configured to substantially slide into a first channel of the first support component and configured substantially perpendicular to the second support vertical component and (ii) a second wing configured to substantially slide into a second channel of the first support component and configured substantially perpendicular to the second support vertical component.

14. A solar panel structure comprising:
- a support structure including a plurality of essentially parallel supports including a first parallel support and a second parallel support;
- at least one purlin orthogonal to the plurality of essentially parallel supports and configured to support the plurality of essentially parallel supports; and
- a plurality of photovoltaic panel assemblies, wherein each photovoltaic panel assembly comprises a top end edge, a bottom end edge, a first side edge and a second side edge and wherein the first side edge is essentially parallel to and connected to the first parallel support and the second side edge is essentially parallel to and connected to the second parallel support,
- wherein the plurality of photovoltaic panel assemblies comprises a first photovoltaic panel assembly adjacent a second photovoltaic panel assembly;
- wherein the solar panel structure further comprises:
  - at least one top end edge support affixed (i) between said first side edge and said second side edge, (ii) on a bottom surface of a first photovoltaic panel assembly, (iii) between the first parallel support and the second parallel support and (iv) adjacent the top end edge of the first photovoltaic panel assembly; and
  - at least one bottom end edge support affixed (i) between said first side edge and said second side edge, (ii) on the bottom surface of the first photovoltaic panel assembly, (iii) between the first parallel support and the second parallel support and (iv) adjacent the bottom end edge of the first photovoltaic panel assembly;

at least one alternative top end edge support affixed (i) between said first side edge and said second side edge of the second photovoltaic panel assembly, (ii) on a bottom surface of the second photovoltaic panel assembly, (iii) between the first parallel support and the second parallel support and (iv) adjacent the top end edge of the second photovoltaic panel assembly; and at least one bottom end edge support affixed (i) between said first side edge and said second side edge of the second photovoltaic panel assembly, (ii) on the bottom surface of the second photovoltaic panel assembly, (iii) between the first parallel support and the second parallel support and (iv) adjacent the bottom end edge of the second photovoltaic panel assembly; and wherein the at least one alternative top end edge support of the second photovoltaic panel assembly is shorter than the at least one top bottom end edge support of the first photovoltaic panel assembly.

15. The solar panel structure of claim 14, wherein said at least one alternative top end edge support comprises a gasket between the said at least one alternative top end edge support and the bottom of the second photovoltaic panel assembly.

16. The solar panel structure of claim 14, wherein the at least one alternative top end edge support comprises a first alternative support component attached to a bottom surface of the second photovoltaic panel assembly and a second alternative support component attached to a purlin and wherein the first alternative support component is shorter than the second alternative support component.

* * * * *